US011874612B2

(12) United States Patent
Kobayashi et al.

(10) Patent No.: US 11,874,612 B2
(45) Date of Patent: Jan. 16, 2024

(54) IMAGE FORMING APPARATUS AND DEVELOPER REPLENISHMENT THEREOF

(71) Applicant: CANON KABUSHIKI KAISHA, Tokyo (JP)

(72) Inventors: Nobuyuki Kobayashi, Kawasaki (JP); Kenichi Iida, Tokyo (JP); Masahiro Hayakawa, Odawara (JP); Masaaki Sato, Yokohama (JP); Haruyuki Hotta, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/590,172

(22) Filed: Feb. 1, 2022

(65) Prior Publication Data

US 2022/0155705 A1 May 19, 2022

Related U.S. Application Data

(62) Division of application No. 16/943,189, filed on Jul. 30, 2020, now Pat. No. 11,269,266.

(30) Foreign Application Priority Data

Aug. 5, 2019 (JP) ................................ 2019-143919
Feb. 25, 2020 (JP) ................................ 2020-029731

(51) Int. Cl.
*G03G 15/08* (2006.01)
*G03G 15/00* (2006.01)

(52) U.S. Cl.
CPC ..... *G03G 15/0862* (2013.01); *G03G 15/0808* (2013.01); *G03G 15/0855* (2013.01);
(Continued)

(58) Field of Classification Search
CPC ........... G03G 15/0862; G03G 15/0889; G03G 15/0855; G03G 15/0808; G03G 15/502;
(Continued)

(56) References Cited

U.S. PATENT DOCUMENTS 5,974,280 A * 10/1999 Takesue ............ G03G 15/0822 399/46
6,097,903 A 8/2000 Yahata
(Continued)

FOREIGN PATENT DOCUMENTS

EP 0540057 A2 5/1993
JP H0830084 A 2/1996
(Continued)

OTHER PUBLICATIONS

Office Action issued in U.S. Appl. No. 16/943,189 dated May 14, 2021.

(Continued)

*Primary Examiner* — Arlene Heredia
*Assistant Examiner* — Laura Roth
(74) *Attorney, Agent, or Firm* — ROSSI, KIMMS & McDOWELL LLP

(57) ABSTRACT

An image forming apparatus includes: a detection unit configured to detect an amount of developer stored in a developing container and to output remaining amount information; and a control unit configured to perform control, during a replenishment of the developer to the developing container using a replenishment container, to cause a display unit to display a message related to the replenishment. When the replenishment is instructed, the control unit is further configured to perform a first control during the replenishment in a case where the remaining amount information indicates a first remaining amount, and configured to perform a second control different from the first control during
(Continued)

the replenishment in a case where the remaining amount information indicates a second remaining amount greater than the first remaining amount.

4 Claims, 42 Drawing Sheets

(52) U.S. Cl.
CPC ..... *G03G 15/0856* (2013.01); *G03G 15/0879* (2013.01); *G03G 15/0889* (2013.01); *G03G 15/553* (2013.01); *G03G 15/556* (2013.01); *G03G 2215/0678* (2013.01); *G03G 2215/0682* (2013.01)

(58) Field of Classification Search
CPC ............. G03G 15/556; G03G 15/0877; G03G 15/0856; G03G 15/0891; G03G 15/0879; G03G 15/553; G03G 2215/066; G03G 2215/0678; G03G 15/0874; G03G 2215/0682
See application file for complete search history.

(56) References Cited

U.S. PATENT DOCUMENTS

| | | | | |
|---|---|---|---|---|
| 6,212,338 | B1 | 4/2001 | Hagihara | |
| 6,229,975 | B1 | 5/2001 | Wilhelm | |
| 7,729,624 | B2 | 6/2010 | Zehentbauer | |
| 2012/0294632 | A1 * | 11/2012 | Nishikawa ......... | G03G 15/0879 399/27 |
| 2018/0314201 | A1 | 11/2018 | Inoue | |
| 2021/0405552 | A1 * | 12/2021 | Sato ..................... | G03G 15/556 |
| 2021/0405555 | A1 * | 12/2021 | Ogawa ............... | G03G 21/1633 |
| 2021/0405574 | A1 * | 12/2021 | Wada ................. | G03G 21/1619 |
| 2021/0405577 | A1 * | 12/2021 | Noguchi ............ | G03G 21/1633 |

FOREIGN PATENT DOCUMENTS

| | | | |
|---|---|---|---|
| JP | H09138555 | A | 5/1997 |
| JP | 2000284581 | A | 10/2000 |
| JP | 2006209060 | A | 8/2006 |
| JP | 2010262024 | A | 11/2010 |

OTHER PUBLICATIONS

Notice of Allowance issued in U.S. Appl. No. 16/943,189 dated Nov. 1, 2021.

* cited by examiner

FIG. 19A

PLEASE PRESS TONER
REPLENISHMENT BUTTON
AFTER MOUNTING
TONER CONTAINER

FIG. 19B

PLEASE KNEAD
TONER CONTAINER

FIG. 19C

TONER REPLENISHMENT IS
BEING PERFORMED
SUCCESSFULLY!

FIG. 19D

TONER REPLENISHMENT IS
COMPLETE. PLEASE CONFIRM

FIG. 19E

PLEASE REMOVE TONER
REPLENISHMENT
CONTAINER

FIG. 19F

END
TONER REPLENISHMENT?
YES: BUTTON 1
NO: BUTTON 2

FIG. 19G

PLEASE
CONFIRM MOUNTING OF
TONER REPLENISHMENT
CONTAINER

FIG. 19H

TONER CONTAINER
IS NOT MOUNTED

FIG. 25A
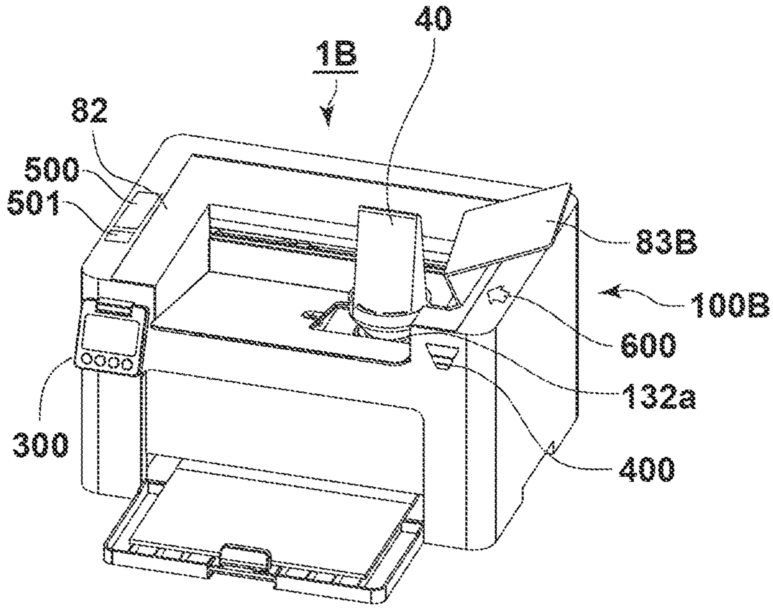
FIG. 25B
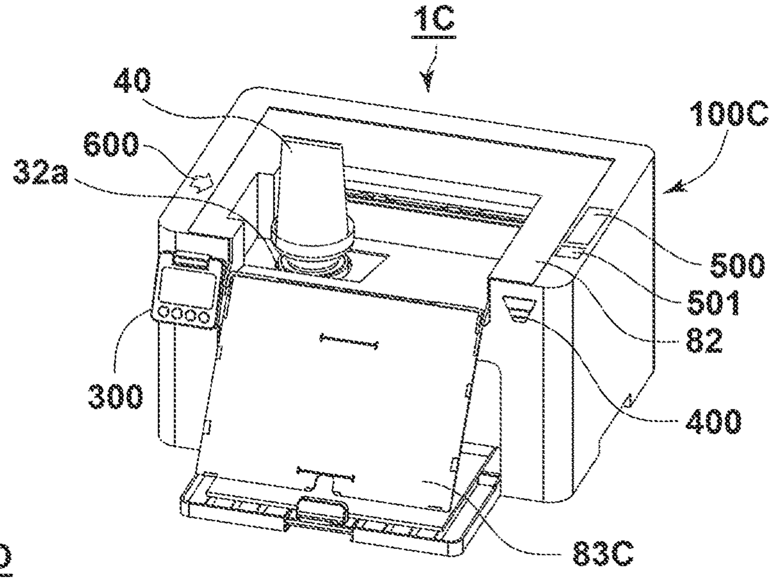
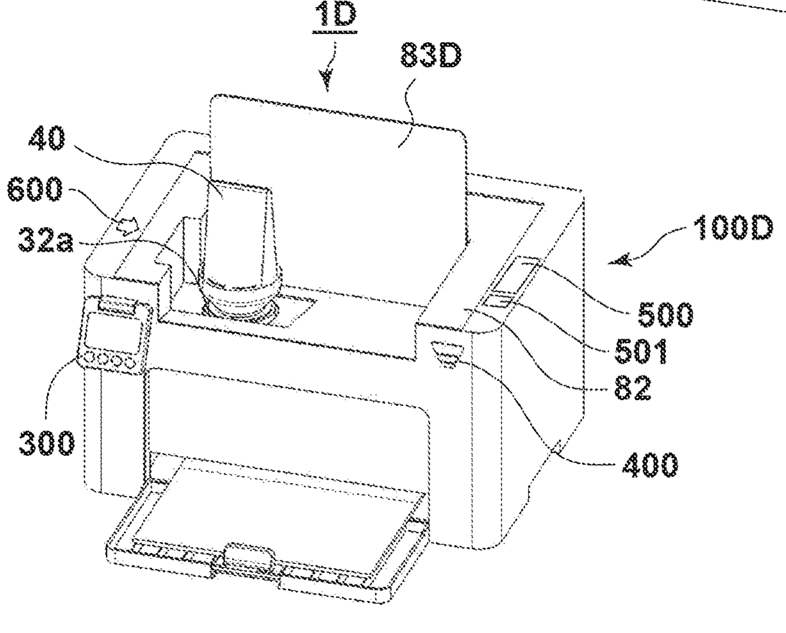
FIG. 25C

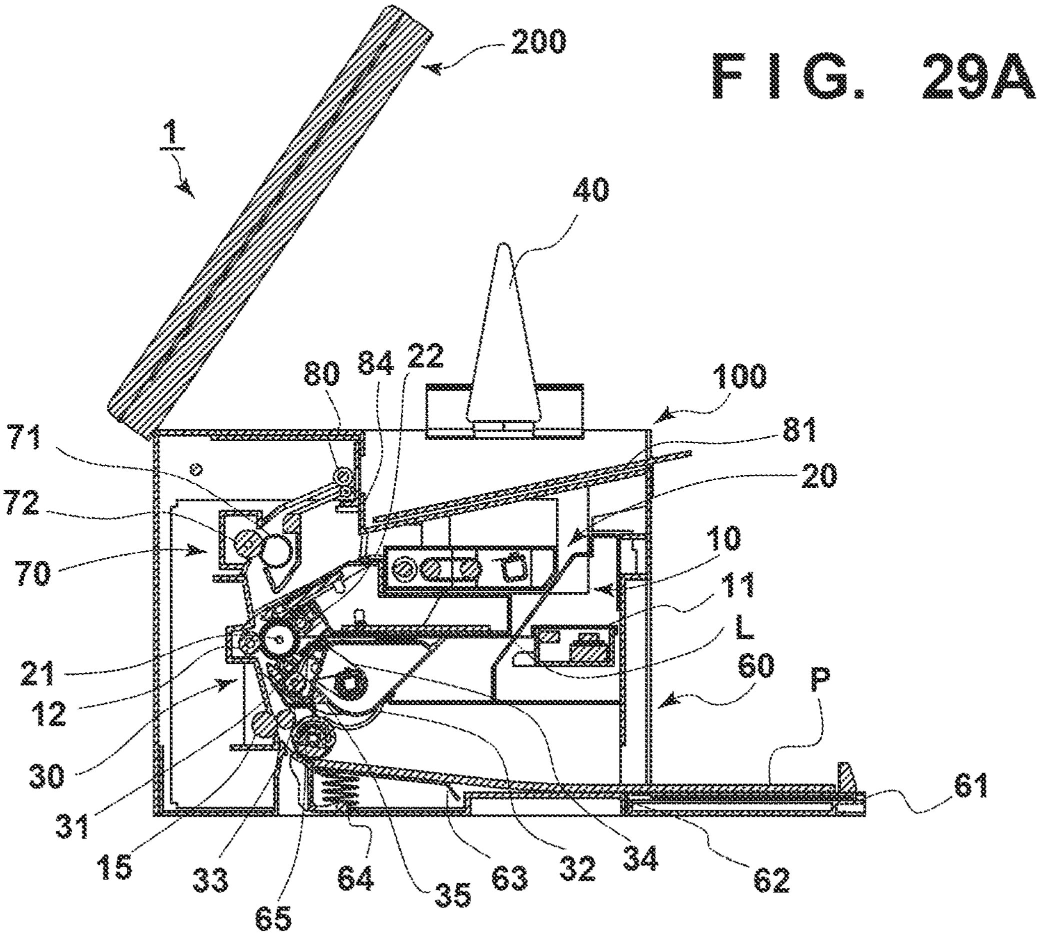
FIG. 29A
FIG. 29B
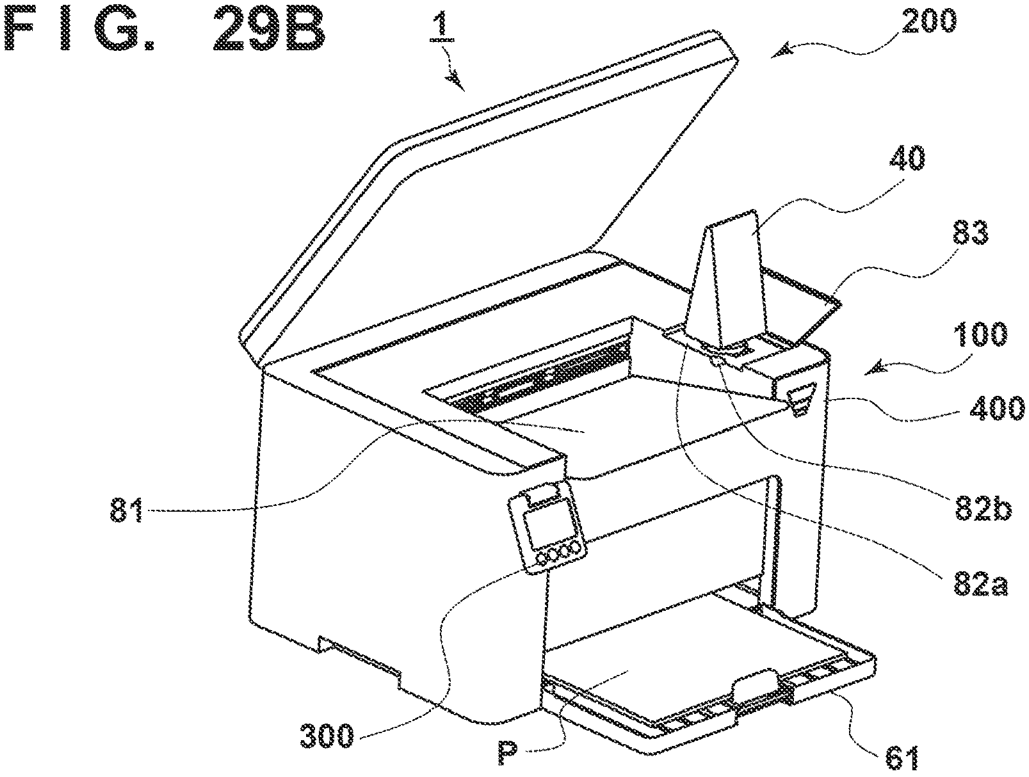

IMAGE FORMING APPARATUS AND DEVELOPER REPLENISHMENT THEREOF

BACKGROUND OF THE INVENTION

Field of the Invention

The present invention is related to an image forming apparatus for forming an image on a recording material and more specifically, is related to a developer replenishment technology for the image forming apparatus.

Description of the Related Art

Generally, electrophotographic image forming apparatuses form images by transferring a toner image formed on a surface of a photosensitive drum to a transfer material serving as a transfer medium. As for developer replenishment methods, methods such as a process cartridge method and a toner replenishment method are known. The process cartridge method is a method in which a photosensitive drum and a developing container are integrated in a process cartridge, then the process cartridge is replaced with a new one when it runs out of developer.

On the other hand, the toner replenishment method is a method in which a developing container is replenished with new toner when it runs out of toner. Japanese Patent Laid-Open No. 08-30084 proposes a toner replenishing single-component developing apparatus in which a toner supply box capable of replenishing toner is connected to a toner conveyance path through which the toner is conveyed. The toner stored in the toner supply box is conveyed to the toner conveyance path by a conveying screw.

In recent years, users have been seeking various usages of image forming apparatuses such as the process cartridge method and the toner replenishment method described above.

SUMMARY OF THE INVENTION

According to an aspect of the present disclosure, an image forming apparatus includes: an image carrier configured to carry an electrostatic latent image; a developing container; a developer carrier configured to carry a developer stored in the developing container and to develop the electrostatic latent image carried by the image carrier into a developer image; a mounting unit configured to mount a replenishment container in which the developer is stored; a detection unit configured to detect an amount of developer stored in the developing container and to output remaining amount information corresponding to the amount of developer which was detected; and a control unit configured to perform control, during a replenishment of the developer to the developing container that uses the replenishment container, to cause a display unit to display a message related to the replenishment. When the replenishment is instructed, The control unit is configured to perform a first control during the replenishment in a case where the remaining amount information which indicates a first remaining amount is outputted by the detection unit, and configured to perform a second control which is different from the first control during the replenishment in a case where the remaining amount information which indicates a second remaining amount greater than the first remaining amount is outputted by the detection unit.

Further features of the present invention will become apparent from the following description of exemplary embodiments with reference to the attached drawings.

BRIEF DESCRIPTION OF THE DRAWINGS

FIGS. 19A to 19H are diagrams illustrating display examples of messages on a display unit.

FIGS. 25A to 25C are perspective views illustrating varying variations of the image forming apparatus.

FIGS. 29A and 29B are a cross-sectional view and a perspective view illustrating the image forming apparatus according to a fifth embodiment.

DESCRIPTION OF THE EMBODIMENTS

Figure 1A:
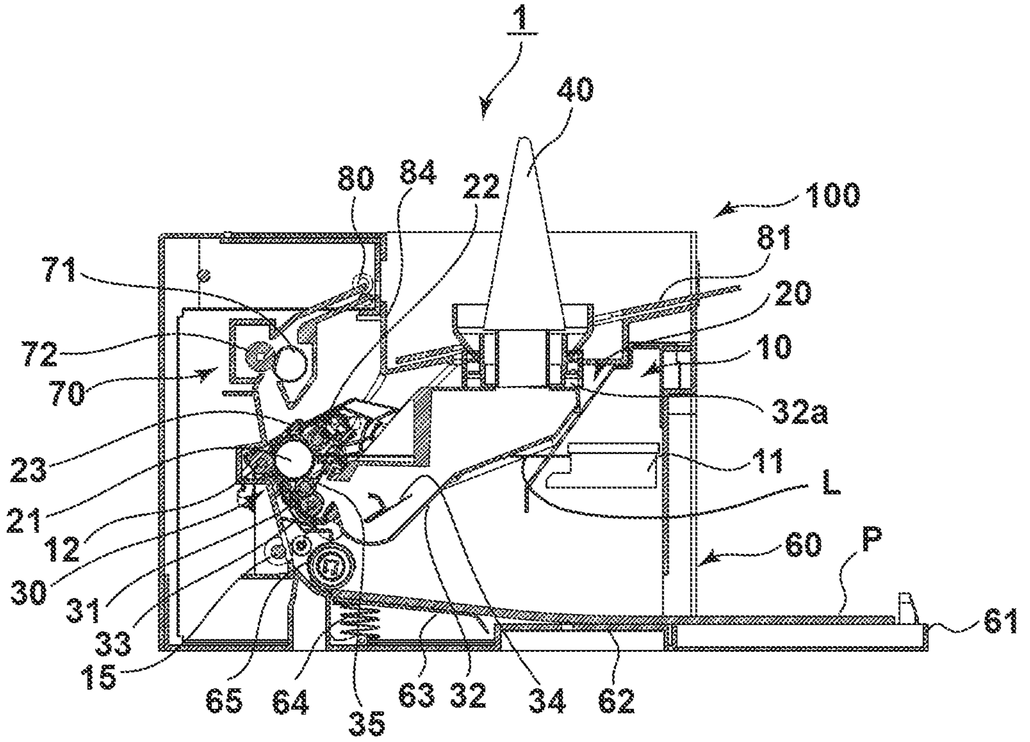
FIGS. 1A and 1B are a cross-sectional view and a perspective view illustrating an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1A is a schematic view illustrating a configuration of an image forming apparatus 1 according to a first embodiment. The image forming apparatus 1 is a monochrome printer for forming an image to a recording material based on image information inputted from an external device. The recording material may be a paper such as a plain paper and a thick paper, a plastic film such as an overhead projector sheet, a sheet with a special shape such as an envelope or index divider, as well as various sheet materials of different materials such as fabrics.

[Overall Configuration]

Figure 1B:
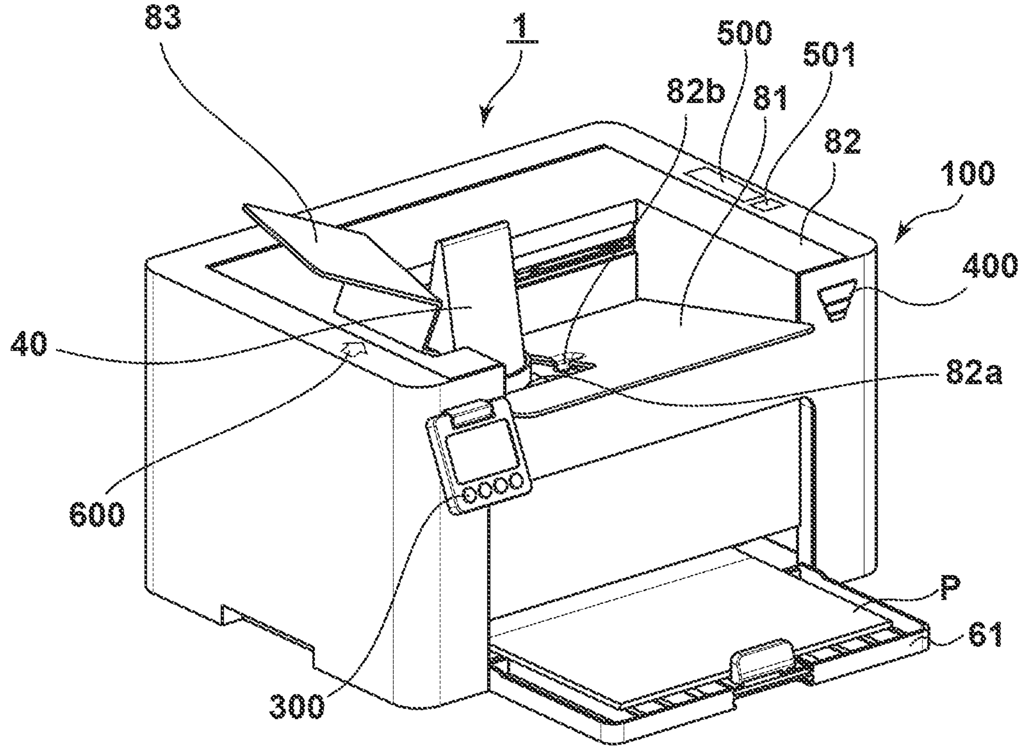

As illustrated in FIGS. 1A and 1B, the image forming apparatus 1 comprises a printer main body 100 as a main body of the apparatus and an operation unit 300 attached to an exterior surface of the printer main body 100. The printer main body 100 comprises an image forming unit 10 for forming a toner image on a recording material, a feeding unit 60 for feeding a recording material to the image forming unit 10, a fixing unit 70 for fixing a toner image formed by the image forming unit 10 on a recording material, and a discharging roller pair 80.

Figure 6A:
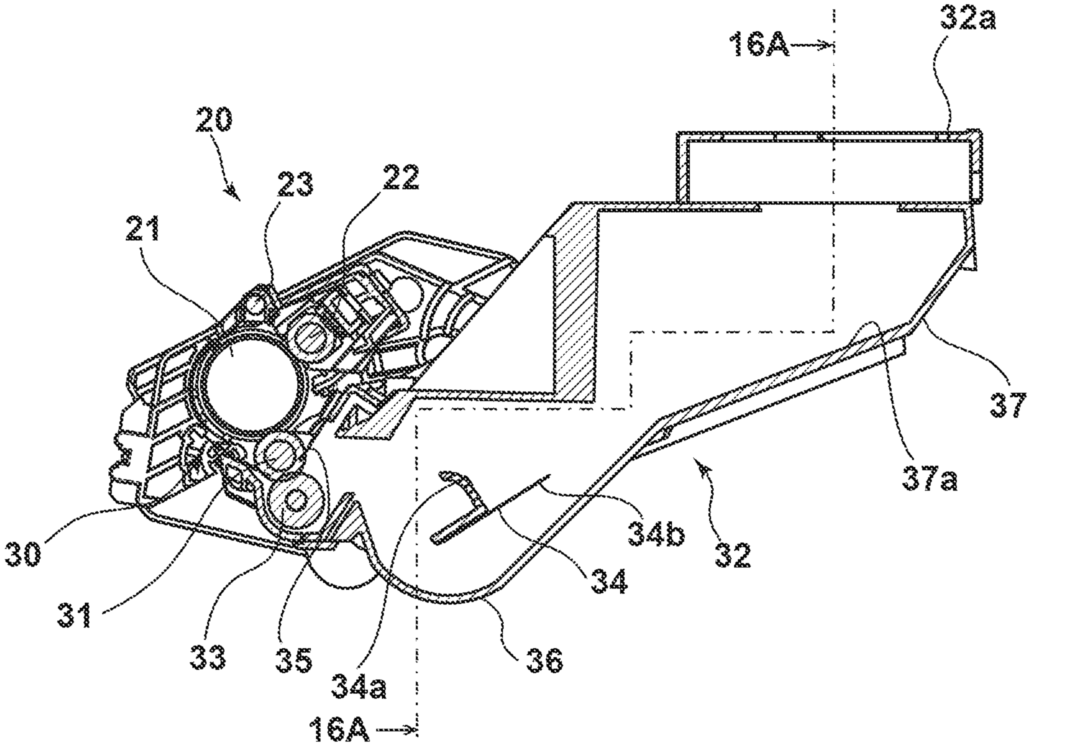
FIGS. 6A and 6B are a 6A-6A cross-sectional view of FIG. 5B and a 6B-6B cross-sectional view of FIG. 5B.
Figure 6B:
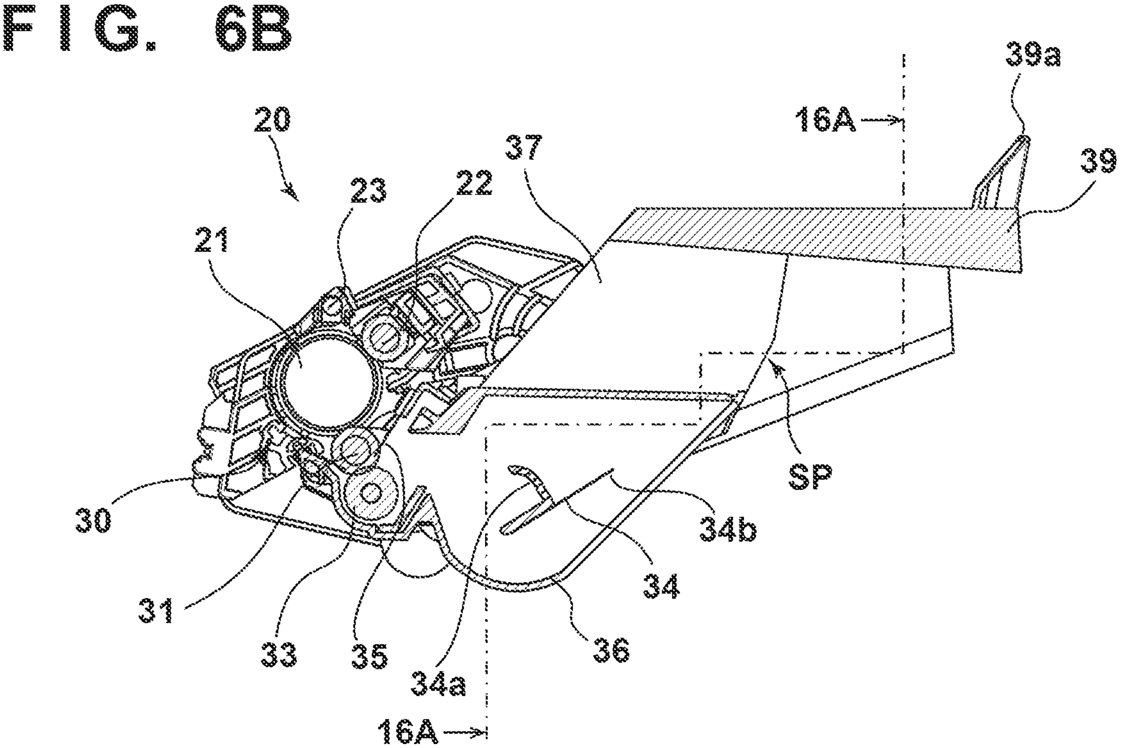

The image forming unit 10 comprises a scanner unit 11, an electrophotographic process cartridge 20, and a transfer roller 12 for transferring a toner image formed on a photosensitive drum 21 of the process cartridge 20 to a recording material. As illustrated in FIGS. 6A and 6B, the process cartridge 20 comprises the photosensitive drum 21, a charging roller 22 arranged near the photosensitive drum 21, and a developing apparatus 30 comprising a pre-exposure apparatus 23 and a developing roller 31.

The photosensitive drum 21 is photosensitive body formed in a cylindrical shape. The photosensitive drum 21 of the present embodiment comprises a photosensitive layer, formed by a negatively charged organic photosensitive body, on a drum-shaped base body formed of aluminum. Also, the photosensitive drum 21 serving as an image carrier is rotationally driven by a motor in a predetermined direction (a clockwise direction in the figure) at a predetermined processing speed.

The charging roller 22 contacts the photosensitive drum 21 at a predetermined press contact force to form a charging unit. Also, a surface of the photosensitive drum 21 is charged uniformly to a predetermined potential by applying a desired charging voltage with a high-voltage charging power supply. In the present embodiment, the photosensitive drum 21 is negatively charged by the charging roller 22. The pre-exposure apparatus 23 neutralizes the surface potential of the photosensitive drum 21 before the charging unit is entered to generate a stable discharge at the charging unit.

A scanner unit 11 serving as an exposure unit emits a laser beam corresponding to image information inputted from an external device or an image reading apparatus (not illustrated) onto the photosensitive drum 21 using a polygon mirror in order to scan and expose the surface of the photosensitive drum 21. With this exposure, an electrostatic latent image corresponding to the image information is formed on the surface of the photosensitive drum 21. Note that the scanner unit 11 is not limited to a laser scanner apparatus, and may employ, for example, an LED exposure apparatus comprising an LED array in which a plurality of LEDs are arranged along the lengthwise direction of the photosensitive drum 21.

The developing apparatus 30 comprises a developing roller 31 as a developer carrier for carrying a developer, a developing container 32 as a frame of the developing apparatus 30, and a supply roller 33 that is able to supply the developing roller 31 with the developer. The developing roller 31 and the supply roller 33 are supported by the developing container 32 so as to be able rotate. The developing roller 31 is arranged in an opening of the developing container 32 so as to face the photosensitive drum 21. The supply roller 33 is in contact with the developing roller 31 such that it is able to rotate, and toner serving as a developer stored in the developing container 32 is applied onto the surface of the developing roller 31 by the supply roller 33.

Note that the supply roller 33 is not always necessary as long as a configuration is able to supply the toner sufficiently to the developing roller 31.

The developing apparatus 30 of the present embodiment uses a contact developing method as a developing method. That is, a toner layer carried by the developing roller 31 comes in contact with the photosensitive drum 21 in a developing area (a developing region), where the photosensitive drum 21 and the developing roller 31 are against each other. A developing voltage is applied to the developing roller 31 by a high-voltage developing power supply. Under the developing voltage, the toner carried on the developing roller 31 transfers from the developing roller 31 to the surface of the photosensitive drum 21 based on a potential distribution at the surface of the drum, thereby developing an electrostatic latent image into a toner image (a developer image). Note that in this embodiment, a reversal developing method is adopted. That is, a toner image is formed by toner adhering to the surface region of the photosensitive drum 21 whose charge amount was attenuated by being exposed in an exposure process after being charged in a charging process.

Also, in the present embodiment, a toner with a particle size of 6 μm and a negative normal charging polarity is used. The present embodiment uses polymerized toner produced by a polymerization method for its toner, as an example. Also, the toner of the present embodiment is a so-called non-magnetic single component developer in which the toner does not contain a magnetic component and is carried on the developing roller 31 mainly by an intermolecular force or an electrostatic force (image force). However, a single component developer containing a magnetic component may also be used. Also, there may be a case where a single component developer contains an additive (for example, wax or silica fine particles) in addition to the toner particles in order to adjust the fluidity and charging performance of the toner. Also, a two-component developer configured by a non-magnetic toner and a magnetic carrier may be used as a developer. In a case of using a magnetic developer, a developer carrier such as a cylindrical developing sleeve with a magnet arranged inside is used.

A stirring member 34 is arranged inside the developing container 32. The stirring member 34 is driven by a motor M1 (see FIG. 12) to rotate to mix the toner in the developing container 32 and feed the toner toward the developing roller 31 and the supply roller 33. Also, the stirring member 34 has a role of circulating the toner, which was not used for development and was peeled off from the developing roller 31, in the developing container to homogenize the toner in the developing container. Note that the stirring member 34 is not limited to the rotating form. For example, stirring member in an oscillating form may be adopted.

Also, a developing blade 35 for regulating the amount of toner carried on the developing roller 31 is arranged at the opening of the developing container 32 in which the developing roller 31 is arranged. The toner supplied to the surface of the developing roller 31 passes through an area on the opposite side of the developing blade 35 as the developing roller 31 rotates and is evenly thinned, then is again negatively charged by a frictional electrification.

As illustrated in FIGS. 1A and 1B, the feeding unit 60 comprises a front door 61 supported by the printer main body 100 so as to be able to open/close, a tray unit 62, an intermediate plate 63, a tray spring 64, and a pickup roller 65. The tray unit 62 constitutes a bottom surface of a recording material storage space which appears when the front door 61 is opened, and the intermediate plate 63 is supported by the tray unit 62 to be able to move up and down. The tray spring 64 biases the intermediate plate 63 upward, and presses a recording material P stacked on the intermediate plate 63 against the pickup roller 65. Also, the front door 61, when closed with respect to the printer main body 100, blocks the recording material storage space and when opened with respect to the printer main body 100, supports the recording material P together with the tray unit 62 and the intermediate plate 63.

The fixing unit 70 is of a thermal fixation type for performing a process of fixing an image by heating and melting the toner on a recording material. The fixing unit 70 comprises a fixing film 71, a fixing heater such as a ceramic heater for heating the fixing film 71, a thermistor for measuring the temperature of the fixing heater, and a pressure roller 72 for pressing the fixing film 71.

Next, an image forming operation of the image forming apparatus 1 will be described. When an image formation command is inputted to the image forming apparatus 1, the image forming unit 10 starts an image forming process based on image information inputted from an external computer connected to the image forming apparatus 1 or an image reading apparatus (not illustrated). The scanner unit 11 irradiates a laser beam to the photosensitive drum 21 based on the inputted image information. At this point, the photosensitive drum 21 is already charged by the charging roller 22, then the laser beam is irradiated to form an electrostatic latent image on the photosensitive drum 21. Then, the developing roller 31 develops the electrostatic latent image, and a toner image is formed on the photosensitive drum 21.

In parallel with the image forming process described above, the pickup roller 65 of the feeding unit 60 sends out the recording material P which is supported by the front door 61, the tray unit 62, and the intermediate plate 63. The recording material P is fed to a registration roller pair 15 by the pickup roller 65 and skew is corrected for by the recording material P bumping into a nip of the registration roller pair 15. Then, the registration roller pair 15 is driven to match the transfer timing of the toner image and conveys the recording material P to the transfer nip formed by the transfer roller 12 and the photosensitive drum 21.

A transfer voltage is applied from a high-voltage transferring power supply to the transfer roller 12 serving as a transfer unit, then the toner image carried on the photosensitive drum 21 is transferred to the recording material P conveyed by the registration roller pair 15. The recording material P on which the toner image is transferred is conveyed to the fixing unit 70, then the toner image is heated and pressed when passing through the nip region between the fixing film 71 and the pressure roller 72 of the fixing unit 70. With this, the toner particles are melted, and then by solidifying, the toner image is fixed on the recording material P. The recording material P that has passed through the fixing unit 70 is discharged outside (outside the apparatus) of the image forming apparatus 1 by the discharging roller pair 80 serving as a discharging unit, and is stacked on a discharge tray 81 serving as a stacking unit formed on the upper portion of the printer main body 100.

The discharge tray 81 is inclined upward toward the downstream side of the discharging direction of the recording material, and the recording material discharged on the discharge tray 81 slides down the discharge tray 81 so that the trailing end is aligned by a regulating surface 84.

Figure 2A:
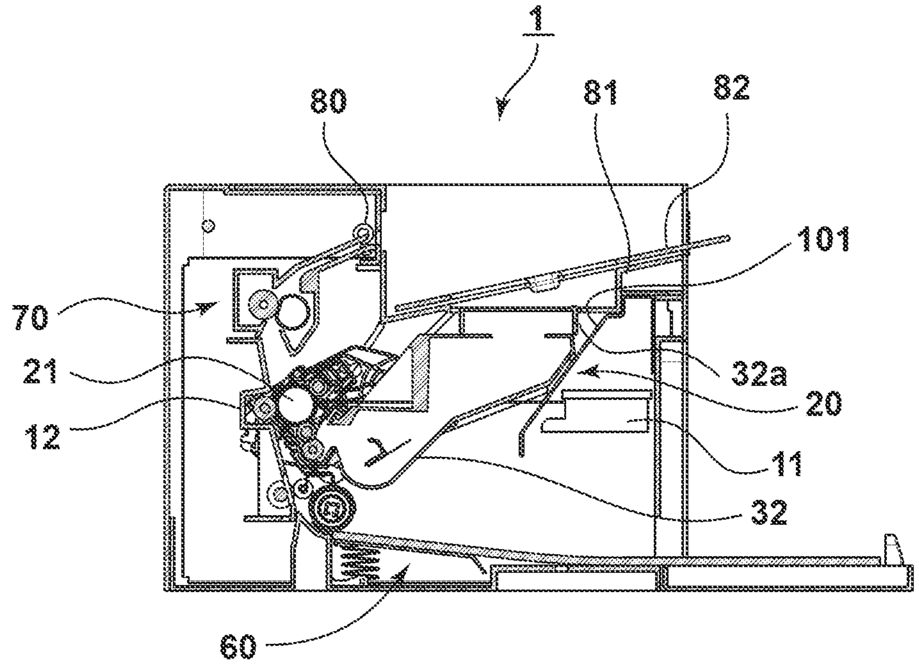
FIGS. 2A and 2B are a cross-sectional view illustrating the image forming apparatus and a perspective view illustrating an image forming apparatus with a top cover opened.
Figure 2B:
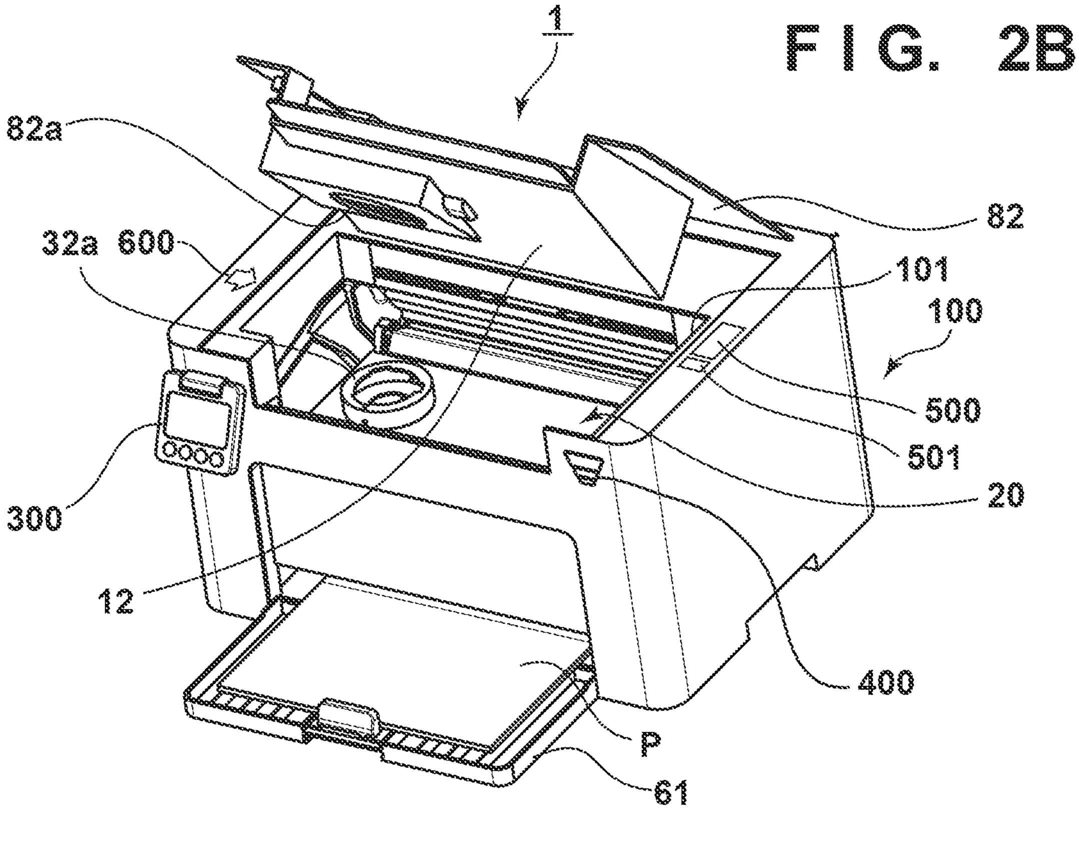
Figure 3:
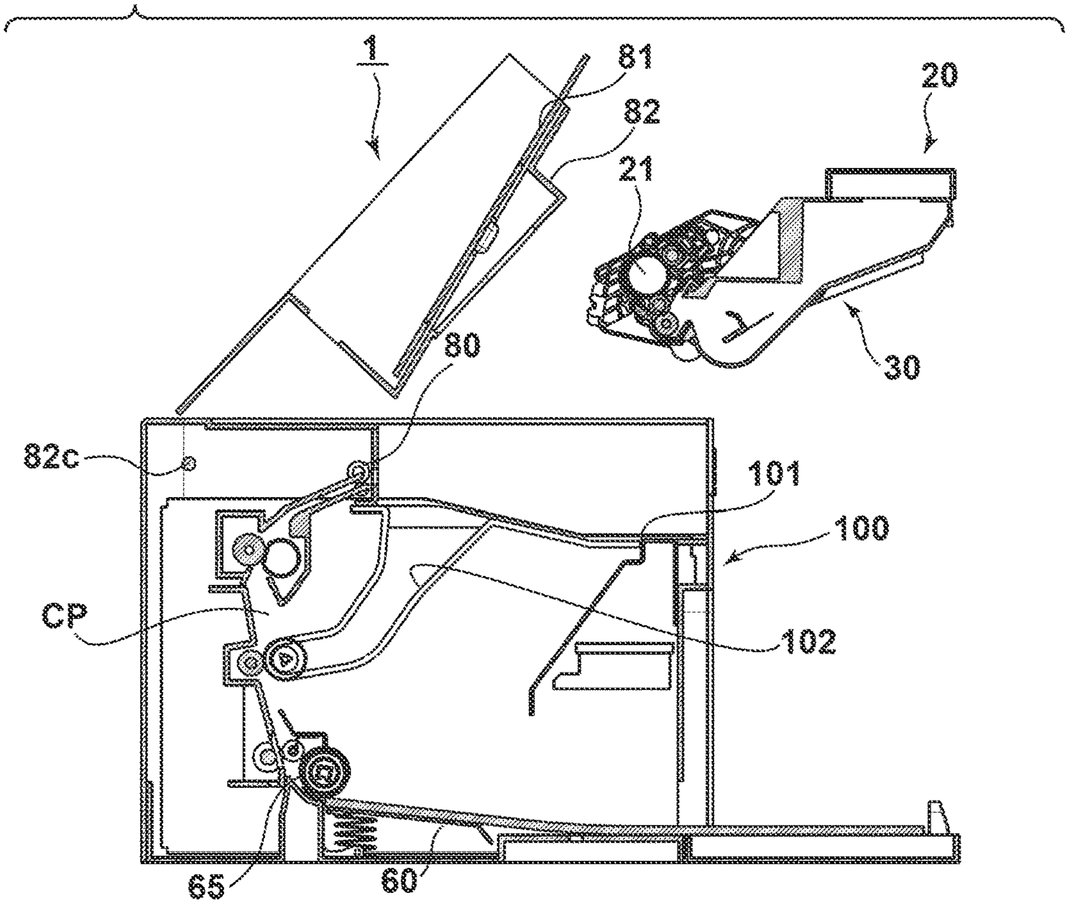
FIG. 3 is a cross-sectional view illustrating the image forming apparatus with a process cartridge removed.

As illustrated in FIGS. 2B and 3, a first opening 101 that opens upward is formed in the upper portion of the printer main body 100, and the first opening 101 is covered by a top cover 82. The top cover 82 serving as a stacking tray is supported be able to open and close with respect to the printer main body 100 centered on a rotation shaft 82*c* extending in the left-right direction, and the discharge tray 81 serving as a stacking surface is formed on an upper surface. The top cover 82 opens from the front side toward the back side. Note that the top cover 82 may be configured to be held in an open state or a closed state by a holding mechanism such as a hinge mechanism.

For example, in a case where the recording material jams due to a paper jam or the like in the conveyance path CP through which the recording material fed by the pickup roller 65 passes, a user opens the top cover 82. Then, the user accesses the process cartridge 20 through the first opening 101 exposed by opening the top cover 82 and pulls out the process cartridge 20 following the cartridge guide 102. The cartridge guide 102 slidingly-guides a protrusion 21*a* (refer to FIG. 5A) arranged at the end of the axial direction of the photosensitive drum 21 of the process cartridge 20.

Then, by pulling out the process cartridge 20 from the first opening 101, a space for a hand to be able to enter the conveyance path CP is created. The user inserts their hand inside the printer main body 100 from the first opening 101, then accesses the recording material jammed in the conveyance path CP to be able to dispose of the jammed recording material.

Figure 4:
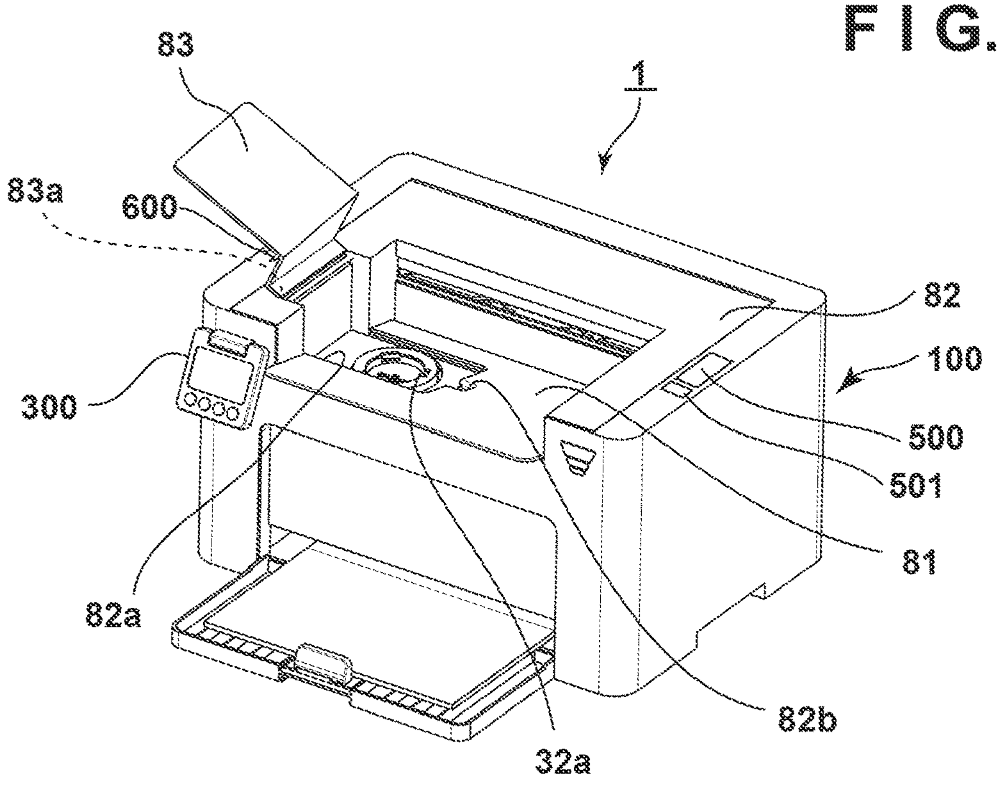
FIG. 4 is a perspective view illustrating the image forming apparatus with an opening/closing component opened.

Also, in the present embodiment, an opening/closing component 83 is arranged on the top cover 82 so as to be able to open and close as illustrated in FIGS. 1B and 4. A second opening 82*a* serving as an opening that opens upward is formed on the discharge tray 81 of the top cover 82. The opening/closing component 83 is configured to be able to move between a closed position for covering the replenishment port 32*a* so that the toner pack 40 which serves as the toner container cannot be mounted to the developing container 32 and an open position for exposing the replenishment port 32*a* so that the toner pack 40 can be mounted to the developing container 32. The opening/closing component 83 functions as a part of the discharge tray 81 in the closed position. The opening/closing component 83 and the second opening 82*a* are formed on the left side of the discharge tray 81. Also, the opening/closing component 83 is supported by the top cover 82 so as to be able to open and close centered on a rotation shaft 83*a* extending in the front-rear direction, and is opened to the left direction by using a finger in a groove portion 82*b* provided in the top cover 82. The opening/closing component 83 is formed to be roughly L-shaped along the shape of the top cover 82.

The second opening 82*a* of the discharge tray 81 opens to expose the replenishment port 32*a* for toner replenishment formed in the upper portion of the developing container 32, and by opening the opening/closing component 83, the user can access the replenishment port 32*a* without opening the top cover 82. Also, in the present embodiment, a method (a direct replenishment method) in which the user replenishes the developing apparatus 30 with the toner from the toner pack 40 (refer to FIGS. 1A and 1B) filled with toner for replenishment while the developing apparatus 30 is attached to the image forming apparatus 1 is used. Therefore, an operation of removing the process cartridge 20 from the printer main body 100 and replacing it with a new process cartridge when the remaining toner amount in the process cartridge 20 becomes low is unnecessary, and so usability can be improved. Also, it becomes possible to replenish the developing container 32 with toner at a lower cost than replacing the entire process cartridge 20. Note that the direct replenishment method can reduce the cost even when compared to a case where only the developing apparatus 30 of the process cartridge 20 is changed, because it is not necessary to replace various rollers, gears, or the like. Additionally, the image forming apparatus 1 and the toner pack 40 configure an image forming system.

[Collection of Residual Toner]

The present embodiment employs a cleanerless configuration in which residual toner remaining on the photosensitive drum 21 without having been transferred to the recording material P is collected in the developing apparatus 30 then reused. The residual toner is removed in the following process. Toner that is positively charged and toner that is negatively charged despite not having a sufficient charge are present among the residual toner. A pre-exposure apparatus 23 neutralizes the post-transfer photosensitive drum 21, and the charging roller 22 causes a uniform discharge to enable the residual toner to recharge negatively. The residual toner that is recharged in the charging unit to a negative polarity reaches the developing unit by the rotation of the photosensitive drum 21. Then, the scanner unit 11 exposes and writes the electrostatic latent image on a surface region of the photosensitive drum 21 that has passed the charging unit with the residual toner still adhered to the surface.

Here, the behavior of the residual toner that reached the developing unit will be explained separately with respect to an exposed portion and a non-exposed portion of the photosensitive drum 21. The residual toner adhered to the non-exposed portion of the photosensitive drum 21 transfers onto the developing roller 31 at the developing unit due to a potential difference between an electric potential (a dark portion potential) of the non-exposed portion of the photosensitive drum 21 and the developing voltage, and is collected in the developing container 32. This is because, assuming that a normal charging polarity of the toner is negative, the developing voltage that is applied to the developing roller 31 is relatively positive compared to the electric potential of the non-exposed portion. Also, the toner collected in the developing container 32 is mixed and distributed throughout the toner in the developing container by the stirring member 34, then is carried by the developing roller 31 to be reused in the developing process.

Meanwhile, the residual toner adhered to the exposed portion of the photosensitive drum 21 does not transfer from the photosensitive drum 21 to the developing roller 31 at the developing unit and remains on the surface of the drum. This is because, assuming that a normal charging polarity of the toner is negative, the developing voltage that is applied to the developing roller 31 is even more negative compared to the electric potential (light portion potential) of the exposed portion. The residual toner remaining on the surface of the drum is carried and transferred by the photosensitive drum 21 to the transfer unit with other toner that is being transferred to the exposure unit from the developing roller 31 then is transferred to the recording material S at the transfer unit.

As described above, the present embodiment is configured to be cleanerless by collecting residual toner to the developing apparatus 30 for reuse, however, it may also be configured to use an existing and publicly known cleaning blade that contacts the photosensitive drum 21 to collect the residual toner. In that case, the residual toner collected by the cleaning blade is collected to a collection container installed separately from the developing apparatus 30. However, a cleanerless configuration makes it so that an installation space for a collection container for collecting residual toner and such is no longer required and enables further miniaturization than that of the image forming apparatus 1 as well as enables a reduction in printing cost to be achieved by reusing residual toner.

[Configuration of Developing Container and Toner Pack]

Figure 5A:
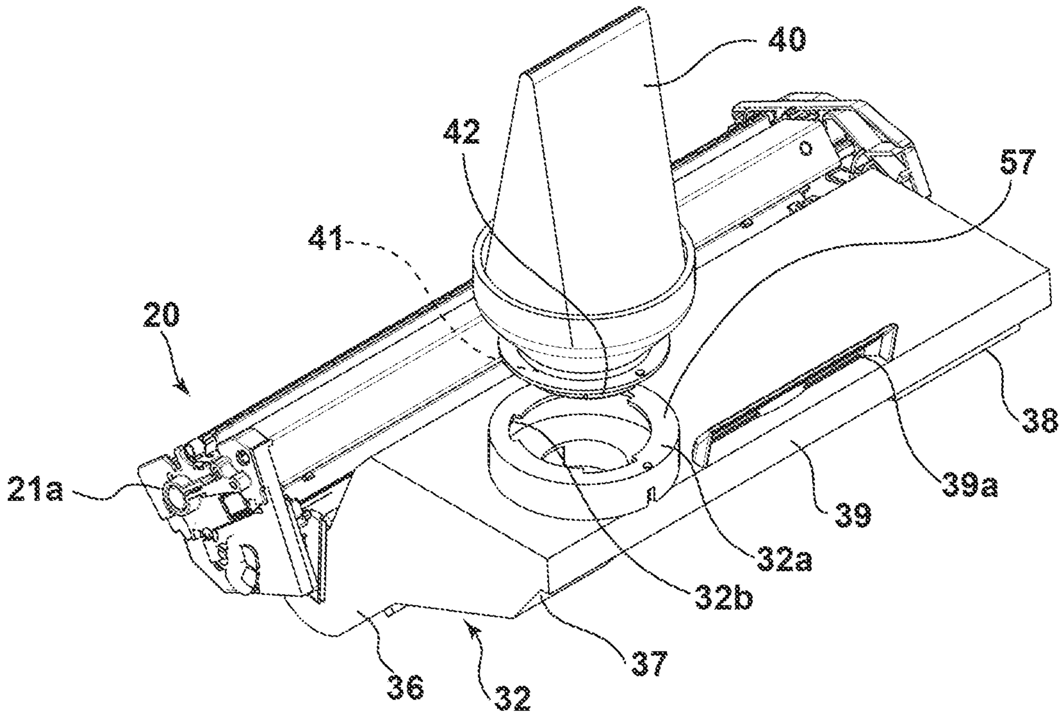
FIGS. 5A and 5B are a perspective view and a front view illustrating a developing container and a toner pack.
Figure 5B:
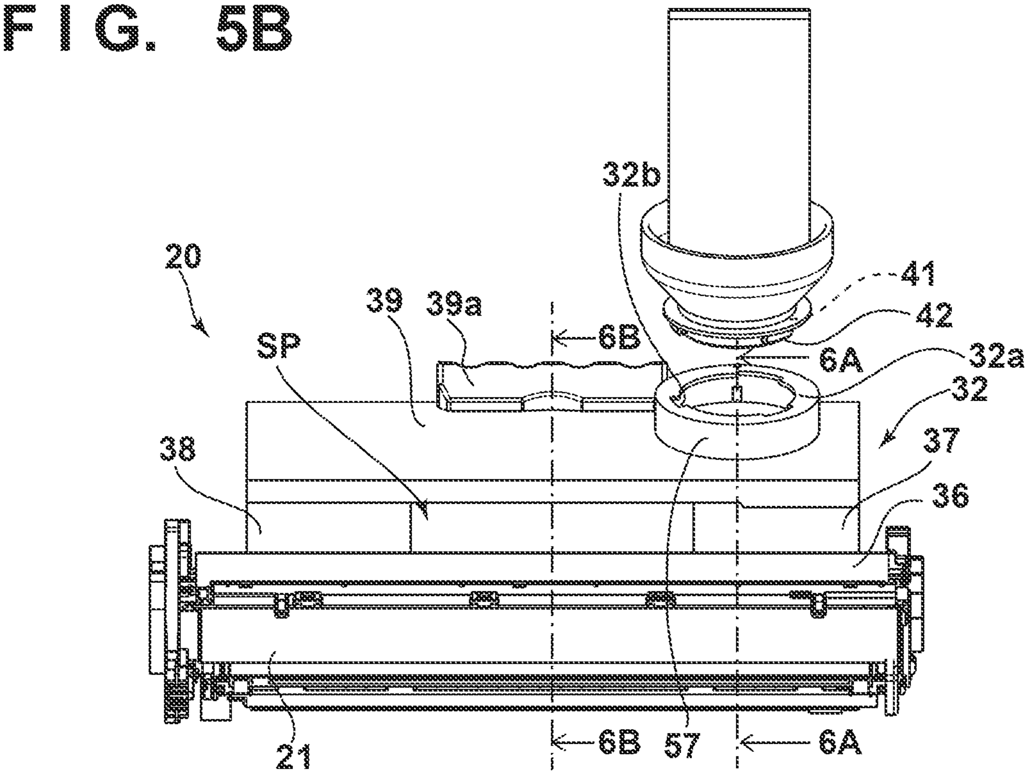

Next, the configuration of the developing container 32 and the toner pack 40 will be explained. FIG. 5A is a perspective view illustrating the developing container 32 and the toner pack 40, and FIG. 5B is a front view illustrating the developing container 32 and the toner pack 40. FIG. 6A is a cross-sectional view from 6A to 6A in FIG. 5B, and FIG. 6B is a cross-sectional view from 6B to 6B in FIG. 5B.

As illustrated in FIG. 5A to FIG. 6B, the developing container 32 comprises a transfer chamber 36 which houses the stirring member 34, and the transfer chamber 36, which serves as a storage unit for storing toner, extends across the entire length of the developing container 32 in a lengthwise direction (a left/right direction). Also, the transfer chamber 36 supports the developing roller 31 and the supply roller 33 so as to be able to rotate, and stores developer for the developing roller 31 to carry. Also, the developing container 32 protrudes upward at one end in the lengthwise direction of the transfer chamber 36 and comprises a first protrusion 37 which is a protrusion that communicates with the transfer chamber 36 and a second protrusion 38 which protrudes upward from the other end in the lengthwise direction of the transfer chamber 36. That is, the first protrusion 37 is arranged at one end of the developing container 32 in the rotational axis direction of the developing roller 31 and protrudes further than the central portion of the developing container 32 toward the discharge tray 81 in an intersecting direction that intersects the above rotation axis direction. The second protrusion 38 is arranged on the other end of the developing container 32 in the rotational axis direction of the developing roller 31 and protrudes further than the central portion of the developing container 32 toward the discharge tray 81 in the intersecting direction. In the present embodiment, the first protrusion 37 is formed on the left side of the developing container 32 and the second protrusion 38 is formed on the right side of the developing container 32. A mounting unit 57 on which the toner pack 40 can be mounted is arranged on an upper edge (a distal end) of the first protrusion 37, and the replenishment port 32*a* for replenishing the transfer chamber 36 with the developer from the toner pack 40 is formed on the mounting unit 57. The toner pack 40 can be mounted to the mounting unit 57 while exposed outside the apparatus.

The first protrusion 37 and the second protrusion 38 extend from the transfer chamber 36 towards the near side of the apparatus and diagonally upward. In other words, the first protrusion 37 and the second protrusion 38 protrude downstream and upward in the discharging direction of the discharging roller pair 80. Therefore, the replenishment port 32*a* formed on the first protrusion 37 is arranged at the near side of the image forming apparatus 1 and an operation to replenish toner into the developing container 32 can easily be performed.

The upper parts of the first protrusion 37 and the second protrusion 38 are connected by a handle portion 39 which serves as a connecting unit. A laser transition space SP that serves as a space which allows a laser L (refer to FIG. 1A) emitted toward the photosensitive drum 21 from the scanner unit 11 (refer to FIG. 1A) to pass is formed between the handle portion 39 and the transfer chamber 36.

The handle portion 39 comprises of a tab portion 39*a* that enables a user to grip it by using their fingers, and the tab portion 39*a* is formed to protrude upward from the top surface of the handle portion 39. The inside of the first protrusion 37 is formed to be hollow, and the replenishment port 32*a* is formed on the top surface thereof. The replenishment port 32*a* is configured to be able to couple with the toner pack 40.

The laser transition space SP that allows the laser L emitted from the scanner unit 11 to pass can be ensured by arranging the first protrusion 37 on whose distal end the replenishment port 32*a* is formed, on one of the sides in the lengthwise direction of the developing container 32, thereby enabling the image forming apparatus 1 to be miniaturized. Also, because the second protrusion 38 is arranged on the other side in the lengthwise direction of the developing container 32 and the handle portion 39 is formed to connect the first protrusion 37 and the second protrusion 38, usability for when removing the process cartridge 20 from the printer main body 100 can be improved. Note that the second protrusion 38 can be formed to have a hollow shape like the first protrusion 37 or a solid shape.

The toner pack (the replenishment container) 40 is configured to be able to attach/detach from the mounting unit 57 on the first protrusion 37. Also, the toner pack 40 comprises of a main body, a shutter component 41 arranged at the opening to be able to open/close, and a coupler to couple with the mounting unit 57 of the image forming apparatus. The coupler comprises a plurality (three in the present embodiment) of protrusions 42 formed to correspond with a plurality (three in the present embodiment) of groove portions 32*b* formed on the mounting unit 57 of the image forming apparatus. The user, when replenishing the developing container 32 with toner, will align the protrusions 42 of the toner pack 40 to pass through the groove portions 32*b* of the mounting unit 57 to couple the toner pack 40 with the mounting unit 57. In this state, the shutter component 41 is in a closed state. The closed state prevents the toner from transferring to the developing container 32. Then, when the main body of the toner pack 40 is rotated 180 degrees, a protrusion (not illustrated) of the shutter component 41 bumps into an abutting portion (not illustrated) of the mounting unit 57, and the main body of the toner pack 40 rotates relatively to the shutter component 41. With this rotation, the shutter component 41 goes into an open state, in other words, the shutter component 41 is no longer obstructing the discharge port of the toner pack 40, and the toner pack 40 and the developing container 32 are joined via the discharge port. With this, the toner stored in the toner pack 40 flows out of the toner pack 40 and the toner that flowed out enters the hollow first protrusion 37 via the replenishment port 32*a*. Note that the shutter component 41 may be arranged on the replenishment port 32*a* side.

The first protrusion 37 comprises an inclined surface 37*a* in a position that is facing the opening of the replenishment port 32*a*, and the inclined surface 37*a* slopes down toward the transfer chamber 36. Accordingly, the toner replenished from the replenishment port 32*a* is guided to the transfer chamber 36 by the inclined surface 37*a*. Also, the stirring member 34 comprises a stirring axis 34*a* that extends in the lengthwise direction and a blade portion 34*b* which extends radially outward from the stirring axis 34*a*.

The toner replenished from the replenishment port 32*a* arranged on an upstream side of the conveyance direction of the stirring member 34 is fed toward the developing roller 31 and the supply roller 33 accompanied by the rotation of the stirring member 34. The conveyance direction of the stirring member 34 is in a parallel direction to the lengthwise direction of the developing container 32. Although the replenishment port 32*a* and the first protrusion 37 are arranged on an end of the lengthwise direction of the developing container 32, the toner spreads throughout the entire length of the developing container 32 by repeating the rotation of the stirring member 34. Note that in the present embodiment, the stirring member 34 comprises the stirring axis 34*a* and the blade portion 34*b*, however, a spiral shaped stirring axis may be used as a configuration for spreading the toner throughout the entire length of the developing container 32.

Figure 7:
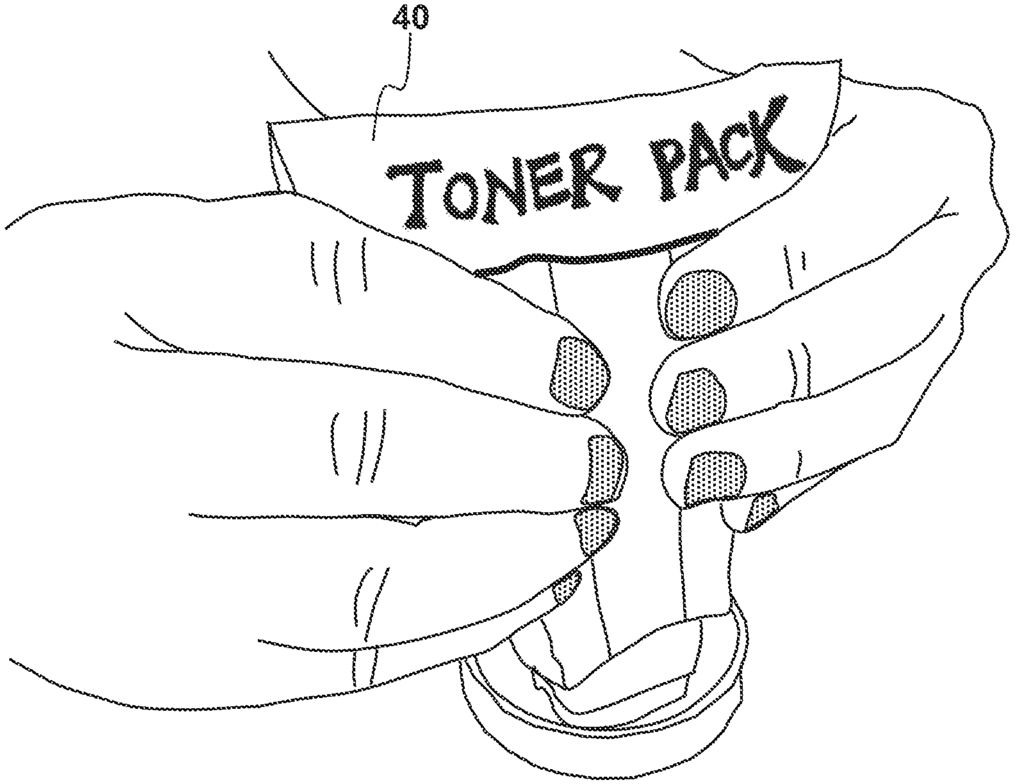
FIG. 7 is a perspective view illustrating a toner pack.
Figure 8C:
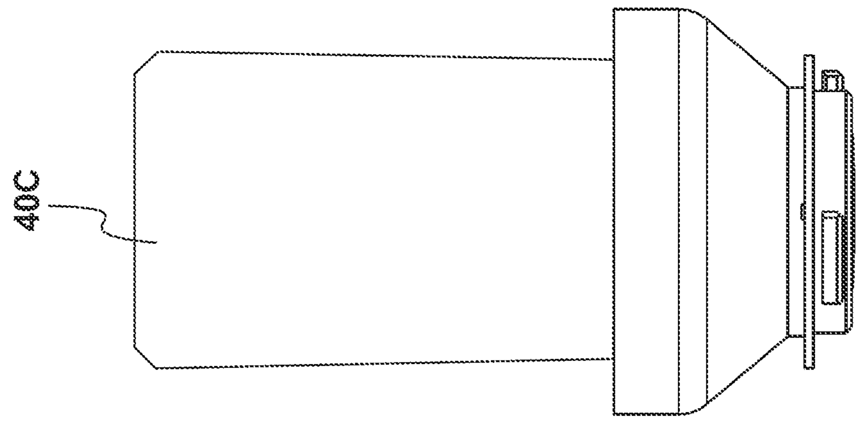
FIGS. 8A to 8C are front views illustrating example toner packs.
Figure 8B:
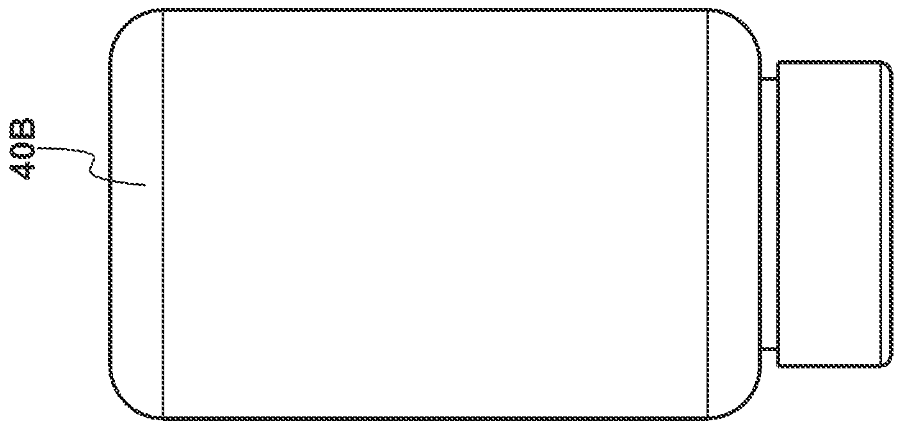
Figure 8A:
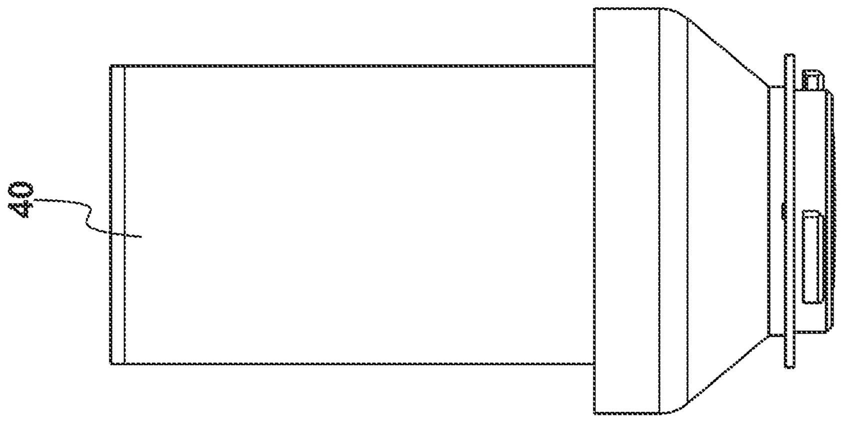

In the present embodiment, the toner pack 40 comprises a plastic bag body that can easily be deformed as illustrated in FIGS. 7 and 8A, however, the invention is not limited to this configuration. For example, the toner pack may be configured from a bottle container 40B in a roughly round conical shape as illustrated in FIG. 8B or be configured from a paper container 40C as illustrated in FIG. 8C. In any case, the material and the shape of the toner pack may be anything. Also, as for the method for dispensing the toner from the toner pack, in the case of a toner pack 40 or a paper container 40C, it is preferable that the user squeezes with their fingers, and if in the case of the bottle container 40B, it is preferable that the user hits the container or does something similar to the container to shake and dispense the toner. Also, a discharging mechanism may be arranged in the bottle container 40B to discharge the toner from the bottle container 40B. Furthermore, the discharging mechanism may be configured to engage with the printer main body 100 to receive a driving force from the printer main body 100. As for a material for the body that contains the toner in the toner pack 40, polyethylene resin may be used, for example. The thickness of the body may be 2.0 mm or less. It is preferable for the thickness of the body to be between 1.5 and 1.0 mm to make it easy for the user to loosen the toner, and between 1.0 to 0.05 mm is even more preferable.

Also, the shutter component 41 may be omitted in any of the toner packs, and a slide-type shutter component may be adopted instead of the rotation-type shutter component 41. Also, the shutter component 41 may be configured to break when the toner pack is mounted to the replenishment port 32*a* or when the toner pack is rotated in a mounted state, or it may be structured to have a removable seal-like lid.

[Method for Detecting Remaining Toner Amount]

Next, a method for detecting the remaining toner amount in the developing container 32 will be explained using FIGS. 9 to 11B. A first remaining toner amount sensor 51 and a second remaining toner amount sensor 52 for detecting a state corresponding to the remaining toner amount in the developing container 32 are placed in the developing apparatus 30 of the present embodiment.

Figure 10:
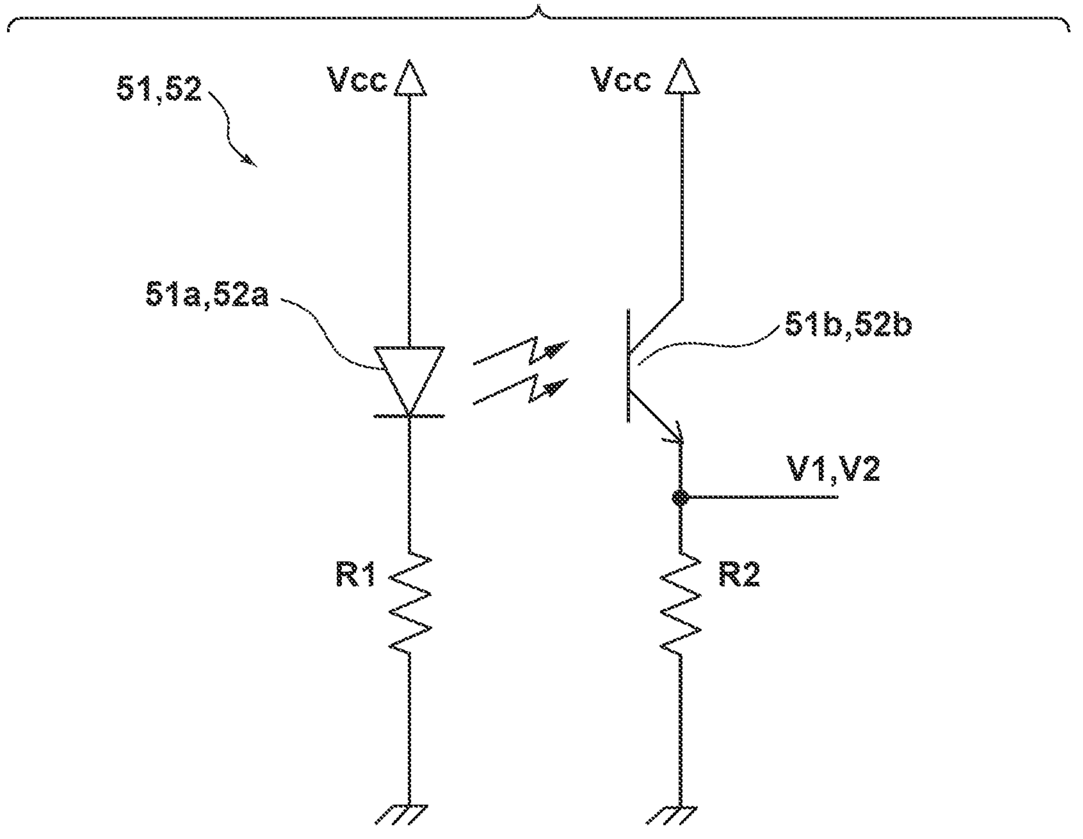
FIG. 10 is a circuit diagram illustrating the first and second remaining toner amount sensors.

The first remaining toner amount sensor 51 comprises a light emitting unit 51*a* and a light receiving unit 51*b*, and the second remaining toner amount sensor 52 comprises the light emitting unit 52*a* and the light receiving unit 52*b*. FIG. 10 is a circuit diagram illustrating an example of circuit configurations of the remaining toner amount sensors 51 and 52. Also, the circuit configuration of the first remaining toner amount sensor 51 will be explained in the following explanation, and the explanation of the circuit configuration of the second remaining toner amount sensor 52 will be omitted.

In FIG. 10, an LED is used for a light emitting unit 51*a*, and a phototransistor turned on by the light from the LED is used for a light receiving unit 51*b*, however, the invention is not limited to this configuration. For example, a halogen lamp or a fluorescent light may be adopted for the light emitting unit 51*a*, and a photodiode or an avalanche photodiode may be adopted for the light receiving unit 51*b*. Also, a switch (not illustrated) is arranged between the light emitting unit 51*a* and a power source voltage Vcc, and by turning on the switch, a voltage from the power source voltage Vcc is applied to the light emitting unit 51*a*, and then the light emitting unit 51*a* goes into a conductive state. On the other hand, a switch (not illustrated) is also arranged between the light receiving unit 51*b* and the power source voltage Vcc, and by turning on the switch, the light receiving unit 51*b* goes into a conductive state based on an electrical current corresponding to the amount of light detected.

Figure 9:
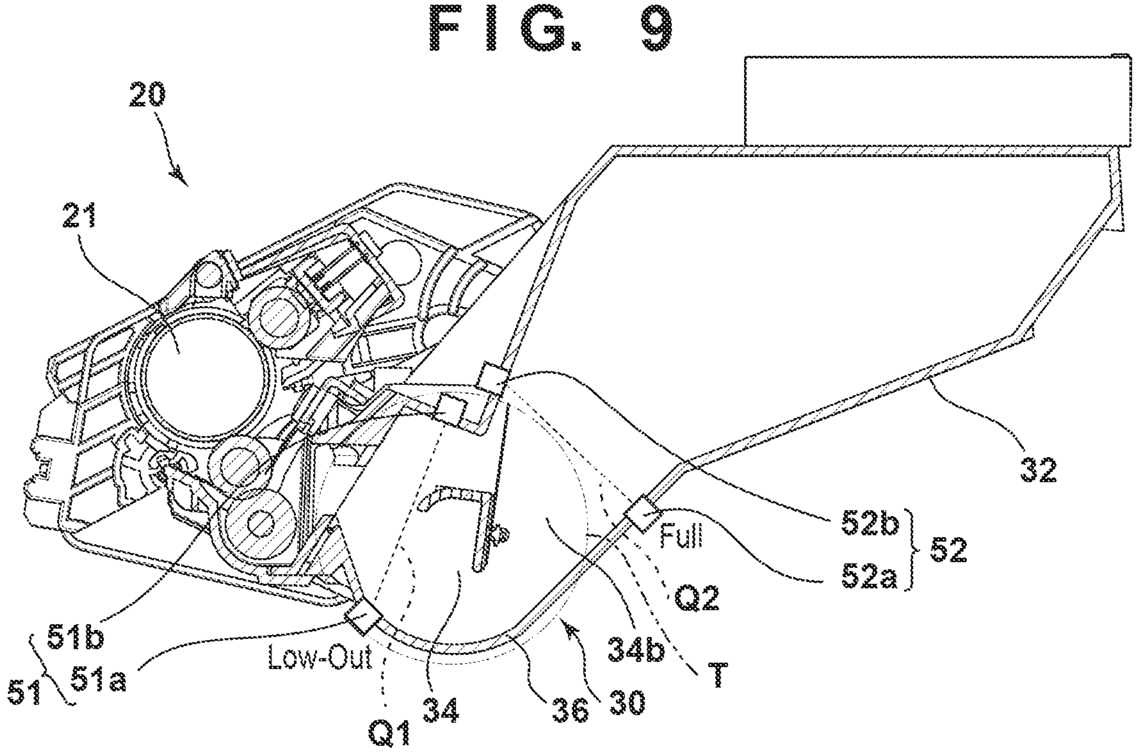
FIG. 9 is a cross-sectional view illustrating first and second remaining toner amount sensors.

The power source voltage Vcc and a current-limiting resistor R1 is connected to the light emitting unit 51*a*, and the light emitting unit 51*a* emits light based on an electric current determined by the current-limiting resistor R1. A light emitted from the light emitting unit 51*a* passes a light path Q1 and is received by the light receiving unit 51*b* as illustrated in FIG. 9. The power source voltage Vcc is connected to a collector terminal of the light receiving unit 51*b* and a detection resistor R2 is connected to an emitter terminal. The light receiving unit 51*b* which serves as a phototransistor receives the light emitted by the light emitting unit 51*a* and outputs a signal (an electrical current) corresponding to the amount of received light. This signal is converted to a voltage V1 by a detection resistor R2 and is inputted to an A/D conversion unit 95 of a control unit 90 (refer to FIG. 12). Also, the light receiving unit 52*b* of the second remaining toner amount sensor 52 receives the light that is emitted by a light emitting unit 52*a* and that passed a light path Q2, and a voltage V2 corresponding to the amount of received light is outputted and is inputted to the A/D conversion unit 95 in the control unit 90.

The control unit 90 (a CPU 91) determines whether or not the light receiving units 51*b* and 52*b* received light from the light emitting units 51*a* and 51*b* based on the inputted voltage level. The control unit 90 (the CPU 91) calculates the amount of toner in the developing container 32 based on the length of time each light was detected and the strength of light that was received by the light receiving units 51*b* and 52*b* when the toner in the developing container 32 is mixed by the stirring member 34 for a set amount of time. In other words, a non-volatile memory 93 stores, in advance, a table, to which the remaining toner amount can be output based on a light-receiving time and the light strength when the toner is conveyed by the stirring member 34, and the control unit 90 predicts/calculates the remaining toner amount based on the input to the A/D conversion unit 95 and the table.

More specifically, the light path Q1 of the first remaining toner amount sensor 51 is set so that it intersects a rotational locus T of the stirring member 34. Then, the amount of time that the light path Q1 is blocked by the toner which is churned up by the stirring member 34 when the stirring member 34 rotates once, in other words, the amount of time the light receiving unit 51*b* does not detect the light from the light emitting unit 51*a*, changes depending on the remaining toner amount. Also, the intensity of light received by the light receiving unit 51*b* changes depending on the remaining toner amount.

Figure 11A:
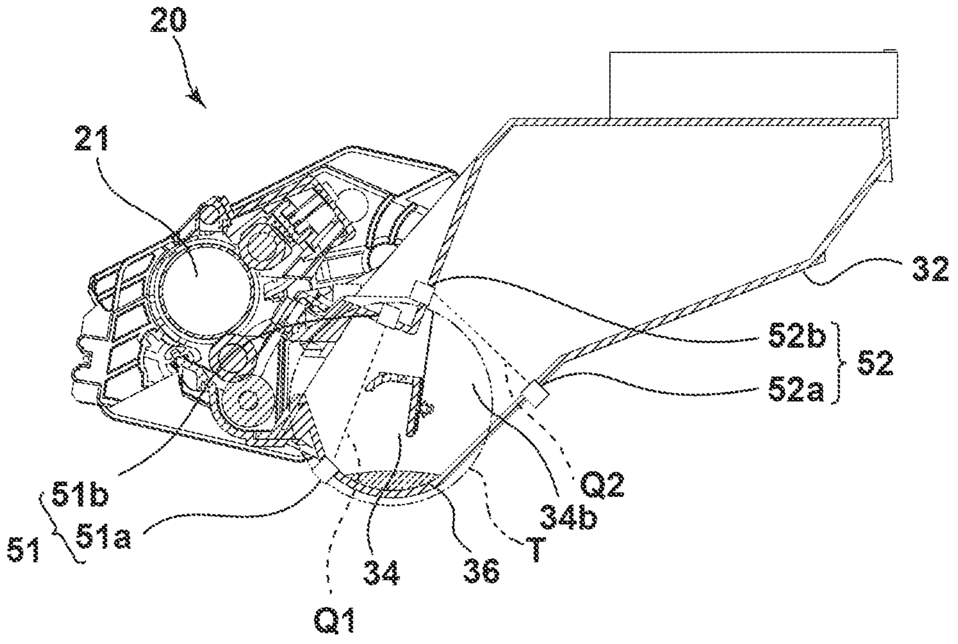
FIG. 11A is a cross-sectional view illustrating a developing container with a low remaining toner amount.

Thus, when the remaining toner amount is high, the light path Q1 is more likely to be blocked by the toner, therefore, the amount of time that the light receiving unit 51*b* receives light is shorter and the intensity of light received by the light receiving unit 51*b* is lower. Conversely, when the remaining toner amount is low, the amount of time that the light receiving unit 51*b* is receiving light is longer and the intensity of light received by the light receiving unit 51*b* is higher. Hence, the control unit 90 is able to determine whether the remaining toner amount is a low level or a middle level, as described later, based on the light-receiving time and the received light intensity of the light receiving unit 51*b* as described above. For example, as illustrated in FIG. 11A, if the amount of toner in the transfer chamber 36 of the developing container 32 is very low, the remaining toner amount is determined to be a low level. Also, in the above explanation, the second remaining toner amount sensor 52 is arranged so that it does not intersect with the rotational locus T of the stirring member 34, however, it may be arranged similarly to the previously-described first remaining toner amount sensor 51 so that it intersects with the rotational locus T of the stirring member 34.

Figure 11B:
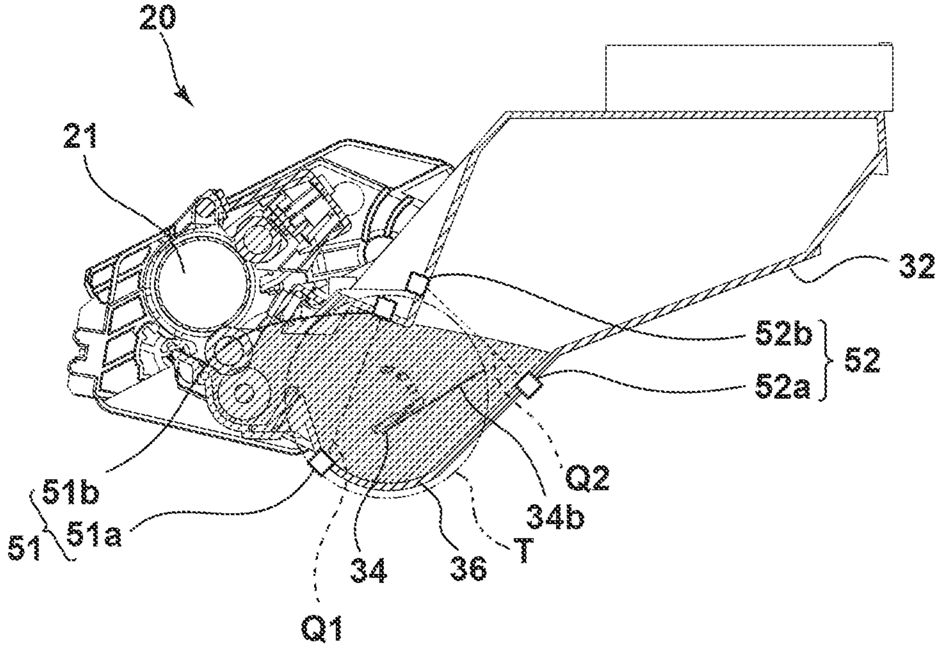
FIG. 11B is a cross-sectional view illustrating a developing container with a high remaining toner amount.

Also, the light path Q2 of the second remaining toner amount sensor 52 is set to be above the rotational locus T so as not to intersect with the rotational locus T of the stirring member 34. Then, in the case where the light path Q2 is blocked by the toner, the light receiving unit 52*b* of the second remaining toner amount sensor 52 does not detect light from the light emitting unit 52*a*, and in the case where the light path Q2 is not blocked by the toner, the light receiving unit 52*b* detects light from the light emitting unit 52*a*. Hence, the control unit 90 determines, as described later, whether the remaining toner amount is a full level based on whether or not the light receiving unit 52*b* received light or not irrespective of the rotation operation of the stirring member 34. For example, as illustrated in FIG. 11B, the remaining toner amount is determined to be a full level in the case where the toner in the transfer chamber 36 of the developing container 32 is very high since the light emitted to the light receiving unit 52*b* is blocked by the toner. Also, in the above explanation, the second remaining toner amount sensor 52 is arranged so that it does not intersect with the rotational locus T of the stirring member 34, however, it may be arranged similarly to the previously-described first remaining toner amount sensor 51 so that it intersects with the rotational locus T of the stirring member 34. Then, the remaining toner amount informing indicating the remaining toner amount predicted/calculated by the control unit 90 is stored to the non-volatile memory 93 by the control unit 90.

Additionally, the detection/estimation method for the remaining toner amount is not limited to the method of detecting the remaining toner amount with light as described in FIG. 9 and a variety of known methods may be adopted as a method for detection/estimation of the remaining toner amount. For example, two or more metal plates or conductive resin sheets extending in the lengthwise direction of the developing roller may be arranged on an inner wall of the developing container 32 which serves as a frame, and a static capacitance between the two metal plates or conductive resin sheets may be measured to detect/estimate the remaining toner amount. Alternatively, a load cell may be arranged in a form which supports the developing apparatus 30 from the bottom, and the CPU 91 may calculate the remaining toner amount by subtracting the weight of the developing apparatus 30 when the toner is empty from a weight measured by the load cell. Also, the first remaining toner amount sensor 51 may be omitted and the control unit 90 (the CPU 91) may calculate the remaining toner amount from the detection result of the second remaining toner amount sensor 52 and the status of emission of the laser beam.

[Image Forming Apparatus Control System]

Figure 12:
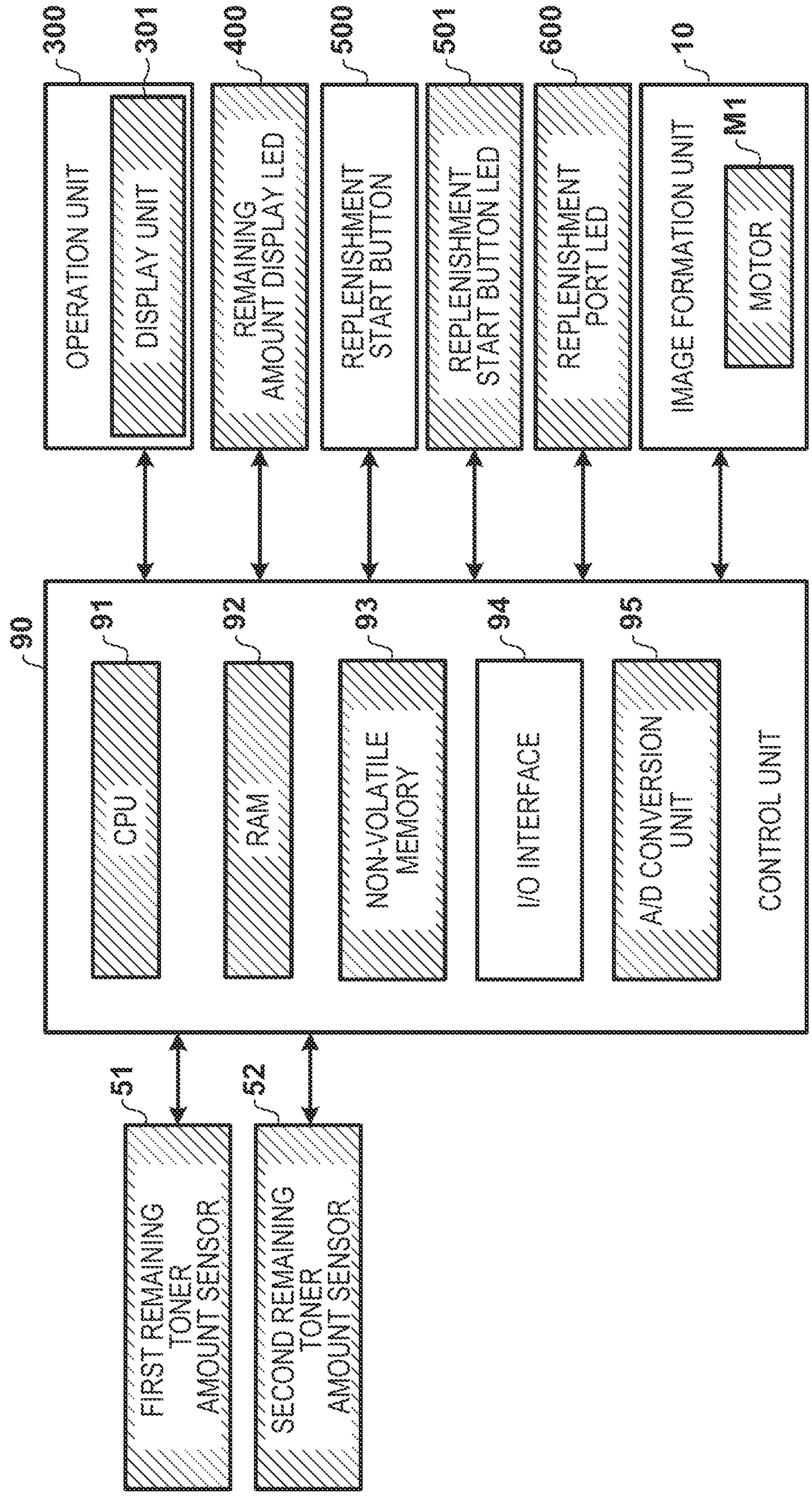
FIG. 12 is a block diagram illustrating a control system of the image forming apparatus.

FIG. 12 is a block diagram illustrating a control system of the image forming apparatus 1. The control unit 90 of the image forming apparatus 1 comprises the CPU 91 which serves as a computation apparatus, a RAM 92 which is used as a working region of the CPU 91, and the non-volatile memory 93 which stores various kinds of programs. Also, the control unit 90 comprises an I/O interface 94 which serves as an input/output port that is connected with an external device and the A/D conversion unit 95 which converts an analog signal into a digital signal.

The first remaining toner amount sensor 51 and the second remaining toner amount sensor 52 are connected to an input side of the control unit 90 and the remaining amount information is read by the control unit 90 as necessary.

Also, the operation unit 300, the image forming unit 10, a remaining amount display LED 400, a replenishment start button 500, a replenishment start button LED 501, and a replenishment port LED 600 are connected to the control unit 90. The operation unit 300 comprises a display unit 301 enabled to display various setting screens, physical keys, and the like. The display unit 301 comprises a liquid crystal panel, for example.

The remaining amount display LED 400 functions as a notification unit that displays information related to the remaining toner amount in the developing container 32. The replenishment start button 500 (refer to FIGS. 1B and 2B) is to be pressed after mounting the toner pack 40 to the replenishment port 32*a* when the user is replenishing the developing container 32 with toner. The replenishment start button LED 501 (refer to FIGS. 1B and 2B) is for notifying the position of the replenishment start button 500 to the user. The replenishment port LED 600 (refer to FIGS. 1B and 2B) is for notifying the position of the opening/closing component 83 to the user, in other words, notifying the position of the mounting unit 57 to the user. The image forming unit 10 comprises a motor M1 which serves as a driving source for driving the photosensitive drum 21, the developing roller 31, the supply roller 33, the stirring member 34, and such. Additionally, a configuration may be taken so that the photosensitive drum 21, the developing roller 31, the supply roller 33, and the stirring member 34 may be driven by a separate motor.

Next, a sleep mode of the present embodiment will be explained in detail. In the present embodiment, the image forming apparatus switches to the sleep mode if an operation of the image forming apparatus is not performed for a predetermined amount of elapsed time. Also, the preset amount of elapsed time before switching to the sleep mode may be changed as necessary, and the elapsed time may be set from a host computer or the operation unit 300. Also, a switch to the sleep mode may be performed via the host computer or the I/O interface 94 rather than after the predetermined elapsed time. The shaded functional blocks in FIG. 12 indicate the functional blocks whose power supply will be stopped or whose power will be supplied but operation will be stopped during the sleep mode.

Next, recovery processing from the sleep mode will be explained. A request to interrupt the CPU 91 whose operation is stopped will be generated when the image forming apparatus is in the sleep mode. This interruption request is generated by one of the interruption signals: a recovery signal from the operation unit 300 illustrated in FIG. 12 or a recovery signal from the replenishment start button 500. This interruption signal is inputted to the CPU 91 via the I/O interface 94.

The CPU 91 starts an oscillation operation when the interruption request is generated based on an interruption signal. After the oscillation operation of the CPU 91 has stabilized, an interruption cause will be checked via the I/O interface 94. Note that in the present embodiment, the operation of CPU 91 is stopped in the sleep mode. However, rather than stopping the operation of the CPU 91, an operating frequency of the CPU 91 may be lowered.

The remaining amount display LED 400 as illustrated in FIGS. 1B and 21A to 21C is arranged on the front right side of a casing of the printer main body 100, in other words, on an opposite side from the operation unit 300 which is arranged on the left side, and displays information related to the remaining toner amount in the developing container 32. In the present embodiment, the remaining amount display LED 400 is a panel member comprising a plurality (three in the present embodiment) of graduations arranged close together vertically and each graduation corresponds to the foregoing low level, middle level, and full level.

Figure 21A:
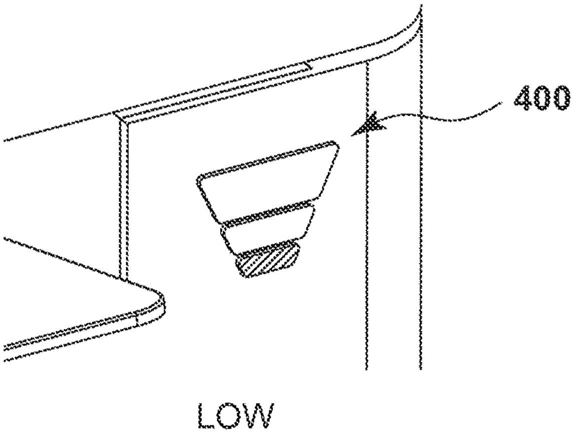
FIGS. 21A to 21C are perspective views illustrating a remaining amount display LED for each remaining toner amount.
Figure 21B:
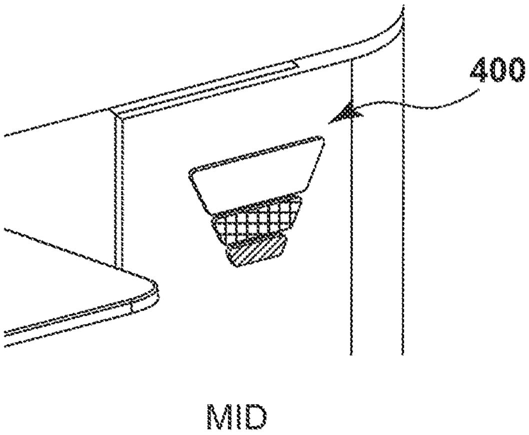
Figure 21C:
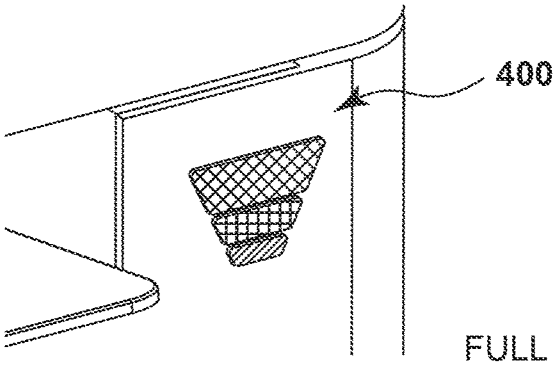

In other words, as illustrated in FIG. 21A, a case where only the lower graduation is lit is an indication that the remaining toner amount in the developing container 32 is at a low level. As illustrated in FIG. 21B, a case where the lower and middle graduations are lit and the upper graduation is off is an indication that the remaining toner amount in the developing container 32 is the middle level. As illustrated in FIG. 21C, a case where all three of the graduations are lit is an indication that the remaining toner amount in the developing container 32 is at the full level. Note that the remaining toner amount may be configured to be notified by a liquid crystal panel or the like in place of the remaining amount display LED 400. Also, although the examples illustrated in FIGS. 21A to 21C are explained as the notification unit for indicating the remaining toner amount, limitation is not made to this. For example, the display in FIG. 21A may be made to indicate that a toner replenishment is necessary, the display in FIG. 21B may be made to indicate that a toner replenishment is not necessary, and the display in FIG. 21C may be made to indicate that a toner replenishment has been performed sufficiently.

Also, as for how to display the remaining amount display LED 400, the middle level display may be made to indicate that a replenishment from a single toner pack 40 has been made and that another replenishment from the toner pack 40 could be made, and the full level may be made to indicate that a replenishment from two toner packs 40 has been made and that no additional replenishment of toner from the toner pack 40 may be made.

[Toner Replenishment Processing]

Figure 13:
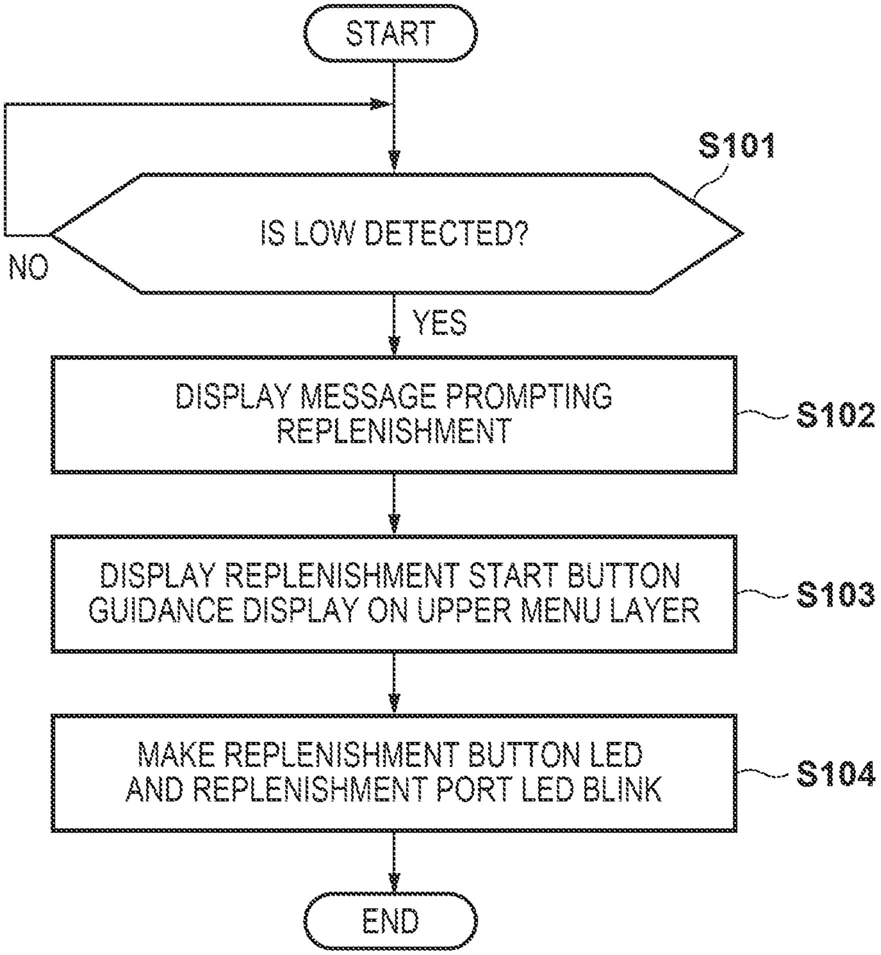
FIG. 13 is a flowchart illustrating low toner notification processing.

Next, toner replenishment processing in which the toner in the toner pack 40 replenishes the developing container 32 will be explained. First, processing related to notifying a user when the toner replenishment is necessary will be explained using FIG. 13. As illustrated in FIG. 13, the control unit 90 determines (step S101) whether the remaining toner amount is at a low level based on the detection result of the first remaining toner amount sensor 51. In a case (step S101; yes) where the remaining toner amount is at a low level, the control unit 90 displays a message on the display unit 301 prompting (step S102) the user to replenish the toner. A display example of a message is illustrated in FIG. 19A.

Figure 14:
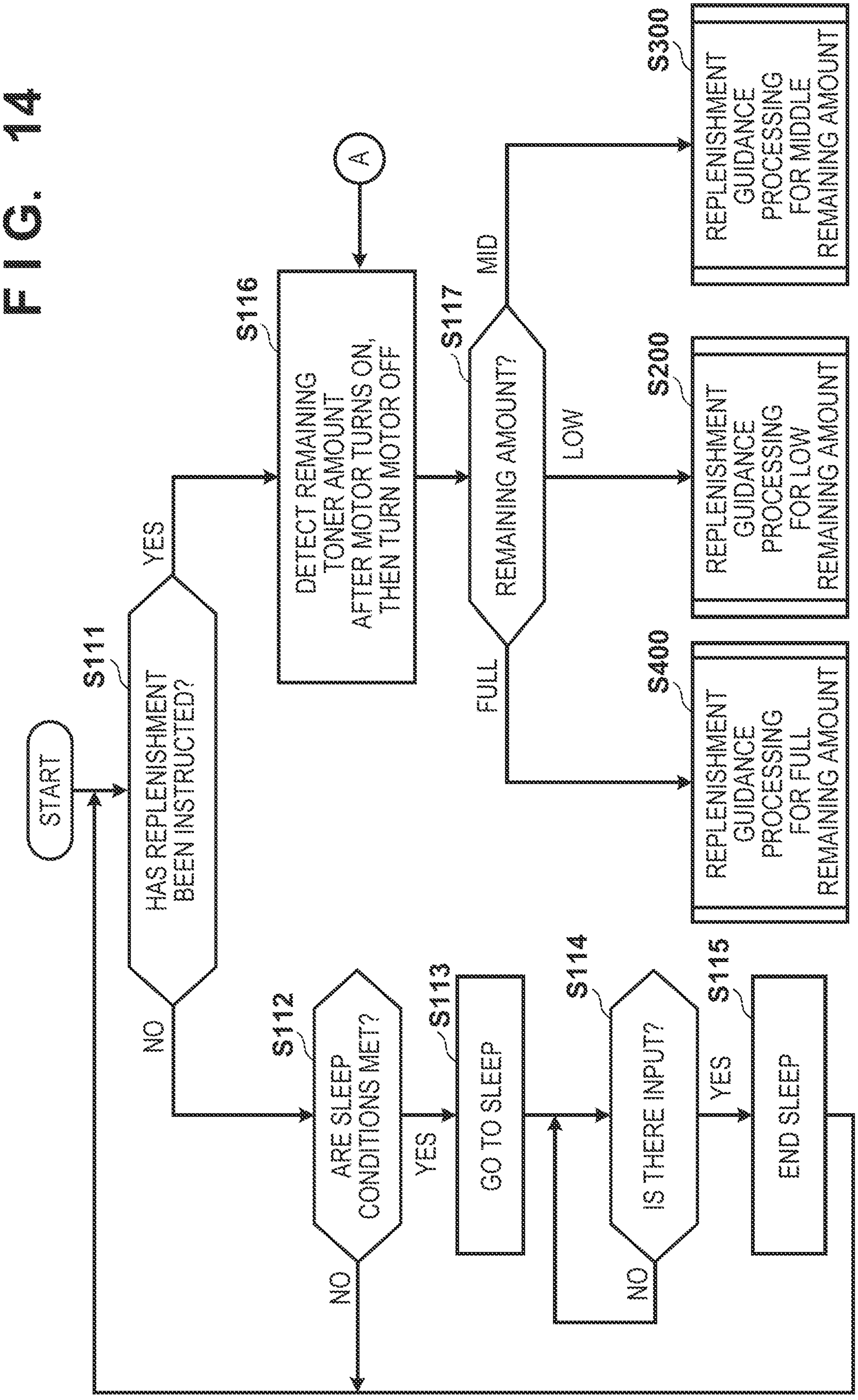
FIG. 14 is a flowchart illustrating replenishment guidance processing.
Figure 20:
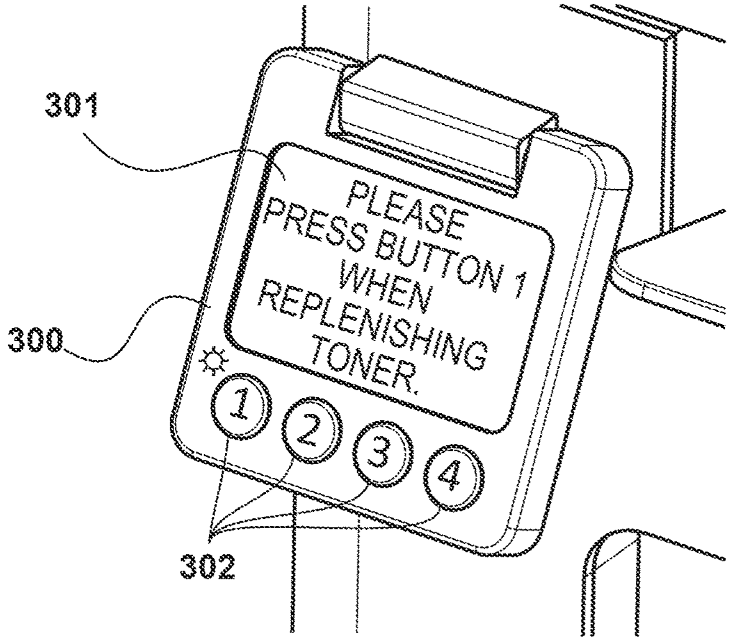
FIG. 20 is a diagram illustrating a guidance display displayed in an upper menu layer.

Next, the control unit 90 displays (step S103) a guidance display for a button 1 (a replenishment start button) on the display unit 301 in a higher menu layer than a normal case. A display example of that is illustrated in FIG. 20. Note that the normal case corresponds to a case where a low level is not detected for the remaining toner amount, and in the normal case, a similar guide screen is displayed in a lower layer than in a case where a low level is detected for the remaining toner amount. Also a change to display message in a lower layer is performed by a user operation of buttons 302 illustrated in FIG. 20. Also, the highest layer is the most suitable as the upper menu layer. Also, the control unit 90 makes (step S104) the replenishment start button LED 501, the LED of the button 1 (the replenishment start button) on the operation unit 300, and the replenishment port LED 600 blink. Then, the control unit 90 executes the replenishment guidance processing illustrated in FIG. 14. The processing of FIG. 14 is explained below.

First, the control unit 90 determines (step S111) whether an instruction was made to replenish the toner. A replenishment instruction corresponds to when the button 1 on the operation unit 300 is pressed or when the replenishment start button 500 is pressed. Note that a configuration may be taken so that the replenishment start button 500 is not arranged and the replenishment processing is started only with the button 1 on the operation unit 300. In this case, it is not necessary to arrange the replenishment start button LED 501. Conversely, a configuration may be taken so that the replenishment processing is started only with the replenishment start button 500.

In a case (step S111; no) where there was no replenishment instruction, the control unit 90 determines (step S112) whether conditions to transition to the sleep mode is met. In a case (step S112; no) where the conditions to transition to the sleep mode are not met, the control unit 90 determines (return to step S111) whether there was a replenishment instruction. In a case (step S112; yes) where the conditions to transition to the sleep mode are met, the control unit 90 transitions (step S113) to the sleep mode. After transitioning to the sleep mode, the control unit 90 determines (step S114) whether a signal for a recovery operation has been inputted. Here, a recovery operation is, for example, when the button 1 (the replenishment start button) on the operation unit 300 is pressed. Once a signal for a recovery operation is inputted, the control unit 90 causes (step S115) the apparatus to recover from the sleep mode, then determines (return to step S111) whether there was a replenishment instruction.

On the other hand, in a case (step S111; yes) there is a replenishment instruction by the button 1 or the replenishment start button 500 on the operation unit 300 being pressed, the control unit 90, after starting up the motor M1, detects the remaining toner amount using the first remaining toner amount sensor 51 and the second remaining toner amount sensor 52, then stops (step S116) the motor M1. This step S116 processing may be omitted, and in that case, the control unit 90 refers to the latest remaining toner amount information stored in the non-volatile memory 93. The control unit 90 classifies (step S117) the detected remaining toner amount information in three stages: low, middle, and full.

In a case (step S117; mid) where the information of the remaining toner amount is middle, the control unit 90 executes (step S300) "replenishment guidance processing for a middle remaining amount" processing later described. In a case (step S117; full) where the remaining amount information is full, the control unit 90 executes (step S400) "replenishment guidance processing for a full remaining amount" processing later described. In a case (step S117; low) where the remaining amount information is low, the control unit 90 executes (step S200) "replenishment guidance processing for a low remaining amount" processing later described.

[Replenishment Guidance Processing for a Low Remaining Amount]

Next, guidance display control related to toner replenishment for a case illustrated in FIG. 15 where the remaining amount is low will be explained. First, the control unit 90 starts a timer Ta (step S201). Next, the control unit 90 causes the display unit 301 to display (step S202) a message prompting a user operation to facilitate the transferring of toner to the developing container 32. An example of a message is illustrated in FIG. 19B. Then, the control unit 90 executes (step S221) a motor control sequence 1 described later simultaneously with processing in FIG. 15 described below. First, explanation of the processing of FIG. 15 will be continued. The control unit 90 determines (step S203) whether the remaining amount has changed to the middle level based on the detection result of the first remaining toner amount sensor 51. That is, if the user successfully mounts the toner pack 40 to the mounting unit 57 and rotates 180 degrees to open the shutter component 41, the toner stored in the toner pack 40 falls downward due to its own weight and the remaining amount increases to the middle level.

In a case where the remaining amount changes (step S203; yes) to the middle level, the control unit 90 updates the display style of the remaining amount display LED 400 to middle, then displays (step S204) a replenishment progress message, as illustrated on FIG. 19C, on the display unit 301. The message illustrated in FIG. 19C is a message for notifying that the replenishment is being performed successfully.

On the other hand, in a case (step S203; no) where the remaining amount does not change from the low level to the middle level, the control unit 90 determines (step S205) whether the timer Ta has become larger than a threshold value t0. The threshold value t0 is a preset value and, as explained later in FIG. 24, is set to a sufficient amount of time for the remaining toner amount to change from the low level to the middle level, and therefore, the amount of time is set to be relatively short.

In a case where the timer Ta is larger (step S205; yes) than the threshold value t0, the control unit 90 displays (step S210) a message illustrated in FIG. 19F on the display unit 301 as a replenishment complete confirmation message. The replenishment complete confirmation message is a message to get the user to input whether or not to end the replenishment processing. Additionally, in a case where the control unit 90 determines "yes" in step S205, the control unit 90 may cause, for example, a message illustrated in FIG. 19G prompting the user to mount the toner replenishment container to be displayed for a predetermined time on the display unit 301, and then transition the processing to step S210.

On the other hand, in a case (step S205; no) where the timer Ta has not exceeded the threshold t0, the control unit 90 determines (step S203) again whether the remaining amount has changed to the middle level based on the detection result of the first remaining toner amount sensor 51.

After step S204, the control unit 90 determines (step S206) whether the remaining amount has reached the full level based on the detection result by the second remaining toner amount sensor 52. In a case where the remaining amount changes (step S206; yes) to the full level, the control unit 90 updates the display style of the remaining amount display LED 400 to full, then displays (step S207) a message illustrated in FIG. 19D, as a replenishment completion message, on the display unit 301. The replenishment completion message is a message to notify that the remaining amount has reached full, in other words, that the replenishment is complete. Then, the control unit 90 starts up the timer Tb, and determines (step S209) whether the timer Tb is greater than the threshold value t2. The threshold value t2 is a preset value and is set to a sufficient amount of time for the toner pack 40 to become empty from when the remaining toner amount turns to the full level. In a case where the timer Tb is larger than the threshold value t2, the control unit 90 displays (step S212) a message illustrated in FIG. 19E on the display unit 301 as a removal prompting message. The removal prompting message is a message prompting the user to remove the toner pack 40 mounted on the mounting unit 57. Then, the control unit 90 makes (step S214) the replenishment port LED 600 blink for a duration of a predetermined time.

Meanwhile, in a case (step S206; no) where the remaining toner amount has not changed to a full level, the control unit 90 determines (step S208) whether the timer Ta has exceeded the threshold value t1. The threshold value t1 is set to an amount of time greater than the amount of time required for replenishing the entire toner amount (the amount of developer) stored in the toner pack 40. Also, in a case where the user mounts a toner pack 40 storing only a small amount of toner compared to what is normal onto the mounting unit 57, the control unit 90 may determine "no" in step S206. In a case (step S208; no) where the timer Ta has not exceeded the threshold t1, the control unit 90 determines (step S206) again whether the remaining amount has changed to the full level based on the detection result of the second remaining toner amount sensor 52. Meanwhile, in a case where the timer Ta exceeds (step S208; yes) the threshold value t1, the control unit 90 displays (step S210) a message illustrated in FIG. 19F on the display unit 301 as the replenishment complete confirmation message.

The control unit 90, after displaying the message illustrated in FIG. 19F, determines (step S211) whether the user, in response to the message, inputted the button 1, in other words, ends replenishment, or inputted a button 2, in other words, continues the replenishment processing. In the case (step S211; yes) where the user presses the button 1 and its signal is inputted, the control unit 90 displays (step S212) a message illustrated in FIG. 19E on the display unit 301 as the removal prompting message. Additionally, in a case where no button operation is made by the user for a predetermined amount of time, the control unit 90 may determine "yes" in step S211. Then, the replenishment port LED 600 will be turned on (step S214) for a predetermined amount of time prompting the user to remove the toner pack 40.

On the other hand, in a case (step 211; no) where the user presses the button 2 and that signal is inputted, the control unit 90 displays (step S213) a message illustrated in FIG. 19G on the display unit 301 as a remounting confirmation message of the toner pack 40. The remounting confirmation message is a message prompting the user to confirm that the toner pack 40 is mounted to the mounting unit 57. Then, the processing is returned to step S116 in FIG. 14 to execute the toner replenishment processing again.

[Replenishment Guidance Processing for Middle Remaining Amount]

Next, guidance display control related to toner replenishment for a case illustrated in FIG. 16 where the remaining amount is middle will be explained. First, the control unit 90 starts up (step S301) the timer Ta and displays (step S302), similarly to step S202, the message illustrated in FIG. 19B. Then, the control unit 90 executes (step 351) a motor control sequence 2 described later. Also, the control unit 90 executes the processing explained below simultaneously with this motor control sequence 2. First, the control unit 90 determines (step S303) whether the toner amount changed to the full level based on the detection result of the second remaining toner amount sensor 52.

In a case where the remaining amount changes (step S303; yes) to the full level, the control unit 90 updates the display style of the remaining amount display LED 400 to full, then displays (step S304) a message illustrated in FIG. 19D, as a replenishment completion message, on the display unit 301. Then, the control unit 90 starts up the timer Tb, and determines (step S308) whether the timer Tb is greater than the threshold value t3. The threshold value t3 is a preset value and is set to a sufficient amount of time for the toner pack 40 to become empty from when the remaining toner amount turns to the full level. In a case where the timer Tb is larger than the threshold value t3, the control unit 90 displays (step S309) the message illustrated in FIG. 19E on the display unit 301 as a removal prompting message. Then, the control unit 90 makes (step S311) the replenishment port LED 600 blink for a duration of a predetermined time.

Here, the threshold value t3 is set to a longer time than the threshold value t2. This is because in the processing in FIG. 16, the remaining toner amount in the developing container 32 is the middle level when the toner pack 40 is mounted, and the amount of toner remaining in the toner pack 40 when the remaining toner amount in the container reaches full is greater than the amount of toner remaining in the toner pack 40 when the remaining toner amount in the container reaches full in the processing in FIG. 15. A flexible response to these kinds of situations becomes possible by setting a longer time for the threshold value t3 than the threshold value t2.

Meanwhile, in a case (step S303; no) where the remaining amount has not changed to the full level, the control unit 90 determines (step S305) whether the timer Ta has exceeded the threshold value t4. The threshold value t4 is a preset value and sets the amount of time it takes to change from the middle level to the full level. Therefore, the threshold value t4 is set to a shorter value than the threshold value t1. With this, an appropriate message can be outputted without having to make the user wait unnecessarily. Also, similarly to the case in step S205, in a case where the control unit 90 determines "yes" in step S305, the control unit 90 may be configured to display the message for a predetermined amount of time on the display unit 301 prompting the user to mount the toner replenishment container, then transition the processing to step S210.

In a case (step S305; no) where the timer Ta is not greater than the threshold value t4, the control unit 90 executes the determination in step S303 again. In a case (step S305; yes) where the timer Ta is greater than the threshold value t4, the control unit 90 executes the same processing as steps S210 to S214 in FIG. 15 in steps S306, S307, and S309 to S311.

[Replenishment Guidance Processing for a Full Remaining Amount]

Figure 17:
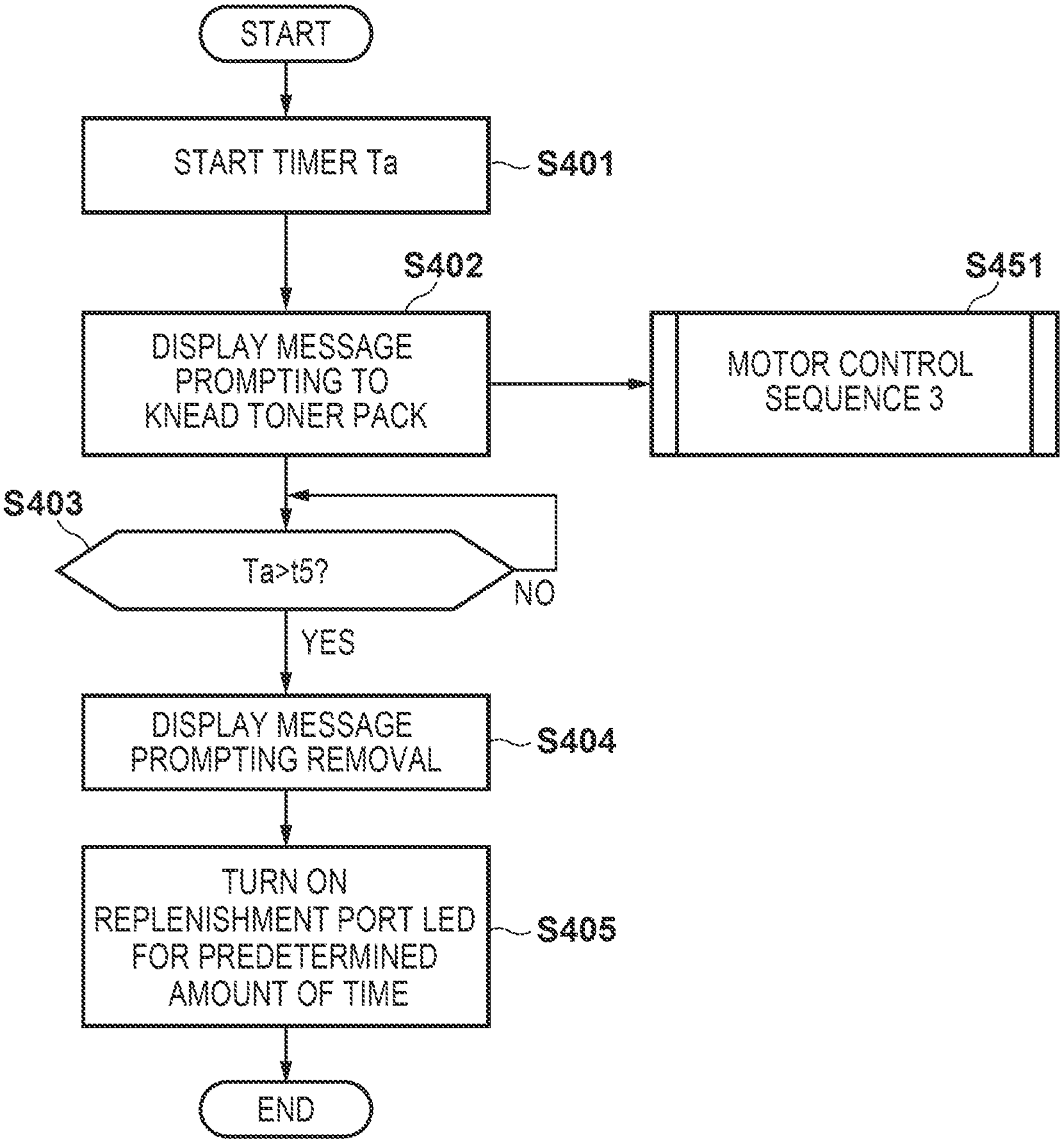
FIG. 17 is a flowchart illustrating replenishment guidance processing.

Next, guidance display control related to toner replenishment for a case illustrated in FIG. 17 where the remaining toner amount is full will be explained. First, the control unit 90 starts a timer Ta (step S401). Next, the control unit 90 displays (step S402) the message illustrated in FIG. 19B similarly to step S202.

Then, the control unit 90 executes (step 451) a motor control sequence 3. Also, simultaneously to this motor control sequence 3, the control unit 90 determines (step S403) whether the timer Ta is greater than the threshold value t5. The threshold value t5 is a preset value and is set based on the capacity of the process cartridge 20. A concept behind a setting of the threshold value t5 will be described later. In a case (step S403; yes) where the timer Ta is greater than the threshold value t5, the control unit 90 executes similar processing to steps S212 to S214 of the flowchart in FIG. 15 in steps S404 and S405.

As explained in the above with FIGS. 14 to 17, in the case where the replenishment instruction is confirmed, appropriate guidance control that corresponds to the remaining toner amount at that time will be performed, thereby enabling improvement of usability related to the toner replenishment.

More specifically, in the case where the low level is detected in step S117, although the level should immediately change to the middle level, the detection indicates otherwise, therefore, it can be notified to the user at an early stage that there was a deficiency in the replenishment operation. Also, in step S204, precise toner replenishment progress can be made known to the user.

Figure 15:
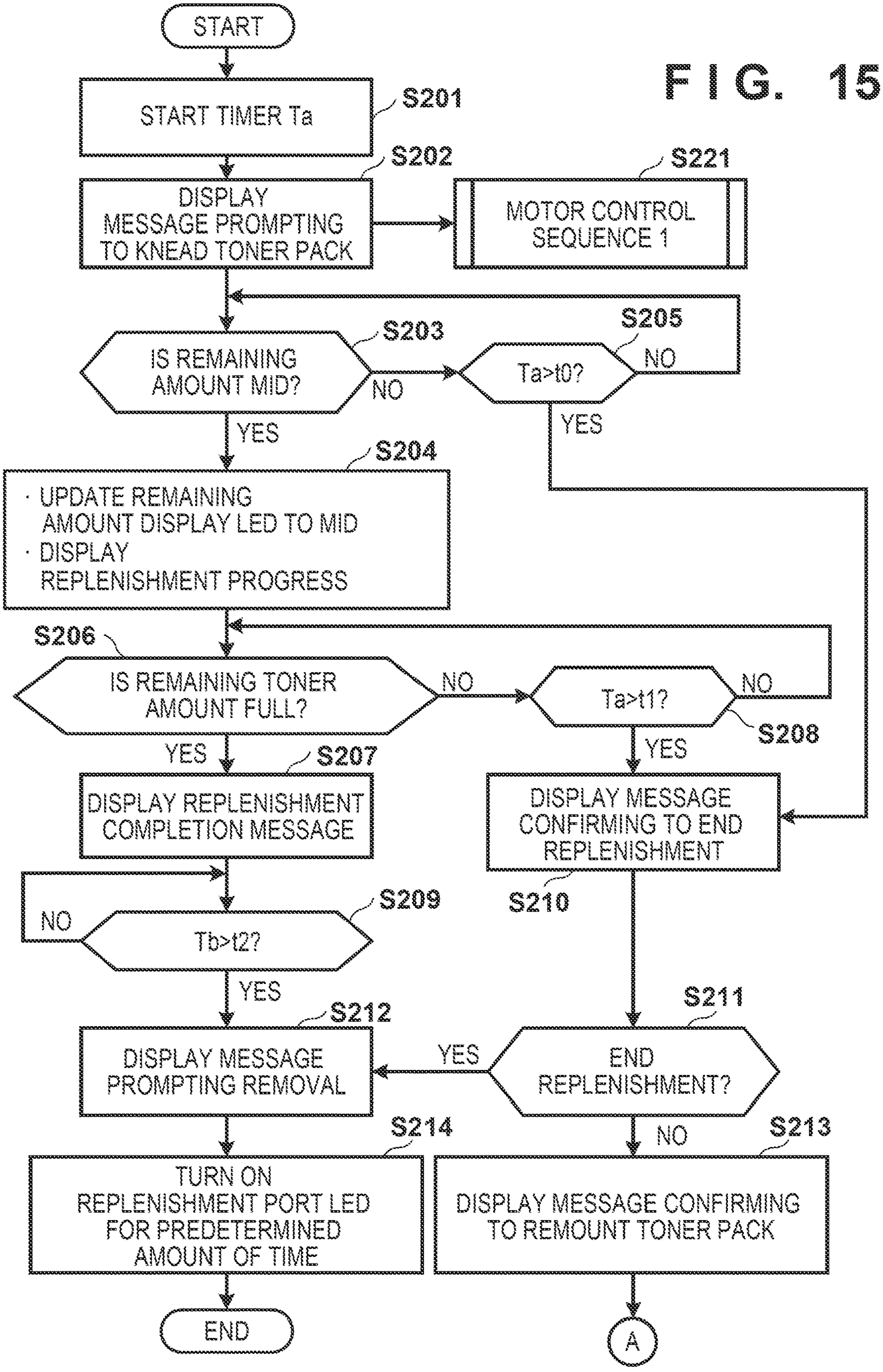
FIG. 15 is a flowchart illustrating replenishment guidance processing.
Figure 16:
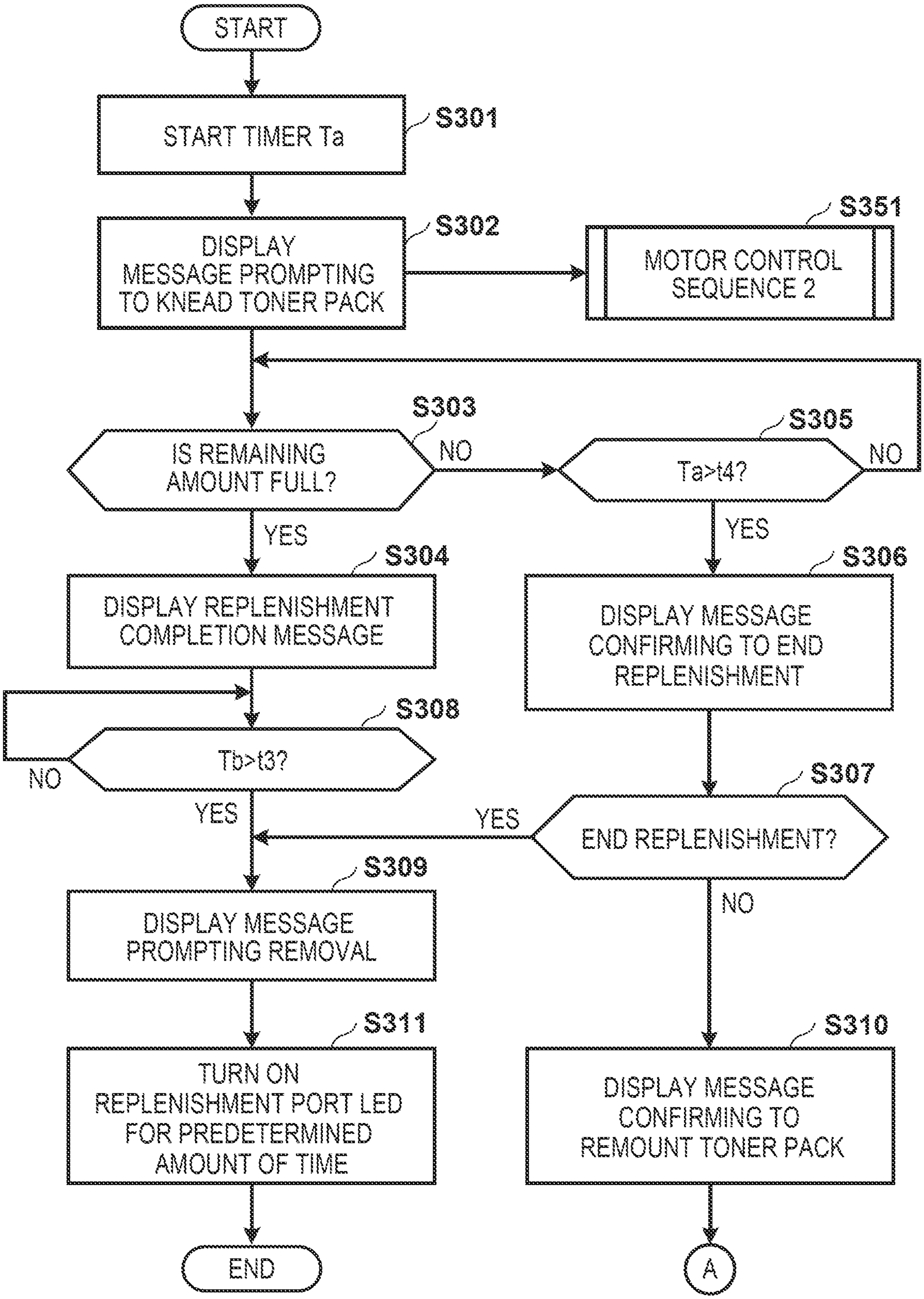
FIG. 16 is a flowchart illustrating replenishment guidance processing.

On the other hand, in a case where the middle level is detected in step S117, a message display timing, in step S306 in FIG. 16, has been changed with respect to FIG. 15, and therefore the deficiency in the replenishment operation can be notified to the user at an appropriate timing.

[Motor Control Sequence 1]

Figure 22A:
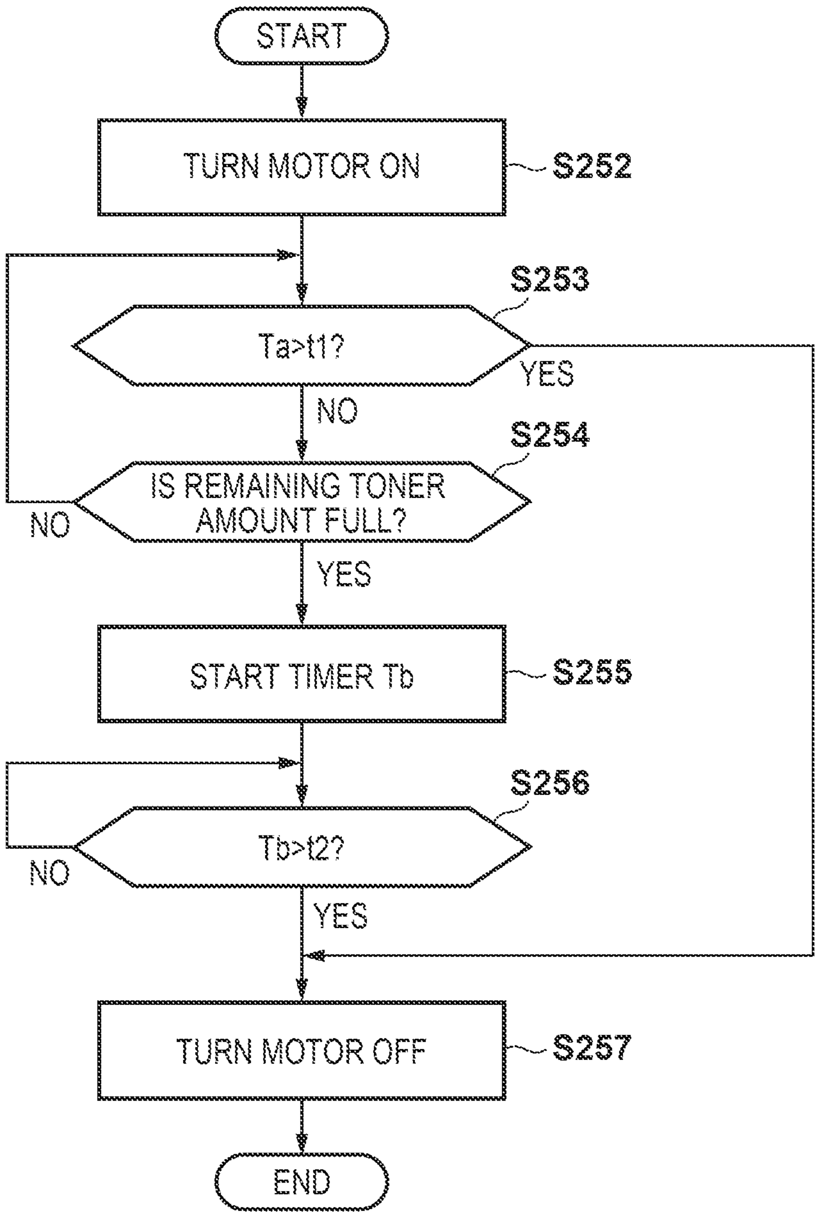
FIG. 22A is a flowchart for a motor control sequence.

Details regarding the motor control sequence 1 in step S221 in FIG. 15 will be explained using FIG. 22A. In the motor control sequence 1, the control unit 90 first starts up (step S252) the motor M1 which rotates the stirring member 34.

The control unit 90 determines (step S253) whether the timer Ta is greater than the threshold value t1. The threshold value t1 is as explained in the above flowchart. In a case (step S253; yes) where the timer Ta is greater than the threshold value t1, the control unit 90 stops (step S257) the motor M1 and ends the processing. On the other hand, in a case (step S253; no) where the timer Ta is not larger than the threshold t1, the control unit 90 determines (step S254) whether the remaining toner amount has changed to the full level based on the detection result of the second remaining toner amount sensor 52. In a case (step S254; no) where the remaining amount has not changed to a full level, the control unit 90 executes the step S253 again. On the other hand, in a case (step S254; yes) where the remaining amount has changed to a full level, the control unit 90 starts up (step S255) the timer Tb and determines (step S256) whether the timer Tb is greater than the threshold value t2 (the first remaining stirring time). In a case (step S256; yes) where the timer Tb is greater than the threshold value t2, the control unit 90 stops (step S257) the motor M1 and ends the processing.

To summarize, the control unit 90 starts up the motor M1 and drives the stirring member 34 in the motor control sequence 1. Additionally, in a case where the remaining amount does not become full, the stirring member 34 will be driven for an amount of time corresponding to the threshold value t1. On the other hand, in a case where the remaining amount has become full, the stirring member 34 will be driven from when the remaining amount has become full until an amount of time corresponding to the threshold value t2 elapses.

[Motor Control Sequence 2]

Figure 22B:
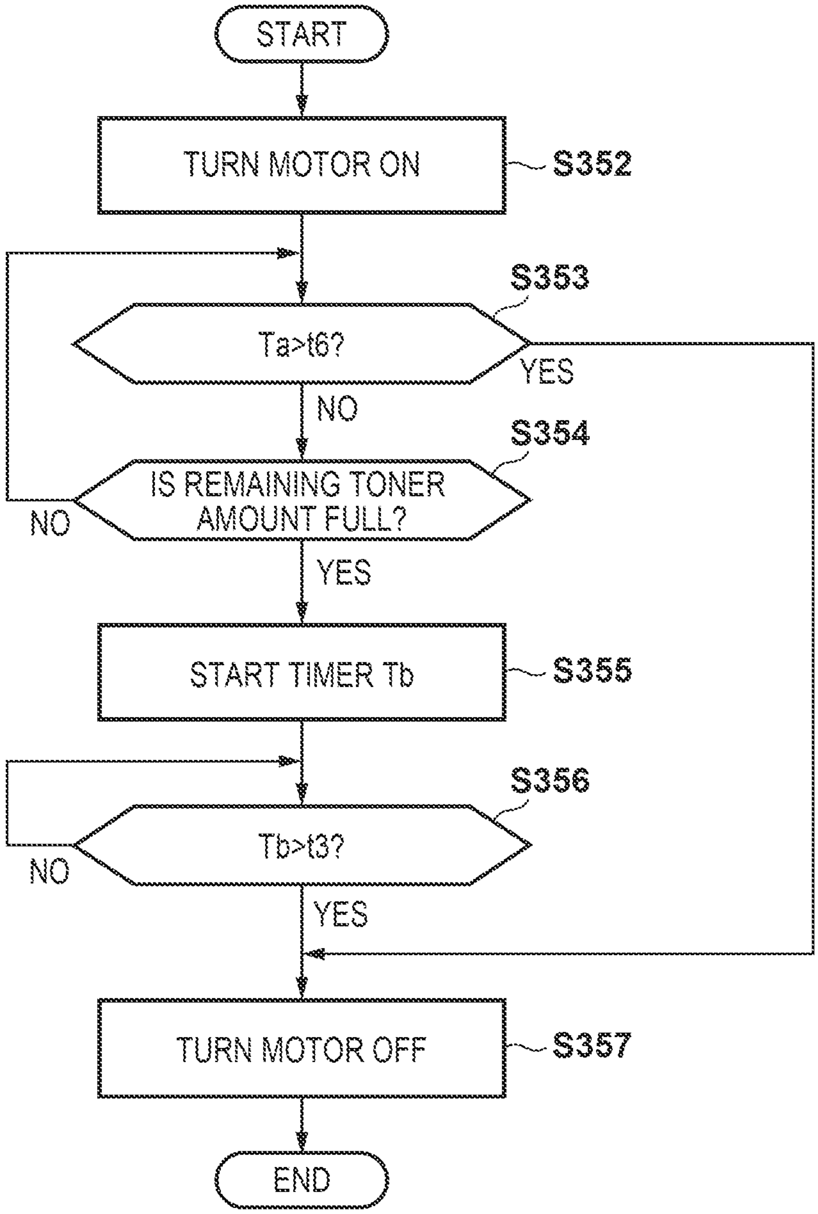
FIG. 22B is a flowchart for a motor control sequence.

Details regarding the motor control sequence 2 in step S351 in FIG. 16 will be explained using FIG. 22B. A difference from the motor control sequence 1 is that threshold values used in steps S353 and S356 are different. The threshold value t3 (a second remaining stirring time) is longer than the threshold value t2 (the first remaining stirring time). Also, the threshold value t6 is longer than the threshold value t1. Compared to the case in FIG. 22A, the total toner capacity after replenishment is higher, and therefore, the threshold value t6 is set to be longer than the threshold value t1. However, as long as a stirring function of the stirring member 34 is sufficient, the threshold value in step S353 may be made to be the same as the threshold value t1. Also, in FIG. 16, in a case where the remaining amount does not become full after the threshold value t4 has elapsed, then the replenishment complete confirmation message is displayed in step S306 and the user is made to input whether to end the replenishment processing. Also in the sequence in FIG. 22B, in a case the remaining amount does not become full after the threshold value t4 has elapsed, a configuration may be taken so that the motor M1 is stopped in step S357.

[Motor Control Sequence 3]

Figure 22C:
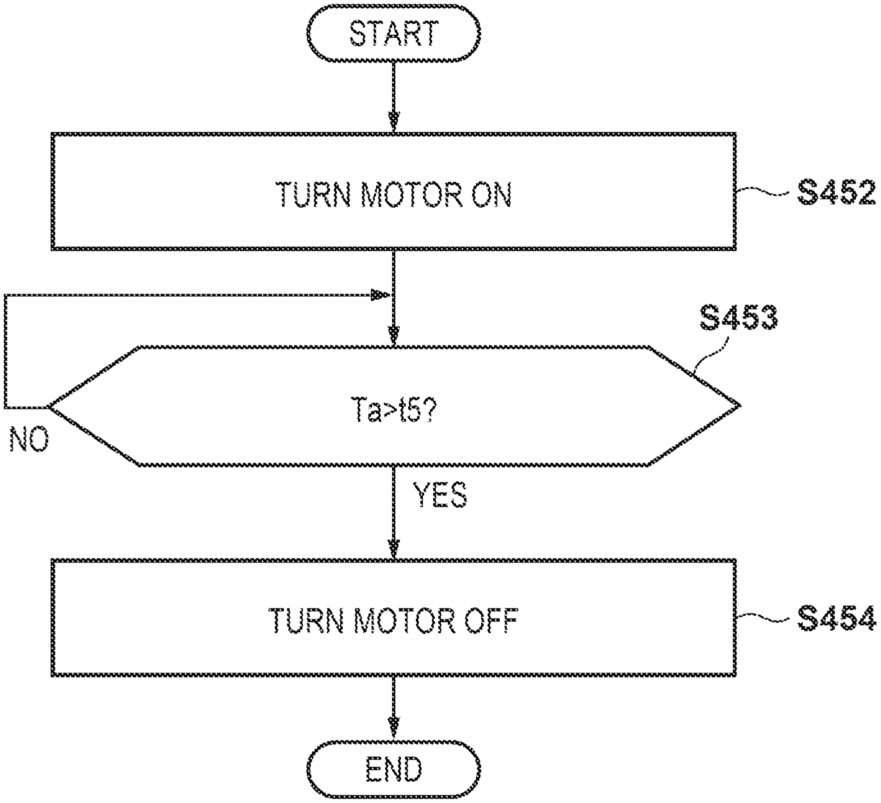
FIG. 22C is a flowchart for a motor control sequence.

Details regarding the motor control sequence 3 in step S451 in FIG. 17 will be explained using FIG. 22C. The control unit 90 first starts up (step S452) the motor M1 which rotates the stirring member 34. The control unit 90 waits (step S453) until the timer Ta is greater than the threshold value t5. The threshold value t5 is as explained in the above flowchart. In a case (step S454; yes) where the timer Ta is greater than the threshold value t5, the control unit 90 stops (step S454) the motor M1 and ends the processing. To summarize, the control unit 90 starts up the motor M1 and drives the stirring member 34 in the motor control sequence 3 for a duration corresponding to the threshold value t5.

[How Toner is Stirred]

Figure 23A:
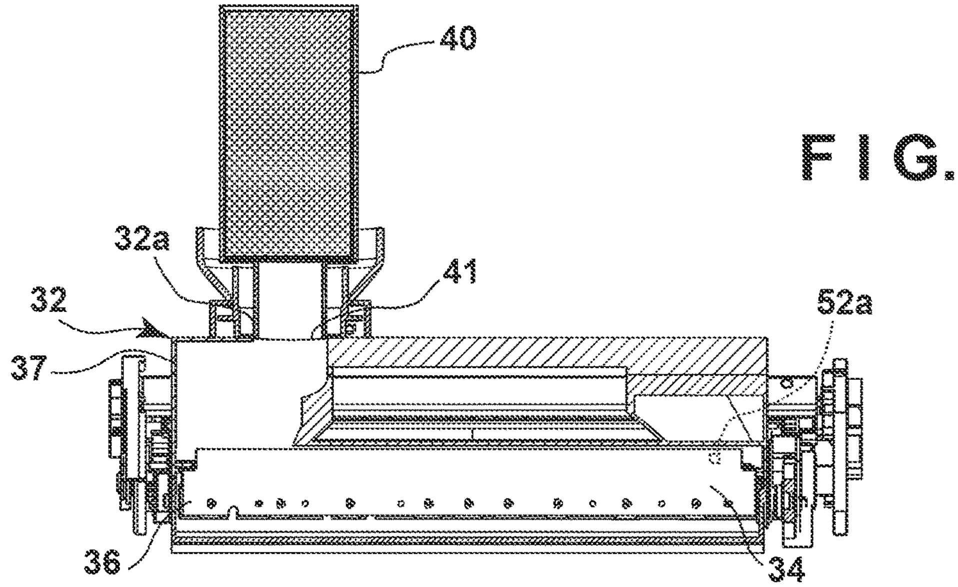
FIG. 23A is a cross-sectional view illustrating a toner pack attached to a replenishment port.

When the toner, in the toner replenishment processing described above, falls into the developing container 32 from the toner pack 40 as illustrated in FIG. 23A, the toner enters the transfer chamber 36 through the first protrusion 37. Because the replenishment port 32*a* and the first protrusion 37 are arranged at the end of a lengthwise direction of the developing container 32, the toner is supplied collectively at one end of the transfer chamber 36. In other words, the toner is supplied unevenly in the developing container 32.

Here, a case where the stirring member 34 is not rotating when the toner is supplied to the transfer chamber 36 is considered. If the stirring member 34 is not made to rotate in the transfer chamber 36 where the toner is stored, when the toner is made to drop from the toner pack 40 into the developing container 32, it requires time for the dropped toner to disperse throughout the entire length of the photosensitive drum 21. When this time becomes long, it will take time for the user who is performing the toner replenishment operation to confirm that the toner has been replenished into the transfer chamber 36, and usability will suffer.

Figure 23B:
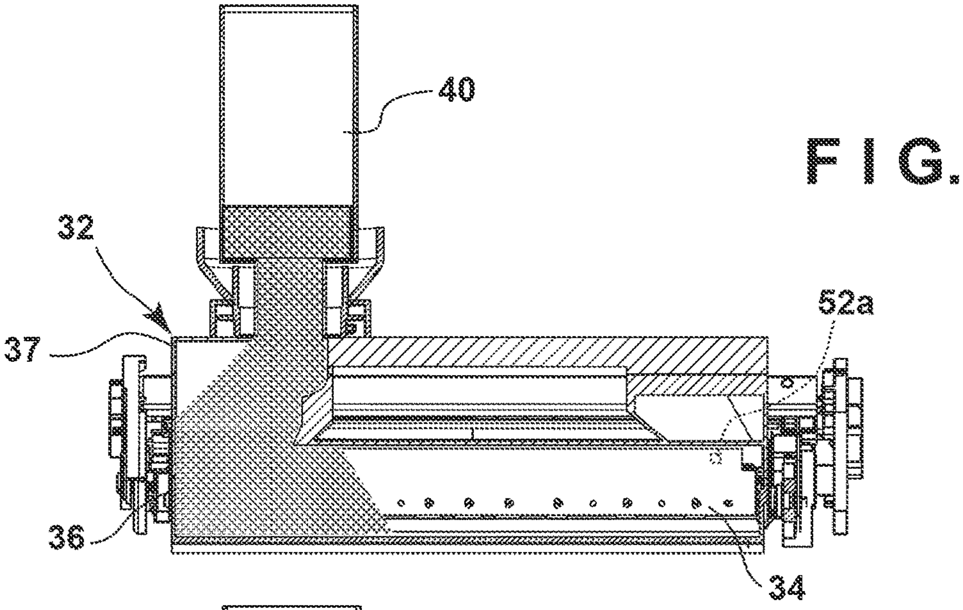
FIG. 23B is a cross-sectional view illustrating a state in which a flow of toner from the toner pack has started.
Figure 23C:
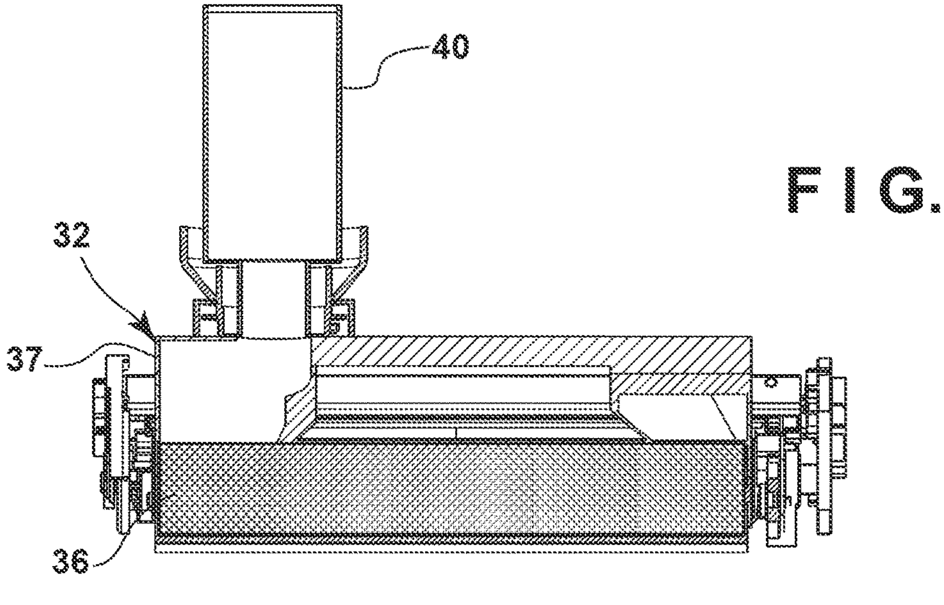
FIG. 23C is a cross-sectional view illustrating a state in which the developing container has been replenished with all of the toner from the toner pack.

Hence, in the present embodiment, the stirring member 34 is driven from when the replenishment starts in the toner replenishment processing. Note that the driving time is as explained using FIGS. 22A to 22C. With this, as illustrated in FIGS. 23B and 23C, the toner supplied from the toner pack 40 to one end of the developing container 32 is evened by the stirring member 34 at an early stage throughout the entire length of the lengthwise direction of the transfer chamber 36 of the developing container 32. Hence, the time it takes before the user confirms that the toner replenishment is performed is shortened, thereby usability can be improved. Also, because the toner stored in the developing container 32 is evened out, the accuracy for detecting the remaining toner amount information using the first remaining toner amount sensor 51 and the second remaining toner amount sensor 52 may be improved.

Cross-sectional views in FIGS. 23A to 23C illustrate the cross section 16A-16A in FIGS. 6A and 6B. FIGS. 23A and 23B illustrate that the light emitting unit 52*a* is arranged on the right end of the lengthwise direction of the photosensitive drum 21. The light receiving unit 51*b*, the light emitting unit 52*a*, and the light receiving unit 52*b* are assumed to be arranged in the same/roughly the same lengthwise position of the photosensitive drum 21. There may be a case where the sensor is placed as illustrated in FIGS. 23A and 23B due to a sensor arrangement constraint in the main body of the apparatus. Even in such a case, it is possible to achieve an improvement in usability such as those described above with the rotation of the stirring member 34 during toner replenishment.

[Regarding Threshold Values t0, t1, t4, and t5]

As described above, for the threshold value t0, a warning is issued in the case where the remaining toner amount does not change from the low level to the middle level. As described above, for the threshold value t4, a warning is issued in the case where the remaining toner amount does not change from the middle level to the full level. Also, the threshold value t1 is set to an amount of time greater than the amount of time required for replenishing the entire toner amount (the amount of developer) stored in the toner pack 40. Also, the threshold value 1, as explained in FIGS. 22A and 22B, corresponds to the driving time of the stirring member 34 when the remaining amount does not become full.

Figure 24C:
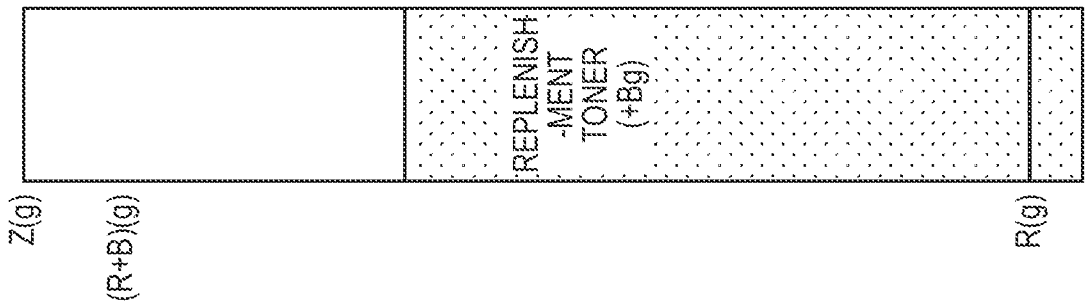
FIG. 24C is a graph illustrating a remaining toner amount for when toner is replenished from a large-volume toner pack.
Figure 24B:
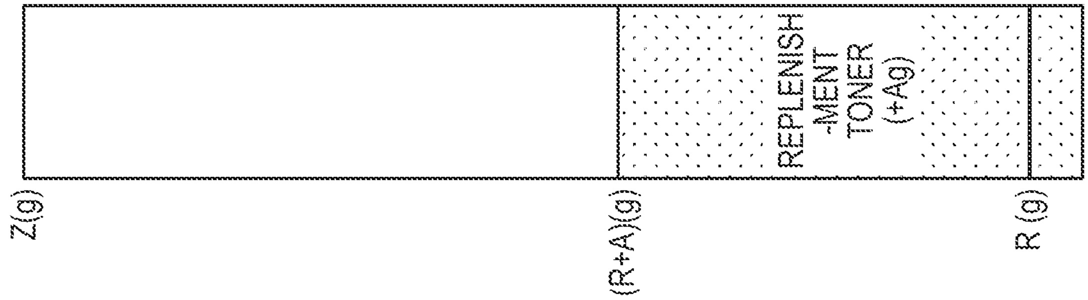
FIG. 24B is a graph illustrating a remaining toner amount for when toner is replenished from a small-volume toner pack.
Figure 24A:
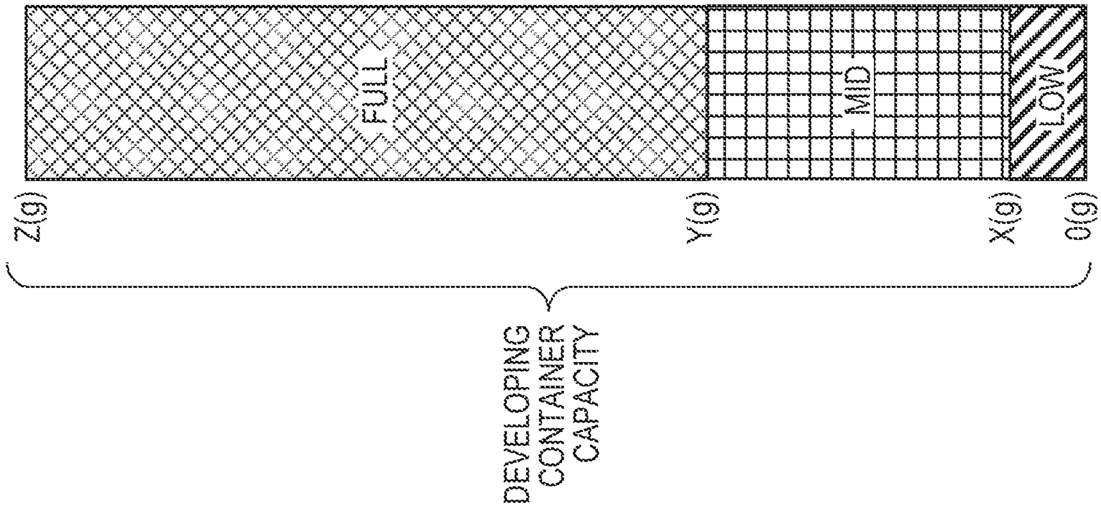
FIG. 24A is a graph illustrating a relationship between a capacity of a developing container and a level of a remaining toner amount.

As explained in FIG. 24A, the remaining toner amount is displayed as the middle level when the remaining toner amount is X[g] to Y[g]. However, since the toner replenishment can be performed at a timing that the user desires, if the toner replenishment is performed when the remaining toner amount is less than Y[g] and is close to Y[g], the remaining toner amount will immediately change from the middle level to the full level. On the other hand, if the toner replenishment is started when the remaining toner amount is greater than or equal to X[g] and is close to X[g], it will take a longer time to change from the middle level to a full level. The above is the reason t4 is set to be longer than t0. Also, the threshold value t1 is set to value larger than the threshold value t4 because it is an amount of time greater than the amount of time required for replenishing the entire toner amount (the amount of developer) stored in the toner pack 40.

Next, a concept behind the setting of the threshold value t5 will be described. The threshold value t5 is used in the case where the remaining toner amount is full in step S117 in FIG. 14, and as explained in FIG. 22C, the toner replenishment processing is performed for the amount of time corresponding to the threshold value t5. For example, the threshold value t5 is set to be small to prevent the toner from overflowing from the developing container 32 in a case where the detected remaining amount is full and the vacant capacity in the developing container 32 is small. Meanwhile, the threshold value t5 is set to be large to prevent a toner unbalance in the developing container 32 in a case where the detected remaining amount is full and the vacant capacity in the developing container 32 is large. As described, the threshold value t5 is set based on the vacant capacity in the developing container 32 when the detected remaining amount is full.

[Relationship Between Toner Amount Filled in Toner Pack 40 and Capacity of Developing Container 32]

Next, the relationship between the toner amount filled in the toner pack 40 and the capacity of the developing container 32 will be described. The developing container 32, as illustrated in FIG. 24A, is able to store Z[g] of toner. Additionally, in FIGS. 24A to 24C, amounts are expressed in grams (g), however, they may be converted into units indicating a volume such as milliliters (ml).

In a case where the toner stored in the developing container 32 is from 0[g] to less than X[g], the remaining amount display LED 400 will be the low level display based on the detection result of the first remaining toner amount sensor 51 and the second remaining toner amount sensor 52. X[g] corresponds to the second amount, and the amount of toner being from 0[g] to less than X[g] corresponds to the amount of toner being less than the second amount.

In a case where the toner stored in the developing container 32 is from X[g] to less than Y[g], the remaining amount display LED 400 will become the middle level display based on the detection result of the first remaining toner amount sensor 51 and the second remaining toner amount sensor 52. Y[g] corresponds to a first amount, and the amount of toner being from X[g] to less than Y[g] corresponds to the amount of toner being less than the first amount.

In a case where the toner stored in the developing container 32 is greater than or equal to Y[g], the remaining amount display LED 400 will become the full level display based on the detection result of the first remaining toner amount sensor 51 and the second remaining toner amount sensor 52. The amount of toner that is greater than or equal to Y[g] corresponds to the amount of toner that is greater than or equal to the first amount.

FIG. 24B is a graph illustrating the amount of toner in a case where the developing container 32 is replenished with toner from the toner pack 40 filled with A[g] of toner. FIG. 24C is a graph illustrating the amount of toner in a case where the developing container 32 is replenished with toner from the toner pack 40 filled with B[g] (>A) of toner. Also, there may be toner packs 40 products including a small-volume toner pack filled with A[g] of toner, a large-volume toner pack filled with B[g] of toner, or both. Also, the product lineup for the toner pack 40 is not limited to two types, and three or more types may be provided.

In the present embodiment, the amount of toner filling the toner pack 40 which serves as a replenishment container meets Equations (1) and (2) below.

$$Y \le A < Z - Y \quad (1)$$

$$Y \le B < Z - Y \quad (2)$$

As illustrated in FIG. 24B, in a case where the remaining toner in the developing container 32 is R[g] which is between 0[g] and X[g], and A[g] of toner is replenished to the developing container 32 from the toner pack 40, (R+A)[g] of toner will be stored in the developing container 32. As Y<(R+A) according to the above Equation (1), the remaining amount display LED 400 after the toner replenishment will become the full level display. In other words, a threshold Y[g] of the full level is less than the replenishment amount A[g] replenished from the toner pack 40.

Also, as illustrated in FIG. 24C, in a case where the toner remaining in the developing container 32 is R[g], and B[g] of toner is replenished to the developing container 32 from the toner pack 40, (R+B)[g] of toner will be stored in the developing container 32. As Y<(R+B) according to the above Equation (2), the remaining amount display LED 400 after the toner replenishment will become the full level display.

As described above, the capacity of the developing container 32 is set so that the remaining amount display LED 400 will always become a full level when the toner is replenished when the remaining amount display LED 400 is the middle level or the low level display. Note that the capacity of the developing container 32 is not required to be set so that it always becomes a full level with a single toner pack 40 and may be configured to become a full level by replenishing a plurality of toner packs 40 containing a small amount of toner, for example.

Also, the capacity of the developing container 32, according to the above Equations (1) and (2), is set so that the total toner amount filling the toner pack 40 can be transferred to the developing container 32 when the remaining amount display LED 400 is the middle level or the low level display. Thus, the maximum amount of developer that the developing container 32 is able to store is larger than the value of a sum of Y[g] which is the border between the full level and the middle level and the amount (A[g] or B[g]) of developer stored in the toner pack 40. In other words, the amount of toner filling the toner pack 40 is less than the difference between the maximum amount of toner (Z[g]) that the developing container 32 is able to store and the remaining toner amount (Y[g]) which is the border between the middle level and the full level.

With this, the developing container 32 will not become full with toner in the middle of replenishing the developing container 32 with toner using the toner pack 40, and toner leakage from the replenishment port 32*a* during the toner replenishment can be reduced.

Thus, in the present embodiment, the control unit 90 changes the message display control related to the replenishment performed during the replenishment based on if the remaining amount information outputted indicates a low remaining amount or if the remaining amount information outputted indicates a middle remaining amount when the replenishment has been instructed. More specifically, the control unit 90 executes the first display control when starting replenishment at a low remaining amount and executes the second display control when starting replenishment at a middle remaining amount. With this, a message corresponding to the remaining amount at the start of replenishment can be displayed to the user. For example, in the first display control, a message illustrated in FIG. 19C is displayed to the user when changing to a middle remaining amount. With this, the user is able to recognize that the replenishment is being performed successfully.

Also, if the first predetermined period elapses in the first display control and the second display control without the remaining amount becoming full, the control unit 90 displays a message illustrated in FIG. 19F to the user and gets the user to input whether to end the replenishment. Here, the control unit 90 changes the first predetermined period between the first display control and the second display control. More specifically, in the first display control, the first predetermined period will be the period corresponding to the threshold value t1, and in the second display control, the first predetermined period will be the period corresponding to the threshold value t4. Also, as described above, in the case where the remaining amount does not become full in the first display control or the second display control, the control unit 90 drives the stirring member 34 only for the second predetermined period. In the first display control, the second predetermined period is a period corresponding to the threshold value t1. Also, in the second display control, the second predetermined period is a period corresponding to the threshold value t6 which is longer than the threshold value t1. That is, in the case of the second display control, the control unit 90 lengthens the driving time of the stirring member 34 more than in the case of the first display control to distribute the toner more evenly in the developing container 32. With this, the accuracy for detecting the remaining amount increases.

Also, if the third predetermined period elapses after the remaining amount becomes full in the first display control and the second display control, the control unit 90 displays a message illustrated in FIG. 19E to the user and prompts the user to remove the toner pack 40. Here, the control unit 90 changes the third predetermined period between the first display control and the second display control. More specifically, in the first display control, the third predetermined period will be the period corresponding to the threshold value t2, and in the second display control, the third predetermined period will be the period corresponding to the threshold value t3. Note that as described above, the threshold value t3 is longer than the threshold value t2. With this, a replenishment corresponding to the amount of toner in the toner pack 40 when the remaining amount becomes full is performed.

Also, in the present embodiment, the second opening 82*a* is formed on the discharge tray 81 on the top cover 82, and in addition, the opening/closing component 83 which is supported by the top cover 82 so as to be able to open/close is arranged. The opening/closing component 83 covers the second opening 82*a* when closed and exposes the replenishment port 32*a* of the developing container 32 when open. Therefore, the user is able to access the replenishment port 32*a* simply by opening the opening/closing component 83.

The present embodiment adopts a method (a direct replenishment method) where the toner is directly replenished into the developing container 32 from the toner pack 40 through the replenishment port 32*a*, and therefore, there is no need to remove the process cartridge 20 in replenishing toner to the developing container 32. Also, the replenishment port 32*a* of the developing container 32 is formed on the upper surface of the first protrusion 37 which protrudes upward from one end of the lengthwise direction of the transfer chamber 36, and thereby is arranged in close proximity to the second opening 82*a*. Therefore, the user is able to easily perform the toner replenishment operation to the developing container 32 via the replenishment port 32*a*. Also, because parts such as the developing roller 31 and the supply roller 33 are not exchanged in replenishing the toner to the developing container 32, cost can be reduced.

Also, a laser transition space SP was formed to be surrounded by the first protrusion 37, the second protrusion 38, the handle portion 39, and the transfer chamber 36, thereby enabling the developing container 32 and the scanner unit 11 to be arranged closely and the image forming apparatus 1 to be reduced in size.

Furthermore, the stirring member 34 is driven in the case where the toner replenishment operation is performed by mounting the toner pack 40 to the replenishment port 32*a*, so even if the replenishment port 32*a* were arranged on one end of the lengthwise direction of the developing container 32, packing phenomena can be reduced. With this, image defects can be reduced, and the accuracy in detecting remaining toner amount information can be improved.

Also, the maximum amount of developer that the developing container 32 is able to store is larger than the value of a sum of Y[g], which is the border between the full level and the middle level, and the amount (A[g] or B[g]) of developer stored in the toner pack 40. Therefore, the developing container 32 will not become full with toner in the middle of replenishing the developing container 32 with toner using the toner pack 40, and toner leakage from the replenishment port 32*a* during the toner replenishment can be reduced. By configuring the image forming apparatus 1 in this way, an embodiment of an image forming apparatus that meets the needs that users are seeking can be provided.

Also, a replenishment notification may be displayed on the display unit 301 prompting the toner replenishment once the remaining toner amount of the developing container 32 becomes a low level. Also, the replenishment notification may be displayed on the display unit 301 prompting the toner replenishment once the toner runs out.

Also, although the remaining toner amount of the developing container 32 is notified to the user by the remaining amount display LED 400, the remaining amount display LED 400 is not required to comprise three graduations like the present embodiment. For example, the remaining amount display LED 400 may comprise one, two, or four or more graduations. Also, a configuration may be taken so that the remaining toner amount is continuously displayed by a percentage display or a gauge display. Also, the notification of the remaining toner amount to the user may be performed by an audio using a speaker.

<First Variation>

A first variation of the first embodiment is illustrated in FIG. 25A. As illustrated in FIG. 25A, an image forming apparatus 1B has a replenishment port 132*a* of a developing container arranged on the right side of the apparatus, and an opening/closing component 83B is also arranged on the right side of the apparatus. An opening/closing component 83B exposes the replenishment port 132*a* when opened and covers the replenishment port 132*a* when closed. By arranging the replenishment port 132*a* on the right side of the apparatus as described above, the replenishment port 132*a* is close to the remaining amount display LED 400. Therefore, when replenishing the developing container with toner using the toner pack 40, the remaining amount display LED 400 can easily be checked.

<Second Variation>

Also, this invention may be adopted not only in an embodiment illustrated in FIG. 25A but also in an image forming apparatus 1C whose opening/closing component 83C is configured to open toward the front as illustrated in FIG. 25B.

<Third Variation>

Also, this invention may be adopted, in an image forming apparatus 1D whose opening/closing component 83D is configured to open toward the back side as illustrated in FIG. 25C.

Second Embodiment

In the first embodiment, replenishment guidance processing for a case without a mounting sensor 53 was explained. A case with the mounting sensor 53 will be explained below using FIGS. 26 to 28.

Figure 26:
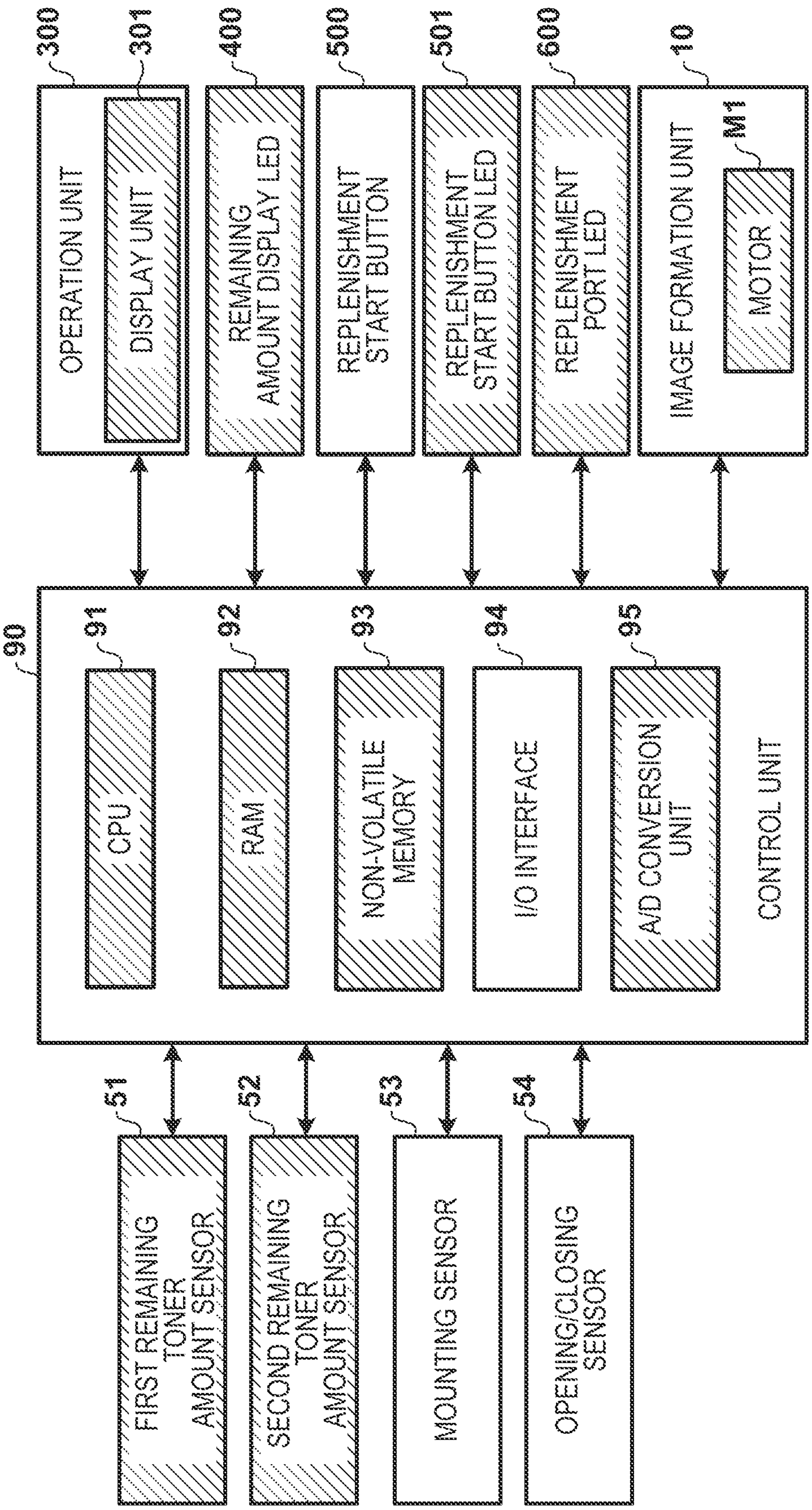
FIG. 26 is a block diagram illustrating a control system of the image forming apparatus.

A control block diagram of the second embodiment is illustrated in FIG. 26. Differences from FIG. 12 will be explained below, and an explanation on the details on the common parts will be omitted. The mounting sensor 53 and an opening/closing sensor 54 have been added to the control block diagram in FIG. 26 in comparison with the control block diagram in FIG. 12, and these are connected to the input side of the control unit 90. The mounting sensor 53 detects that the toner pack 40 has been mounted to the replenishment port 32*a* of the developing container 32. For example, the mounting sensor 53 is arranged on a surface that faces the bottom portion of the toner pack 40 when the toner pack 40 is mounted to the mounting unit 57, then is pressed by the bottom of the toner pack 40 which changes its state of electrical conduction. Also, the opening/closing sensor 54 detects whether the opening/closing component 83 was opened with respect to the top cover 82. The opening/closing sensor 54 comprises, for example, a pressure-sensitive switch or a magnetic sensor. Then, even by the mounting sensor 53 and the opening/closing sensor 54 detecting a predetermined operation, an interruption request will be issued to the CPU 91 whose operation is stopped when the image forming apparatus is in a sleep mode.

Figure 27:
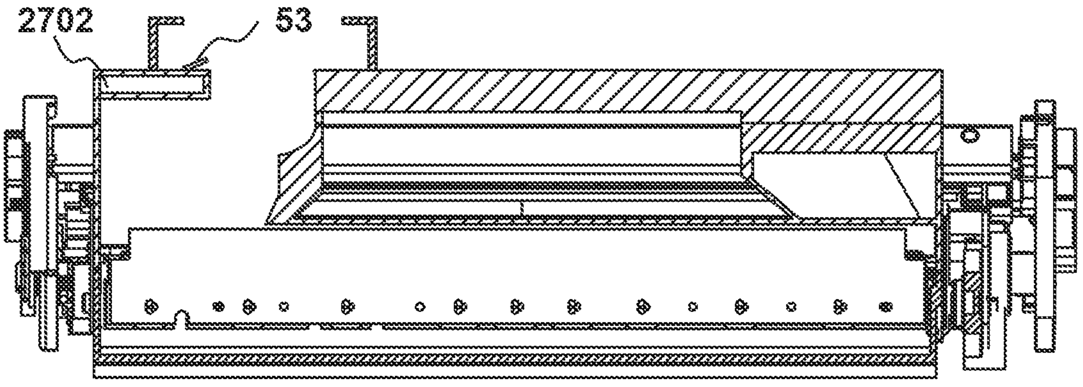
FIG. 27 is a diagram illustrating a positional relationship between a mounting sensor and a process cartridge.

FIG. 27 illustrates a positional relationship between the mounting sensor 53 and a process cartridge 20. FIG. 27 illustrates a cross-sectional view of the process cartridge. The process cartridge comprises a mounting sensor cable space 2702. When the mounting sensor 53 is pressed by the bottom of the toner pack 40 and the state of electrical conduction changes, a signal is outputted via these mounting sensor cables to the control unit 90. The mounting sensor cables are connected from the mounting sensor 53 to the control unit 90 via the mounting sensor cable space 2702. The mounting sensor cable space 2702 is configured to be enclosed so as not to come in contact with the toner.

Figure 28:
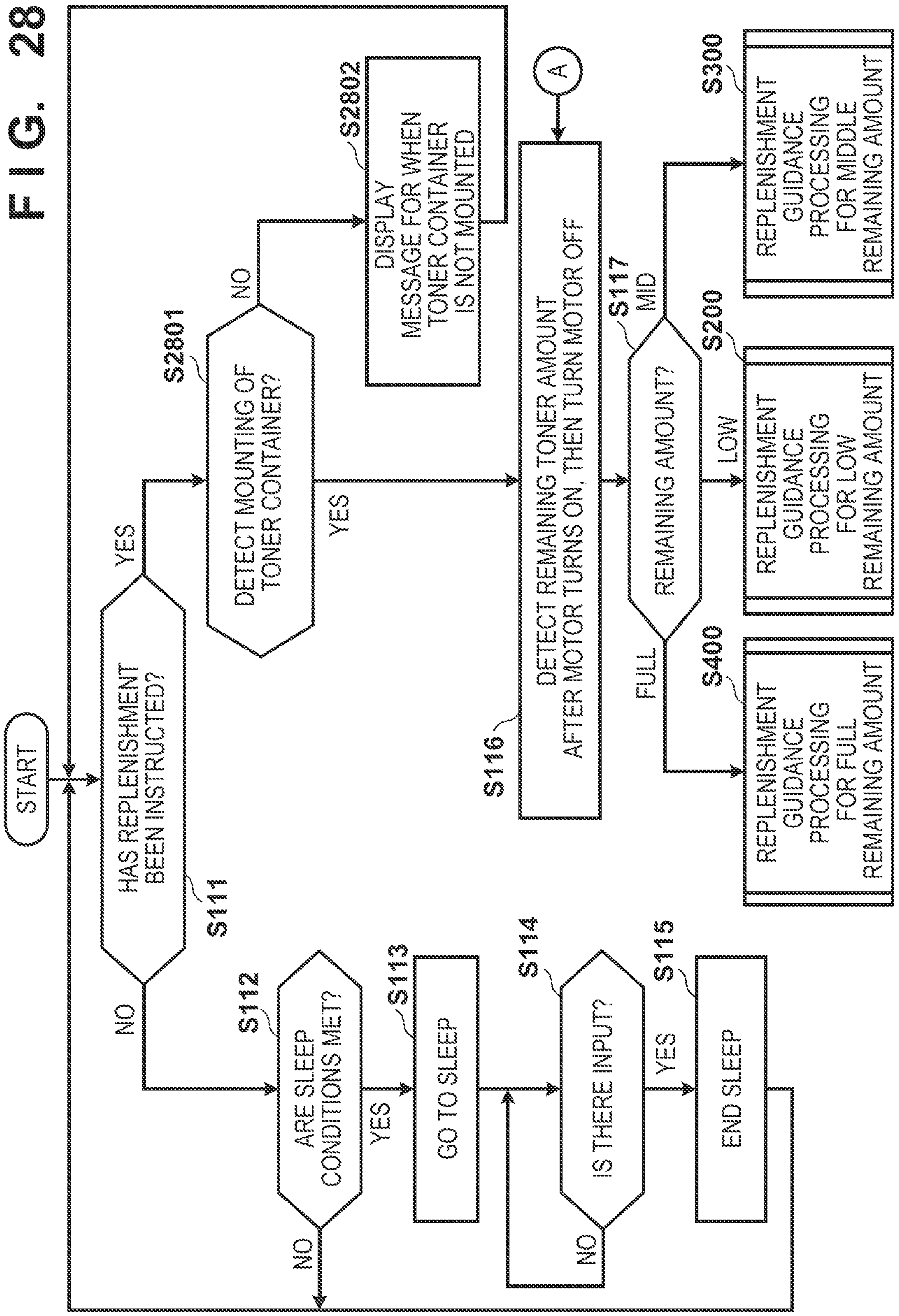
FIG. 28 is a flowchart illustrating replenishment guidance processing.

FIG. 28 is a flowchart illustrating the replenishment guidance processing of the present embodiment. Differences from FIG. 14 will be explained below, and an explanation on the details on the common parts will be omitted. If there is a replenishment instruction (step S111: yes), the control unit 90 determines (step S2801) whether or not the toner pack 40 has been mounted based on an output signal from the mounting sensor 53. In a case (step S2801: no) where the control unit 90 determines that the pack has not been mounted, it displays (step S2802) a message on the display unit 301 indicating that toner container is not mounted. An example of that message is illustrated in FIG. 19H. On the other hand, in a case (step S2801: yes) where the toner pack 40 is determined to be mounted, the processing same as that of in FIG. 14 will be executed.

Having the control unit 90 determine the detection signal of the mounting sensor 53 as described above can effectively prevent a situation where the toner replenishment is not performed at all due to the toner replenishment operation being attempted while the toner pack 40 is not mounted, and operability can be improved.

Third Embodiment

Figure 18A:
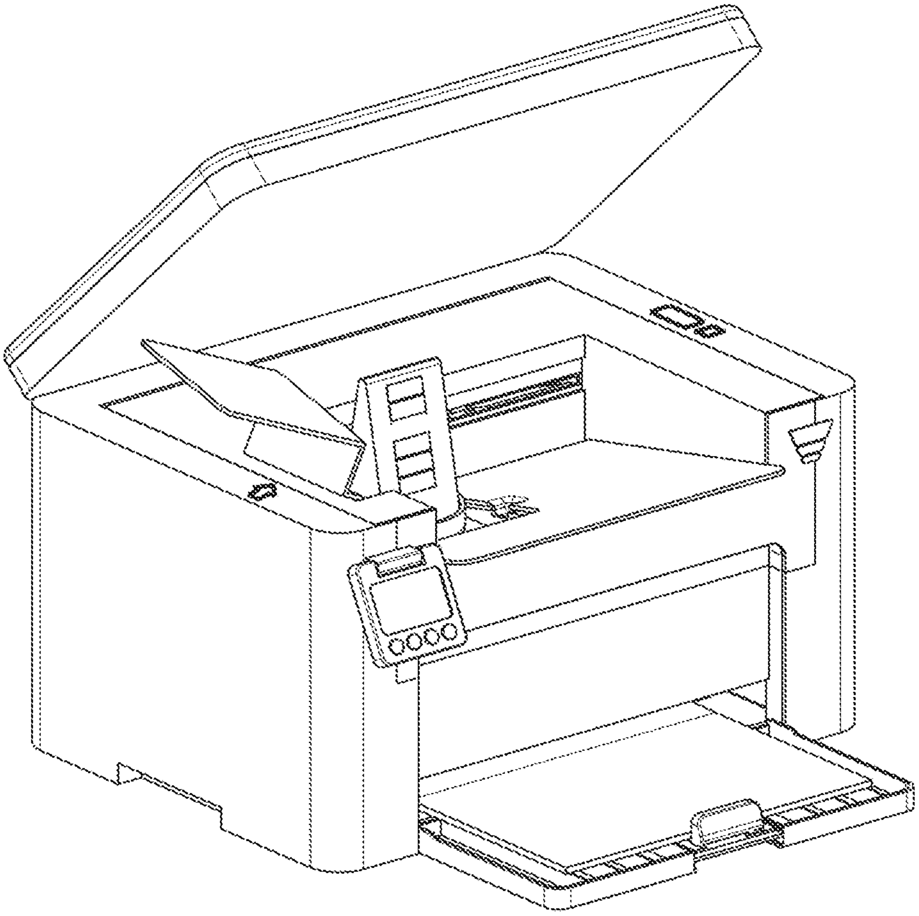
FIGS. 18A to 18C are explanatory diagrams of messages arranged on a toner pack.
Figure 18C:
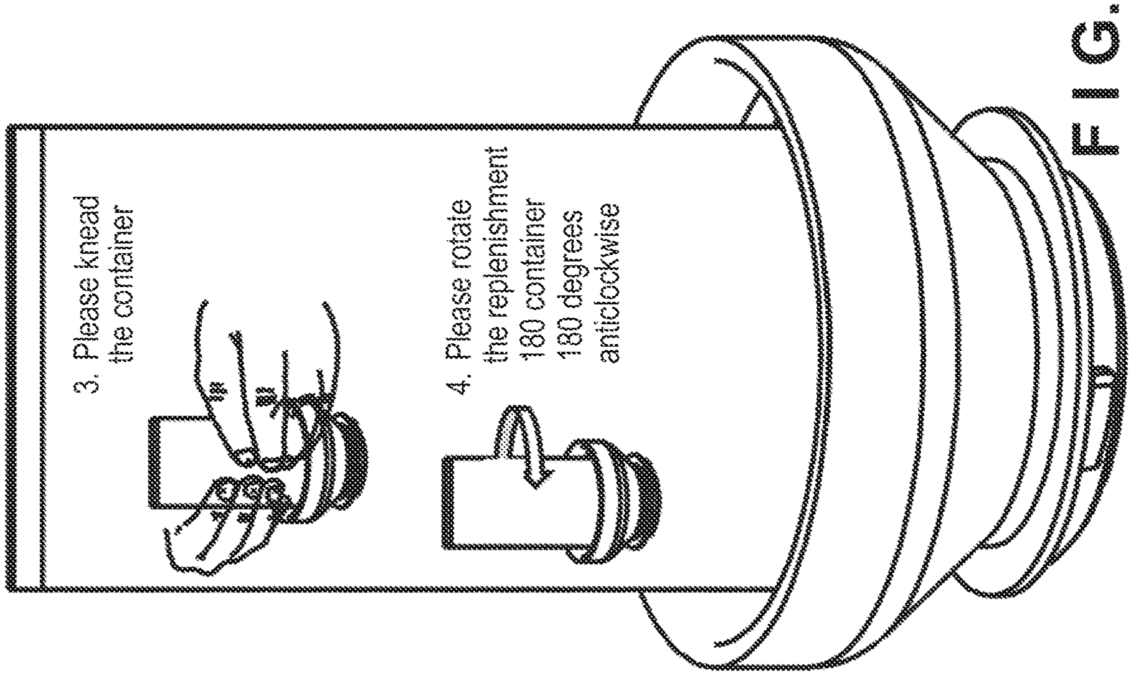
Figure 18B:
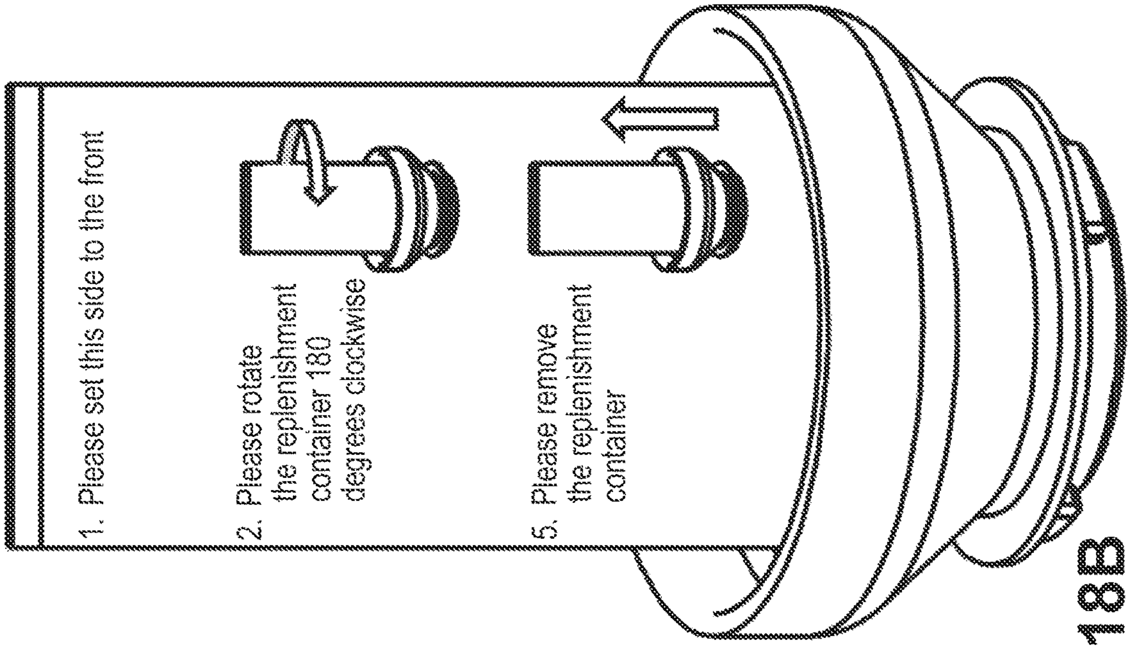

Next, the toner pack 40 which is the replenishment container for the developer in this invention will be explained using FIGS. 18B and 18C. FIG. 18B illustrates a state where a first region of the main body of the toner pack 40 is facing forward in the diagram, and FIG. 18C illustrates a state where a second region, which is different from the first region, of the main body of the toner pack 40 is facing forward in the diagram. As illustrated in FIGS. 18B and 18C, different messages regarding the replenishment are arranged in the first region and the second region. Note that the messages are not limited to text but also comprise pictures and photographic images. Also, the messages indicate a method of operation for toner replenishment by the user. Also, FIG. 18A illustrates a state where the toner pack 40 illustrated in FIGS. 18B and 18C is mounted to the image forming apparatus.

Here, as explained using FIG. 5, the toner pack 40 is restricted by the protrusion 42 arranged at the coupler so that the first region faces a predetermined direction when mounted to the mounting unit 57. Thus, the protrusion 42 is a direction restriction member for restricting the mounted facing of the toner pack 40. In the present embodiment, the first region is assumed to face the direction of the front door 61 when mounted to the mounting unit 57. The direction of the first region when the toner pack 40 is mounted to the mounting unit 57 is to be called a first direction in the following. Note that the first direction is a relative direction with respect to a predetermined reference direction of the image forming apparatus. For example, if the reference direction is in the right direction of FIG. 1A (a direction from the back surface of the image forming apparatus to the front door 61), then the first direction faces 0 degrees with respect to the reference direction.

Also, as explained using FIGS. 5A and 5B, the toner is supplied to the developing container 32, by rotating the main body unit of the toner pack 40 a predetermined rotation amount in a predetermined rotational direction after mounting the toner pack 40 to the mounting unit 57, the shutter component 41 enters an open state. The predetermined rotation amount in the present embodiment is 180 degrees. However, the predetermined rotation amount is not limited to 180 degrees. When mounting the replenishment container in the present embodiment, the first region faces the first direction, and then when the main body is rotated a predetermined rotation amount (a rotational angle) in the predetermined rotational direction to put the shutter component 41 in the open state, the second region faces the first direction. In other words, it faces the front of the user. As described, a positional relationship between the first region and the second region depends on the rotation amount and the rotational direction of the main body for putting the shutter component in a closed state from the open state.

A message indicating the first direction is arranged on the first region. As described previously, the message is not limited to text but also comprises pictures and photographic images. Also, the message indicates a method of operation for toner replenishment by the user. In FIG. 18B, this message corresponds to a number 1 message. In the present embodiment, the user is assumed to stand on the front door 61 side to perform an operation, therefore the "front" in the number 1 message refers to the front of the user, in other words, for the first region to face the direction of the front door 61.

Also, as illustrated in FIG. 18B, the message regarding the rotational direction and the amount of rotation of the main body to change the shutter component 41 from the closed state to the open state is arranged on the first region. In FIG. 18B, this message corresponds to a number 2 message.

Also, a message regarding the user operation to facilitate the transferring of the developer from the main body unit to the image forming apparatus is arranged on the second region. In FIG. 18C, this message corresponds to a number 3 message. A message prompting the user to knead and loosen the main body is indicated on a number 3 message.

Also, a message regarding the rotational direction and the amount of rotation of the main body unit to return to the orientation of the first region to the first direction thereby causing the shutter component 41 to enter the closed state after the replenishment ends is arranged on the second region. In FIG. 18C, this message corresponds to a number 4 message.

Furthermore, a message prompting the user to remove the toner pack 40 after the replenishment ends is arranged on the first region. In FIG. 18B, this message corresponds to a number 5 message. The number 5 message indicates an operation method to be performed after the replenishment operation method indicated by the messages displayed on the second region. In other words, the first region, in detail, can further be divided into a first region A and a first region B, and the first region B displays the number 5 message.

Note that the numbers assigned to the messages in FIGS. 18B and 18C correspond to the order of user operations regarding the replenishment.

In the present embodiment, the user is assumed to perform the mounting of the toner pack 40 and such facing the front door 61. Consequently, when mounted, the first region faces the front of the user, and when rotated to put the shutter component 41 into the open state, the second region faces the front of the user. As a result, the message regarding the next user operation to be performed will be displayed in front of the user in a form that is easy to see for the user, and the user is able to easily perform the user operations regarding the replenishment.

Fourth Embodiment

In the first to third embodiments, each type of message was explained to be displayed by the display unit 301. Also, the remaining amount display LED 400, the replenishment start button LED 501, and the replenishment port LED 600 arranged on the main body of the image forming apparatus 1 were explained to be turned on. However, limitation are not made to such a display to the user. For example, a configuration may be taken so that the CPU 91 sends each type of message display and each LED display in FIGS. 13, 15, 16, 17, and 28 to an external device as display information via the I/O interface 94. The external device that receives the display information is able to cause the display on the external device or a display unit connected to the external device the same display explained in the above.

A computer and a mobile terminal such as a smartphone are assumed as the external device. Also, various formats may be considered for the display information as long as the information is for software on the external device side to display a still image or a moving image indicating each type of messages and each LED display. Also, the I/O interface 94 may perform a wireless communication or a wired communication. Then, the outputting of the display information externally via this I/O interface 94 corresponds to control that causes the display unit to display a message related to the replenishment.

Fifth Embodiment

[Image Forming Apparatus]

FIG. 29A is a schematic view illustrating a configuration of the image forming apparatus 1 according to a fifth embodiment. Differences from the configuration in FIG. 1A will mainly be explained below, and an explanation on the details on the common parts will be omitted.

(Overall Configuration)

The image forming apparatus 1, as illustrated in FIGS. 29A and 29B, comprises a reading apparatus 200 supported by the printer main body 100 so as to be able to open/close. Also, a configuration of the process cartridge 20 of the present embodiment is different from the previously explained embodiment and will be explained in detail later. Additionally, explanations regarding the other configurations are the same as previously described, therefore, a detailed explanation will be omitted.

Figure 30A:
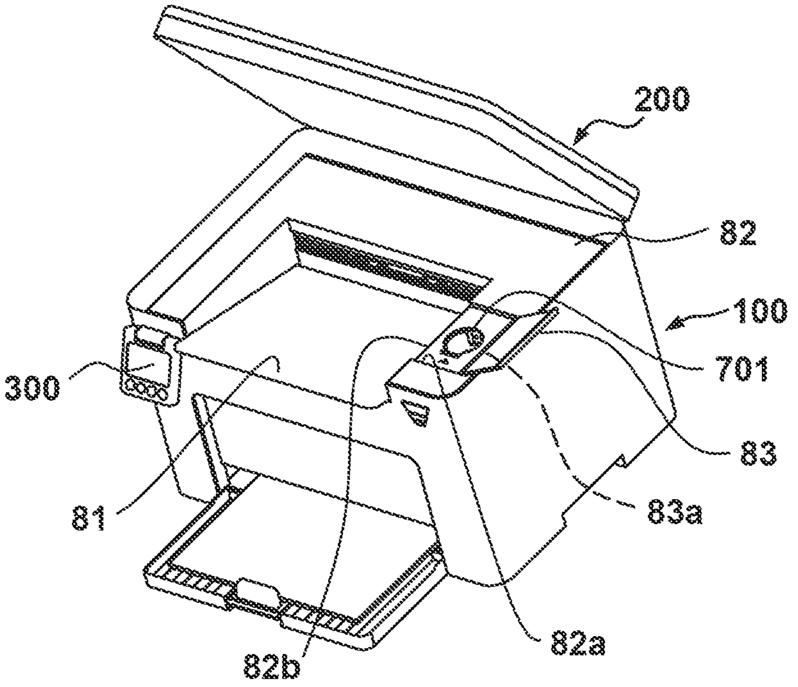
FIGS. 30A and 30B are a cross-sectional view and a perspective view illustrating the image forming apparatus according to the fifth embodiment.
Figure 30B:
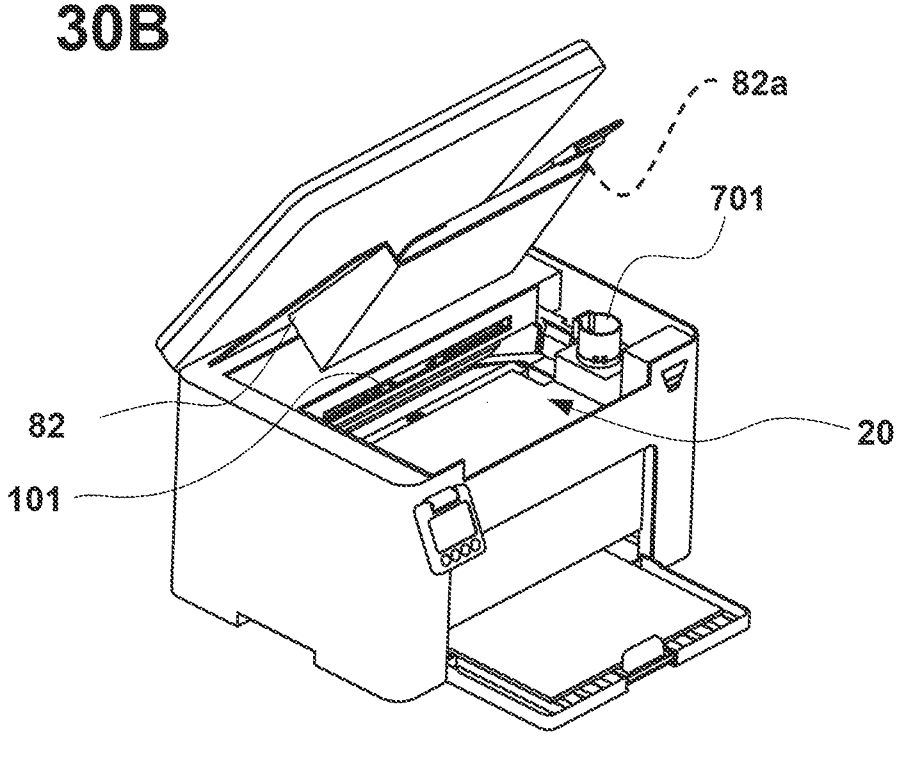

As illustrated in FIG. 30B, the first opening 101 opening upward is arranged on an upper portion of the printer main body 100. The first opening 101 is covered by the top cover 82 when in use, and the process cartridge 20 is exposed (FIG. 30B) by opening the top cover 82 upward. The top cover 82 is supported to be able to open/close with respect to the printer main body 100 centered on a rotation shaft extending in a left-right direction, and the discharge tray 81 is arranged on a top side. The top cover 82 opens from the front side toward the back side with respect to the printer main body 100 while the reading apparatus 200 is open. Note that the reading apparatus 200 and the top cover 82 may be configured to be held in an open state or a closed state by a holding mechanism such as a hinge mechanism.

For example, in the case where a recording material is jammed (a paper jam) in the conveyance path CP through which the recording material fed by the pickup roller 65 passes, the user opens the reading apparatus 200 together with the top cover 82. Then, the user accesses the process cartridge 20 through the first opening 101 exposed by opening the top cover 82 and pulls out the process cartridge 20 following the cartridge guide 102.

Also, in the present embodiment, an opening/closing component 83 is arranged on the top cover 82 so as to be able to open and close as illustrated in FIG. 30A. The opening 82*a* opening upward is arranged on the upper surface of the top cover 82 on which the discharge tray 81 is arranged, and the opening 82*a* is covered by closing the opening/closing component 83. The opening/closing component 83 and the opening 82*a* are formed on the right side of the top cover 82. Also, the opening/closing component 83 is supported by the top cover 82 so as to be able to open and close centered on the rotation shaft 83*a* extending in the front-rear direction, and is opened to the right direction by using a finger in the groove portion 82*b* provided in the top cover 82. The opening/closing component 83 is formed to be roughly L-shaped along the shape of the top cover 82. Note that the opening/closing component 83 is not limited to the above opening and closing mechanism. For example, the opening/closing component 83 may be arranged over the top cover 82 so as to cover the replenishment container mounting unit 701, and be configured to open/close the opening 82*a* by rotating about a rotation shaft that intersects perpendicularly with the top cover 82 so as to slide against the upper surface of the top cover 82. Here, the sliding against the upper surface of the top cover 82 means that the movement of the opening/closing component 83 is restricted in a direction of the rotation shaft.

The opening 82*a* is opened so that the replenishment container mounting unit 701 for replenishing the toner arranged on the upper portion of the process cartridge 20 is exposed. By opening the opening/closing component 83, the user can access the replenishment container mounting unit 701 (refer to FIGS. 33A to 33C) without opening the top cover 82. The user can replenish the process cartridge 20 with the toner by mounting the toner pack 40 to the replenishment container mounting unit 701.

Also, in the following, a front-rear direction, a left-right direction, and an up-down direction (a gravitational direction) of the image forming apparatus 1 is set with reference to when the operation unit 300 is facing front. The positional relationship of detachable components with respect to the printer main body 100 starting with the process cartridge 20 will be explained with when the components are attached to the printer main body 100 as a reference. Also, the "lengthwise direction" of the process cartridge 20 indicates an axial direction of the photosensitive drum 21.

(Configuration of Process Cartridge)

Figure 31A:
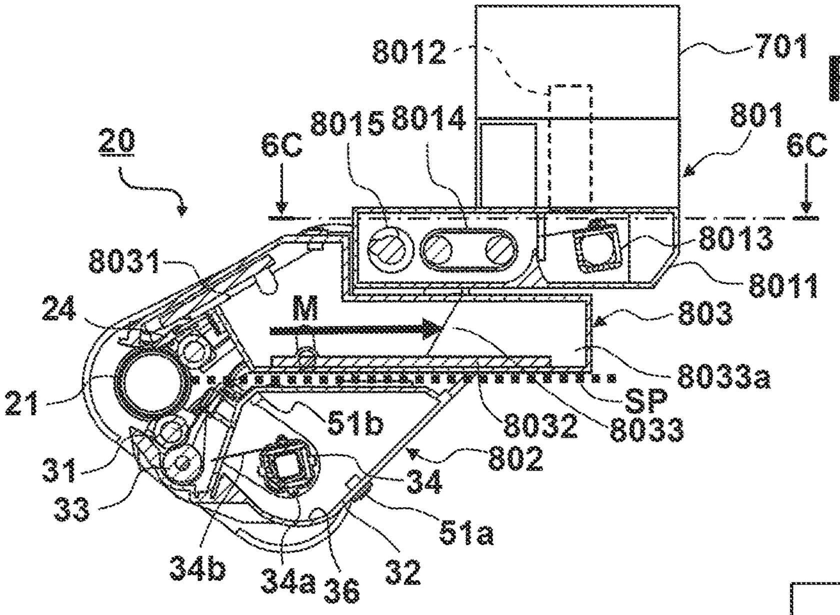
FIGS. 31A to 31C are explanatory diagrams of toner replenishment using a toner pack according to the fifth embodiment.
Figure 31B:
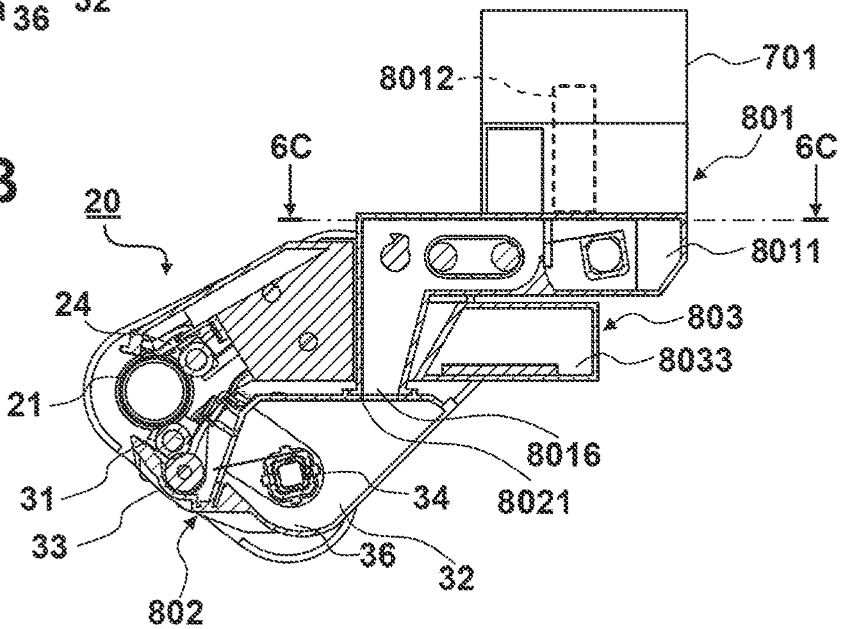
Figure 31C:
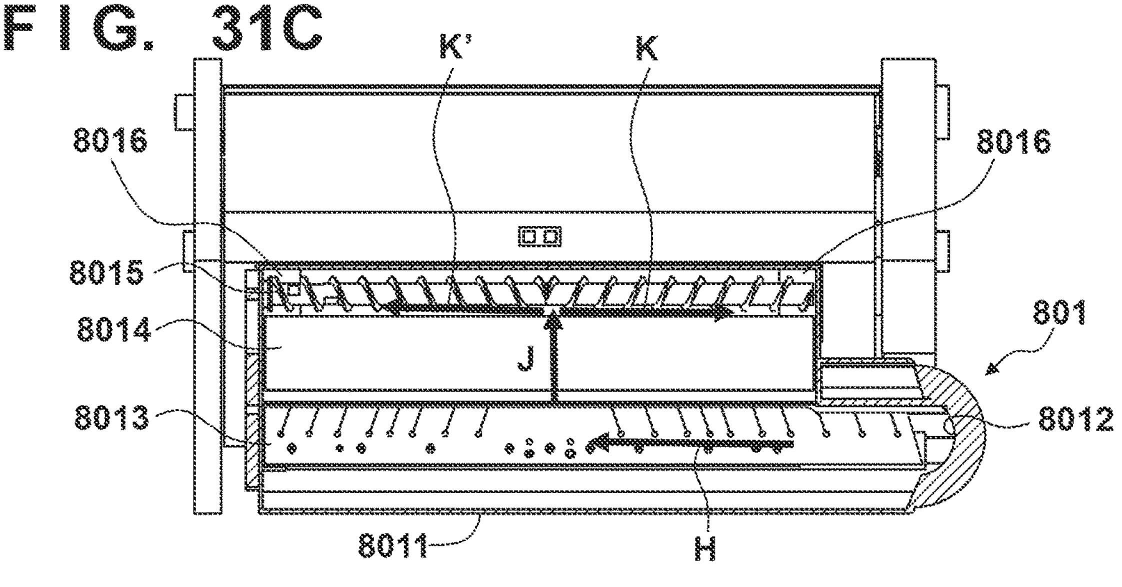

Next, a configuration of the process cartridge 20 will be explained. FIG. 31A is a cross-sectional view of the center of the process cartridge 20 in the lengthwise direction. Also, FIG. 31B is a cross section of the replenishment container mounting unit 701 of the process cartridge 20. FIG. 31C is a cross-sectional view of 6C-6C of FIGS. 31A and 31B. As illustrated in FIGS. 31A to 31C, the process cartridge 20 comprises a toner receiving unit 801, a developing unit 802, and a cleaning unit 803. The toner receiving unit 801, the cleaning unit 803, and the developing unit 802 are arranged in that order from top to bottom in the gravitational direction. Each unit is explained below in order.

The toner receiving unit 801 is arranged in the upper portion of the process cartridge 20. A toner storage unit 8011 comprising a frame for storing toner is arranged inside the toner receiving unit 801, and the replenishment container mounting unit 701 which couples with the toner pack 40 is arranged at the end of the lengthwise direction. Note that the frame comprising the toner storage unit 8011 may be comprised of a single component or a plurality of components combined. The replenishment container mounting unit 701 comprises a replenishment port 8012 which receives the toner discharged from the toner pack 40. A detailed configuration of the replenishment container mounting unit 701 and the mounting of the toner pack 40 with respect to the replenishment container mounting unit 701 will be described later.

Furthermore, a first conveyance member 8013, a second conveyance member 8014, a third conveyance member 8015 are arranged inside the toner receiving unit 801. The first conveyance member 8013 conveys the toner that dropped via the replenishment port 8012 at the end of the lengthwise direction of the toner storage unit 8011 toward the central portion of the toner storage unit 8011 in a direction (FIG. 31C) of an arrow H. The second conveyance member 8014 conveys the toner, which was conveyed by the first conveyance member 8013, toward a direction (FIG. 31C) of an arrow J perpendicular to the lengthwise direction to an upper side of the developing unit 802, in other words, a discharge port 8016. The third conveyance member 8015 receives the toner from the second conveyance member 8014, mainly at the central portion of the lengthwise direction and conveys it to one side and the other side (in a direction of an arrow K and a direction of an arrow K') in the lengthwise direction.

Air flows in at the same time when the toner from the toner pack 40 serving as the replenishment container flows into the toner receiving unit 801. The toner receiving unit 801 comprises an air filter (not illustrated) to allow the air to flow in the direction of the arrow H when replenishing the toner to make it easy for the toner to be replenished during the toner replenishment. This air filter, due to the internal pressure of the toner receiving unit 801 rising and a part of the air flowing in an opposite direction from the direction of the arrow H when replenishing the toner, prevents the toner from spraying out of the replenishment port 8012.

Then, on each end of the lengthwise direction of the toner receiving unit 801, the discharge port 8016 (FIG. 31B) is arranged for discharging the toner from the toner storage unit 8011 to the developing container 32 of the developing unit 802. The toner that reached the discharge port 8016 using the third conveyance member 8015 drops into the developing container 32 due to gravity. Note that more conveyance members may be arranged along a channel of the discharge port 8016 to support the transferring of toner by gravity.

The developing unit 802 located on the lower portion of the process cartridge 20 comprises an opening 8021 for receiving the toner discharged from the discharge port 8016 (FIG. 31B). A sealing member (not illustrated) is arranged between the discharge port 8016 and the opening 8021 to seal the gap between the discharge port 8016 and the opening 8021 to prevent the toner from leaking out.

The toner that dropped into the toner receiving unit 801 from the toner pack 40 via the replenishment port 8012 is conveyed by the first conveyance member 8013, the second conveyance member 8014, and the third conveyance member 8015 in the toner receiving unit 801. Then, the toner is handed over from the toner receiving unit 801 to the developing unit 802 via the discharge port 8016 and the opening 8021 at each end in the lengthwise direction. As described above, the toner that is replenished via the replenishment port 8012, which is positioned on an end of the process cartridge 20 in the lengthwise direction and is positioned away from the developing container 32 in the horizontal direction seen from the lengthwise direction, is conveyed within the cartridge and reaches the developing container 32.

As described above, the toner storage unit 8011 of the toner receiving unit 801 and the developing container 32 of the developing unit 802 join each other to comprise the storing container which forms a space for storing the toner in the process cartridge 20. Thus, in the present embodiment, the replenishment port 8012 for replenishing the toner from outside is arranged as a portion of the storing container of the process cartridge 20. However, the replenishment port that directly connects with the replenishment container may be arranged on the printer main body for the process cartridge to receive the toner via that replenishment port. In this case, the portions of the process cartridge 20 excluding the replenishment port become detachable from the image forming apparatus 1 as illustrated in FIG. 3.

The toner that is supplied to the developing unit 802 via the opening 8021 will be stored (FIGS. 31A and 31B) in the transfer chamber 36 formed inside the developing container 32 comprised of a frame of the developing unit 802. Note that the frame comprising the developing container 32 may be comprised of a single component or a plurality of components combined. Here, the stirring member 34 is arranged in the transfer chamber 36. The stirring member 34 comprises the axis member 34*a* arranged in proximity to the center of rotation of the stirring member 34 and the blade portion 34*b* extending radially from the axis member 34*a*. In the cross section, the toner in the rotational locus of an end of the blade portion 34*b* is pushed in response to the movement of the blade portion 34*b* and is transferred. The toner replenished via the opening 8021 is conveyed toward the developing roller 31, the supply roller 33, and developing blade 35 while being mixed by the stirring member 34.

The cleaning unit 803 comprises a disposal toner chamber 8033 comprised of a fourth conveyance member 8031, the fifth conveyance member 8032, and a frame (FIGS. 31A and 31B). Note that the frame comprising the disposal toner chamber 8033 may be comprised of a single component or a plurality of components combined. The disposal toner chamber 8033 is a space for storing collected materials (a so-called disposal toner) such as residual toner collected from the photosensitive drum 21 by the cleaning blade 24 and is independent from the internal space of the toner receiving unit 801 and the developing unit 802. The disposal toner collected by the cleaning blade 24 is conveyed in a direction of an arrow M by the fourth conveyance member 8031 and the fifth conveyance member 8032, then is deposited gradually from a back portion 8033*a* of the disposal toner chamber toward the front.

(Configuration of Toner Pack)

Figure 32A:
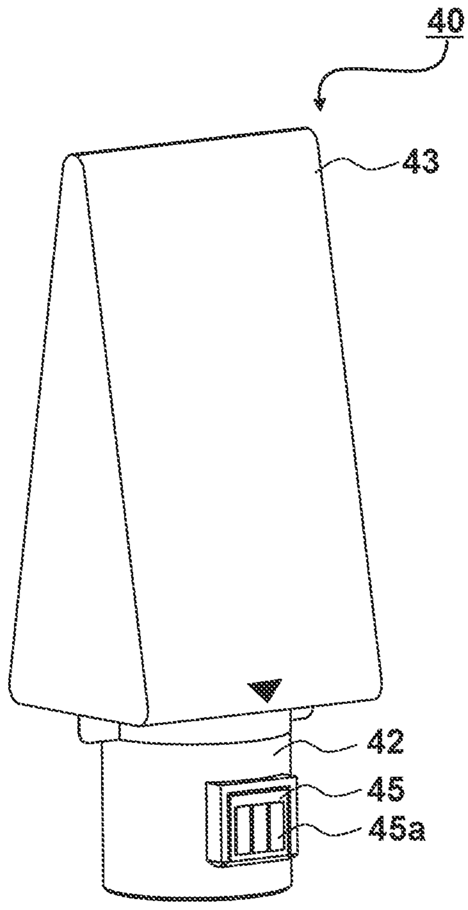
FIGS. 32A and 32B are a perspective view and a bottom view of a toner pack according to the fifth embodiment.
Figure 32B:
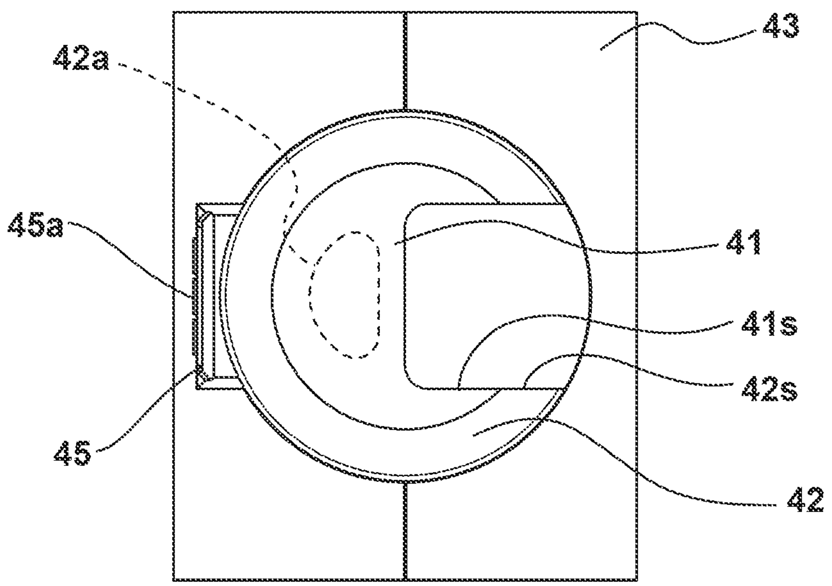
Figure 33A:
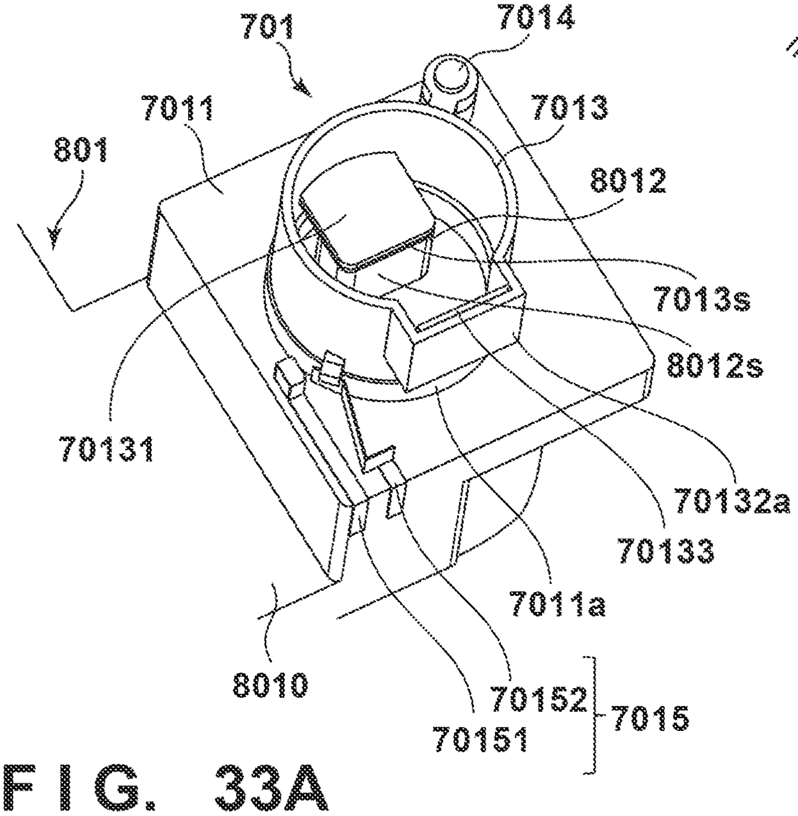
FIGS. 33A to 33C are a perspective view, a top view, and an enlarged view of a replenishment container mounting unit according to the fifth embodiment.
Figure 33C:
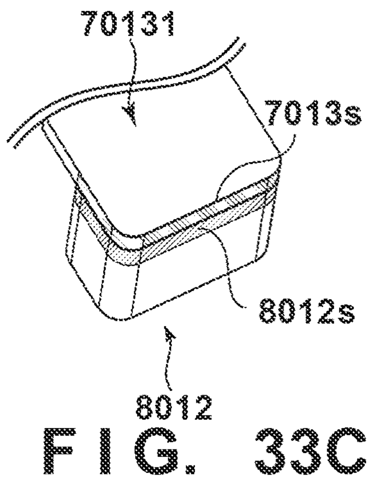

The configuration of the toner pack 40 in the fifth embodiment will be explained. FIG. 32A is a perspective view illustrating the toner pack 40 in which the shutter component 41 is in a closed state, and FIG. 32B is its bottom view. FIG. 33A is a perspective view illustrating the shutter component 41 in an open state, and FIG. 33B is its top view.

As illustrated in FIG. 32A, FIG. 32B, and FIGS. 33A to 33C, the toner pack 40 which is an example of a replenishment container, comprises a bag component 43 filled with the toner, the resin discharging unit 42 attached to the bag component 43, and the shutter component 41 which is capable of opening/closing the opening of the discharging unit 42. Also, the memory unit 45 serving as a memory unit for storing the information of the toner pack 40 is attached to the discharging unit 42. The memory unit 45 comprises a plurality of metal plates (metal terminals) exposed on the outside of the toner pack 40 as a contact point unit 45*a* which comes in contact with a contact point unit 70133 (refer to FIGS. 34A and 34B) of the replenishment container mounting unit 701 described later. Also, as for the bag component 43, a PP resin (a polypropylene), a PET resin (a polyethylene terephthalate resin), a cardboard, a paper, and such may be used as a material. Also, the thickness can be between 0.01 mm to 1.2 mm. Also, from a perspective that the bag is to be easy for the user to loosen and is to be durable, a thickness that is less than or equal to 0.05 mm to 1.0 mm is even more advantageous.

Figure 33B:
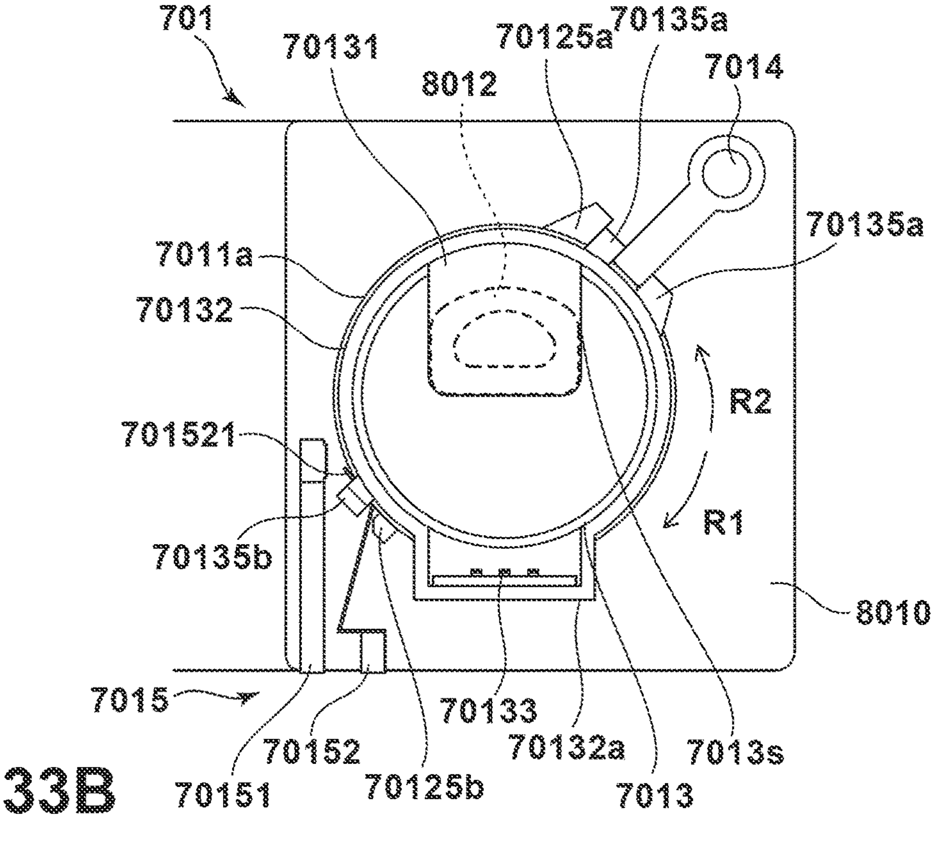
Figure 36:
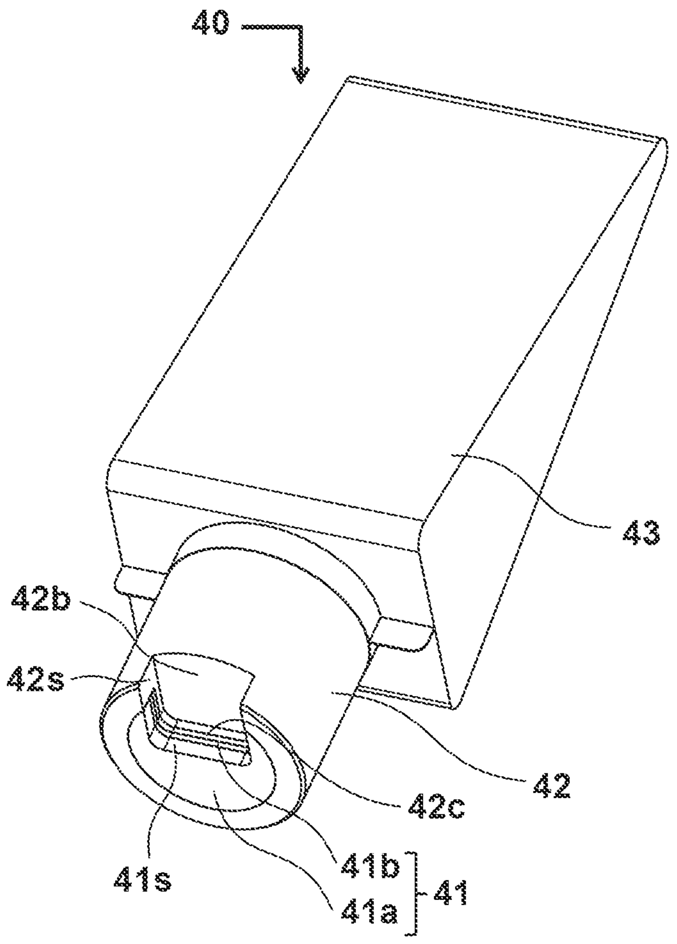
FIG. 36 is a perspective view of a toner pack according to the fifth embodiment.

As illustrated in FIGS. 32B, 33B, and 36, the shutter component 41 has a shape in which a part of a disc that can be rotated with respect to the discharging unit 42 is cut out. A side surface forming the thickness of the shutter component 41 at the cutout portion functions as an engagement surface 41*s*. On the other hand, the discharging unit 42 also has a shape with a cutout. The discharging unit 42 comprises an engagement surface 42*s* parallel to the engagement surface 41*s* at the cutout portion. The discharge port 42*a* is arranged at a position approximately 180 degrees apart from the engagement surface 42*s* in the circumferential direction of the discharge port 42*a*. Note that FIG. 36 illustrates in detail the engagement surface 41*s* and the engagement surface 42*s*.

Figure 34A:
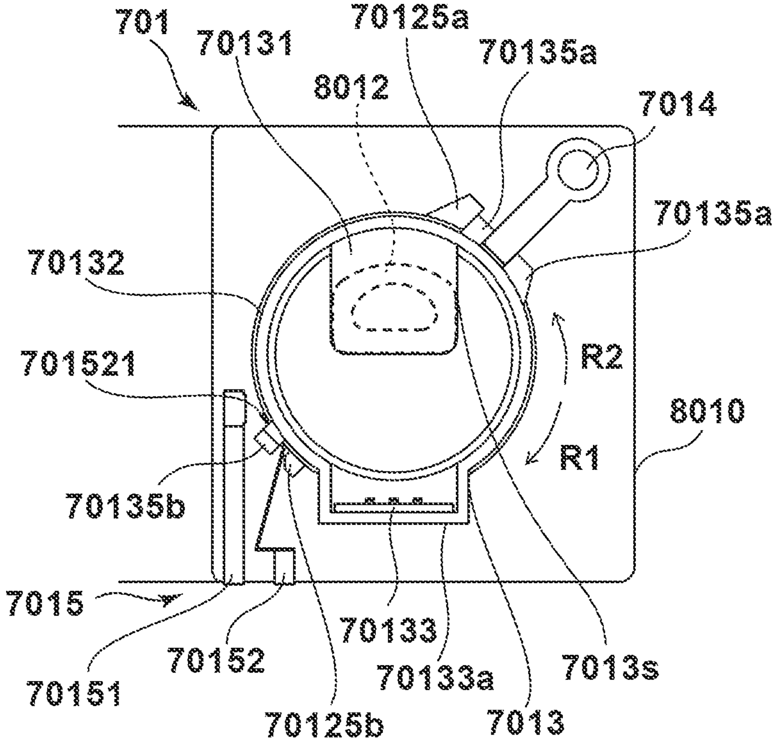
FIGS. 34A to 34C are an explanatory view for operation of the replenishment container mounting unit according to the fifth embodiment.
Figure 34B:
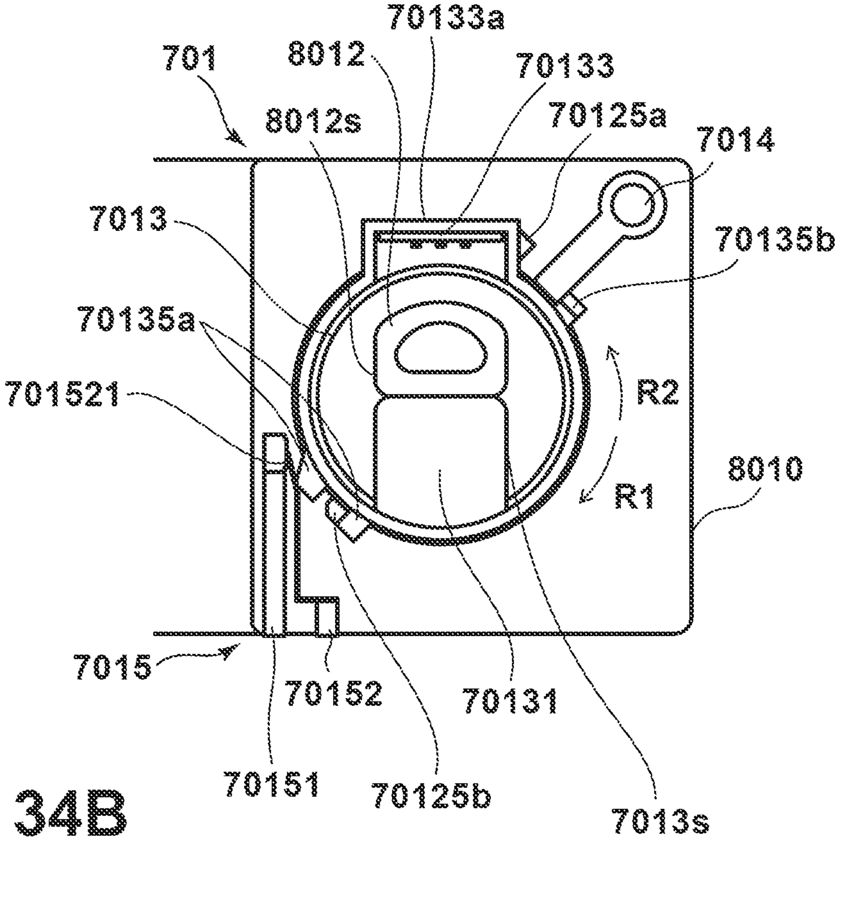

As illustrated in FIGS. 32B and 36, when the positions of the cutouts are aligned when seen from the top or the bottom of the shutter component 41 or the discharging unit 42, then the discharge port 42*a* is covered (in a closed state) by the shutter component 41. As illustrated in FIG. 34B, when the shutter component 41 rotates 180 degrees with respect to the discharging unit 42, the discharge port 42*a* is exposed via the cutout portion of the shutter component 41 and the internal space of the bag component 43 communicates with the external space of the toner pack 40. Note that as illustrated in FIG. 36, it is advantageous for the configuration of the shutter component 41 to comprise a rigid main body unit 41*a* on which a seal layer 41*b* formed with an elastic material such as a sponge is attached. In this case, having the seal layer 41*b* adhered to the seal layer 42*c* covering a peripheral edge portion of the discharge port 42*a* in the closed state can prevent the toner from leaking. The seal layer 42*c* is illustrated in FIG. 36, and this seal layer 42*c*, similarly to the seal layer 41*b*, is formed out of an elastic material such as a sponge.

As described later, when replenishing the image forming apparatus 1 with the toner from the toner pack 40, the discharging unit 42 is to be aligned to a predetermined position, then the toner pack 40 is inserted/connected to the replenishment container mounting unit 701. A configuration is taken so that by rotating the discharging unit 42 180 degrees, the discharging unit 42 rotates relatively with respect to the shutter component 41, the discharge port 42*a* opens, and the toner in the bag component 43 flows to the toner receiving unit 801 in accordance with the gravity. At this point, the shutter component does not move relatively with respect to the replenishment container mounting unit 701.

Also, an example of the rotation-type shutter component 41 is given here, but the shutter component may be omitted, and a slide-type shutter component may be adopted instead of the rotation-type shutter component 41. Also, the shutter component 41 may be configured to break when the toner pack 40 is mounted to the replenishment port 8012 or when the toner pack 40 is rotated in a mounted state, or it may be structured to have a removable seal-like lid.

Also, it is advantageous to attach a protection cap on the discharging unit 42 of the unused toner pack 40 to prevent the toner from leaking when transporting it. The protection cap is configured, when attached to the discharging unit 42, for example, to engage with the shutter component 41 and the cutout portion of the discharging unit 42 and restrict the relative rotation of the shutter component 41 and the discharging unit 42. By removing the protection cap, the user will be able to mount the toner pack 40 to the replenishment container mounting unit 701.

(Configuration of Replenishment Container Mounting Unit)

The opening/closing mechanism of the shutter of the toner pack 40 and the toner receiving unit 801 as well as a lock mechanism of the shutter component 41 will be explained. FIG. 33A is a perspective view of the replenishment container mounting unit 701 and FIG. 33B is its top view. The replenishment container mounting unit 701 comprises the replenishment port 8012, a replenishment port shutter 7013, a lock member 7014, and a rotation detection unit 7015.

The replenishment port 8012 is an opening that communicates with the toner storage unit 8011 (refer to FIGS. 31A to 31C) of the toner receiving unit 801 and is fixed to the frame 8010 of the toner receiving unit 801. The replenishment port shutter 7013 comprises a cover portion 70131 covering the replenishment port 8012, a cylindrical portion 70132 for receiving the discharging unit 42 of the toner pack 40, and the contact point unit 70133 connected to the contact point unit 45*a* (refer to FIG. 33B) of the memory unit 45 of the toner pack 40. In the figure, the part of the cylindrical portion 70132 covering the contact point unit 70133 is illustrated as the cylindrical portion 70132*a*. The replenishment port shutter 7013 is a combination of the cover portion 70131, the cylindrical portion 70132, and the contact point unit 70133 and is a component attached to the frame 8010 of the toner receiving unit 801 to enable rotation. Each conductor exposed to the contact point unit 70133 is connected electronically with the control unit of the image forming apparatus 1 mounted on the printer main body 100 via a line arranged in the process cartridge 20 and a contact point between the process cartridge 20 and the printer main body 100.

The rotation detection unit 7015 serving as a rotation detection sensor is a mechanism for detecting the rotation of the replenishment port shutter 7013. The rotation detection unit 7015 of the present embodiment is comprised of two conductive flat springs 70151 and 70152. The flat spring 70152 is biased in a clockwise direction, and when pressed by the protrusion 70135*a* that is arranged on an outer periphery of the replenishment port shutter 7013, it contacts the other flat spring 70151 at a distal end 701521. In other words, the rotation detection unit 7015 is an electrical circuit configured to switch between a conducting state and a disconnected state depending on a rotational angle (a rotational position) of the replenishment port shutter 7013. As described later, the control unit 90 (FIG. 38) of the image forming apparatus identifies whether the discharge port 42*a* of the toner pack 40 and the replenishment port 8012 of the replenishment container mounting unit 701 communicate based on whether the rotation detection unit 7015 is conducting electricity or is disconnected. In other words, the control unit 90 is able to determine that the operation to replenish the toner pack 40 by the user has been successfully performed at least up until the communication between the discharge port 42*a* and the replenishment port 8012.

As illustrated in FIGS. 33A to 34C, a plurality of protrusions 70135*a* and 70135*b* are arranged on a peripheral portion of the cylindrical portion 70132 of the replenishment port shutter 7013. Also, the frame 8010 comprises a shutter supporting unit 7011, and the shutter supporting unit 7011 supports the cylindrical portion 70132 of the replenishment port shutter 7013 so as to be able to rotate. A plurality of protrusions 70125*a* and 70125*b* is arranged also on a cylindrical portion 7011*a* of the shutter supporting unit 7011. A plurality of protrusions 70125*a* and 70125*b* are located lower than the protrusion 70135*a* (on the right side in FIG. 34A) in a gravitational direction. The protrusion 70125*b* permits the protrusion 70135*a* (on the right side in FIG. 34*a*) to pass by moving rotationally. On the other hand, the protrusion 70135*a* on the left side in FIG. 34A is the same height as the protrusion 70135*a* on the right side in FIG. 34A and extends down to the height that overlaps with the protrusions 70125*a* and 70125*b*. Thus, the protrusion 70125*b* contacts the protrusion 70135*a* on the left side in FIG. 34A due to the rotational angle (the rotational position) of the replenishment port shutter 7013 and restricts the rotational movement of the protrusion 70135*a* on the left side in FIG. 34A.

Also, prior to rotating the replenishment port shutter 7013 in an R1 direction, the protrusion 70125*a* contacts the protrusion 70135*a* on the left side and restricts the rotational movement of the protrusion 70135*a* in an R2 direction. Also, the protrusion 70135*a* on the right side in FIG. 34A contacts the lock member 7014 and restricts the rotational movement of the lock member 7014 in the R1 direction. On the other hand, after the replenishment port shutter 7013 is rotated in the R1 direction, the protrusion 70135*b* contacts the lock member 7014 that was moved to the locked position and restricts the rotational movement of the lock member 7014 in the R2 direction. Also, the protrusion 70135*a* on the right side in FIG. 34A contacts the protrusion 70125*b* and restricts further rotational movement of the protrusion 70135*a* in the R1 direction. Note that the rotational direction of the replenishment port shutter 7013 is assumed to be in the R1 direction when attaching the toner pack 40 and in the R2 direction when removing it.

Figure 35A:
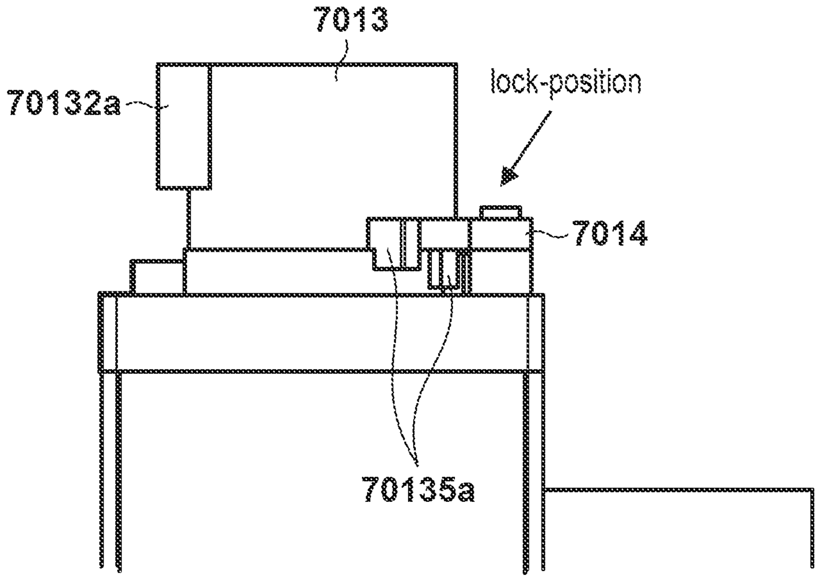
FIGS. 35A and 35B are diagrams representing positions of a lock member according to the fifth embodiment.
Figure 35B:
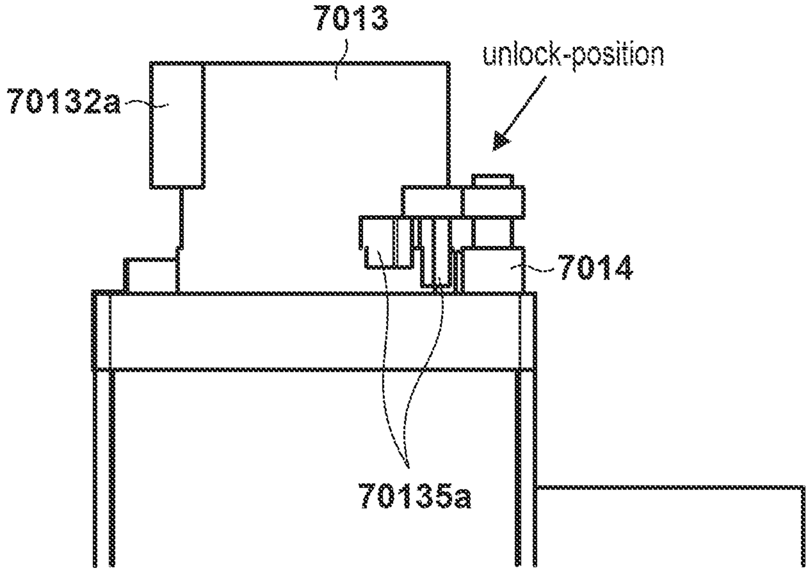

The lock member 7014 is a member for regulating the rotation of the replenishment port shutter 7013. FIG. 35A indicates a state where the lock member 7014 is in a locked position, and FIG. 35B indicates a state where the lock member 7014 is in an unlocked position. The lock member 7014 can transition between a locked position (a restricted position) and an unlocked position (a permitting position) by moving up and down. If the lock member 7014 contacts the protrusion 70135*a* of the replenishment port shutter 7013 in the locked position as illustrated in FIGS. 34B and 35A, the rotation of the replenishment port shutter 7013 is restricted. If the lock member 7014 moves to the unlocked position as illustrated in FIG. 35B, the lock member 7014 moves out of a path of movement of the protrusion 70135*a* when the replenishment port shutter 7013 rotates, thereby allowing the rotation of the replenishment port shutter 7013.

(Pressing Mechanism of Lock Member)

Figure 37:
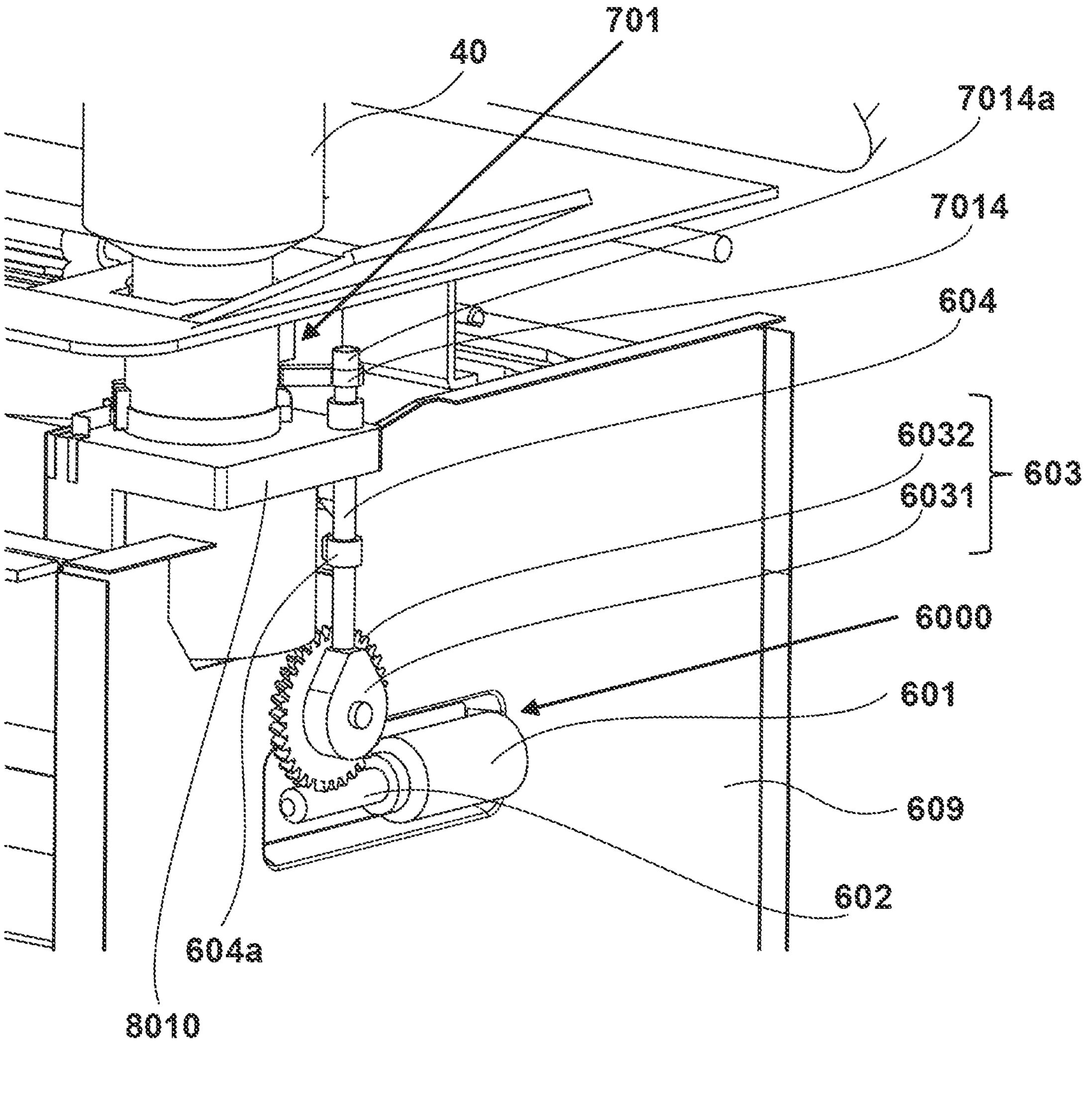
FIG. 37 is a diagram representing a lock member pressing mechanism according to the fifth embodiment.

FIG. 37 illustrates a pressing mechanism 6000 that moves the lock member 7014 between the locked position and the unlocked position. The pressing mechanism 6000 comprises a motor 601, an input gear 602, a cam gear 603, and a reciprocating pin 604. The input gear 602 is a screw gear attached on an output axis of the motor 601. The cam gear 603 comprises a gear portion 6032 comprising a helical gear that engages with input gear 602 and a cam portion 6031 for causing the reciprocating pin 604 to perform a reciprocating motion.

The reciprocating pin 604 is supported by a holding member to enable a linear motion in a gravitational direction and its opposite direction (an upward vertical direction). When the motor 601 spins, the cam gear 603 rotates via the input gear 602, then the cam portion 6031 presses the reciprocating pin 604 which reciprocates up and down, and accordingly, the lock member 7014 moves up and down between the locked position and the unlocked position. FIG. 37 illustrates a locked state.

Also, although a drive transfer construction in the pressing mechanism 6000 in the present embodiment is a combination of a helical gear and a screw gear, as long as the configuration is able to convert the rotation of the motor into a linear motion, limitation is not made to this. For example, a spiral bevel gear may be used, or a configuration may be taken so that the input gear 602 is eliminated and the cam gear 603 is directly driven by the motor 601. Also, an actuator which outputs a linear motion, for example a solenoid, may replace the motor 601 as the driving source.

Also, although each member constituting the pressing mechanism 6000 illustrated in FIG. 37 is supported by the frame 609 of the printer main body, the reciprocating pin 604 is supported by the guide portion 604*a* arranged in the casing of the printer main body 100 to be able to reciprocate up and down. On the other hand, the rotation shaft 7014*a* of the lock member 7014 is supported by the holding unit arranged in the frame 8010 of the toner receiving unit 801 to be able to rotate and to slide in a vertical direction. Thus, when the process cartridge 20 is replaced, the lock member 7014 is replaced at the same time, and the pressing mechanism 6000 remains in the printer main body. The rotation shaft 7014*a* and the reciprocating pin 604 is made of a separate component. When the lock member 7014 is at the unlocked position, the reciprocating pin 604 is away from the lock member, and the process cartridge 20 is removed from the main body leaving the reciprocating pin 604 in the main body. However, limitation are not made to such a configuration, and the printer main body can be made to support the rotation shaft 7014*a* of the lock member 7014, for example.

(Supply Operation Flow Using Toner Pack)

Figure 34C:
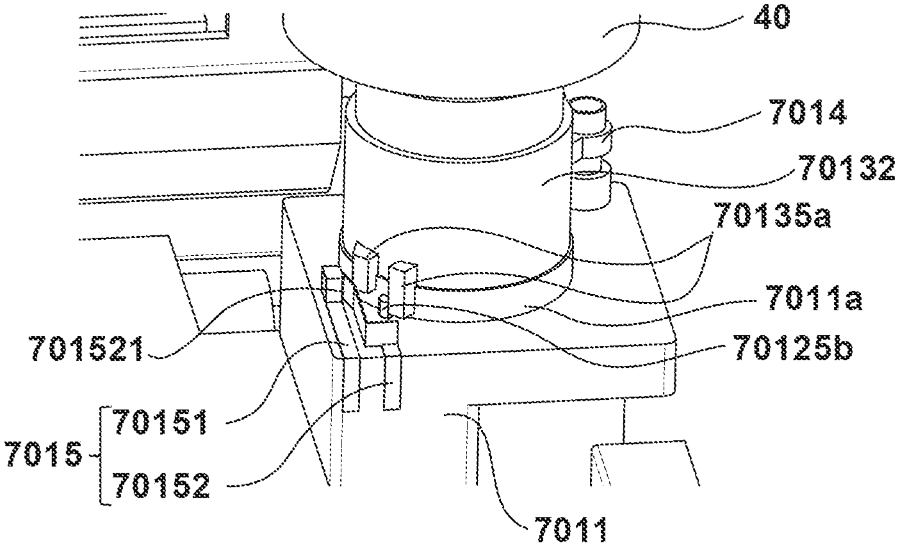

Based on the configurations of the toner pack 40, the replenishment container mounting unit 701, and the pressing mechanism 6000 described above, a sequence of operations from when mounting the toner pack 40 to the replenishment container mounting unit 701 until when removing the toner pack 40 after replenishing the toner will be explained. FIG. 34A is a top view of the replenishment container mounting unit 701 when the replenishment port 8012 is in a closed state, and FIG. 34B is a top view of the replenishment container mounting unit 701 when the replenishment port 8012 is an open state. FIG. 34C is a perspective view of the replenishment container mounting unit 701 when the replenishment port 8012 is in an open state.

As illustrated in FIG. 34A, the replenishment port shutter 7013 in a closed state is fixed by the protrusion 70135*a* contacting the lock member 7014 in a rotational direction at the locked position so as not to rotate with respect to the replenishment port 8012. At this time, the cover portion 70131 of the replenishment port shutter 7013 fully blocks the replenishment port 8012. Also, flat springs 70151 and 70152 of the rotation detection unit 7015 are separated, and the rotation detection unit 7015 is in a disconnected state.

When inserting the toner pack 40 into the replenishment container mounting unit 701, the user aligns the cutout portion (FIG. 36) of the discharging unit 42 of the toner pack 40, the shutter component 41 to the cover portion 70131 of the replenishment port 8012, and the replenishment port shutter 7013 then inserts the toner pack 40. Then, the engagement surface 42*s* of the discharging unit 42 engages with the engagement surface 7013*s* (refer to FIGS. 33A to 33C) which is a lateral surface of the cover portion 70131, and then the engagement surface 41*s* of the shutter component 41 engages with the engagement surface 8012*s* (refer to FIGS. 33A and 33C) arranged on a peripheral portion of the replenishment port 8012. At this time, the discharging unit 42 that is engaged with the cover portion 70131 of the replenishment port shutter 7013 is unable to rotate until the lock of the replenishment port shutter 7013 is disengaged later by the lock member 7014 and will be able to rotate together with the replenishment port shutter 7013 when the lock is disengaged. On the other hand, the shutter component 41 of the toner pack 40, by being engaged with the replenishment port 8012 that is fixed to the frame 8010 of the toner receiving unit 801, will be in a state where it is unable to rotate. Note that a convex portion protruding upward from the upper surface of the cover portion 70131 may be arranged as an engagement configuration for the cover portion 70131 and the discharging unit 42, and a concave portion that will engage with that protrusion may be arranged on the bottom surface 42*b* (refer to FIG. 36) of the discharging unit 42.

Also, with the insertion of the toner pack 40, the contact point unit 45*a* (FIGS. 32A and 32B) of the memory unit 45 contacts the contact point unit 70133 of the replenishment container mounting unit 701, and then information stored in the memory unit 45 is read by the control unit 90 of the image forming apparatus. The memory unit 45 stores information (a new product flag) that indicates whether there is toner (whether it is a used toner pack) in the toner pack 40. The control unit 90 reads the new product flag, and if it determines that there is toner (the pack is unused) in the currently mounted toner pack 40, it controls the pressing mechanism 6000 then presses up the lock member 7014. With this, the lock member 7014 shifts from the locked position to the unlocked position (FIG. 35B).

In a state where the lock member 7014 is shifted to the unlocked position, a state (FIG. 35B) where the replenishment port shutter 7013 is able to rotate in the R1 direction in FIGS. 34A and 34B is entered by the lock member 7014 separating from the protrusion 70135*a* of the replenishment port shutter 7013. In contrast, the replenishment port shutter 7013 is restrained from rotating in the R2 direction due to the protrusion 70125*a* arranged on the frame 8010 of the toner receiving unit 801 interfering (FIG. 34A) with the protrusion 70135*a*. That is, in FIG. 34A, 70125*a* and 70125*b* are positioned lower in the gravitational direction than 70135*a* and 70135*b* so that 70135*a* and 70135*b* are able to move and pass in the rotational direction.

When the user holds the toner pack 40 and rotates the discharging unit 42 or its adjacent bag component 43 180 degrees in the R1 direction, then the state illustrated in FIGS. 34B and 34C will be entered. When the replenishment port shutter 7013 rotates 180 degrees together with the discharging unit 42 of the toner pack 40, the cover portion 70131 moves from the position where it covers the replenishment port 8012 to expose the replenishment port 8012. The cover portion 70131 is pushed by the engagement surface 42*a* which is a part of discharging unit 42 whose lateral side rotates, then rotates together with the engagement surface 42*s*. Also, when the discharging unit 42 rotates 180 degrees while the shutter component 41 is fixed, then the discharge port 42*a* of the toner pack 40 is exposed (FIG. 32B) and faces the replenishment port 8012. With this, the internal space of the toner pack 40 and the internal space of the toner receiving unit 801 are joined via the discharge port 42 and the replenishment port 8012, and the toner filling the bag component 43 flows into the toner storage unit 8011.

The toner that dropped into the toner storage unit 8011 is conveyed inside the toner receiving unit 801 as described above, then reaches the developing container 32 and goes into a state where it can be used in the developing process. Note that a configuration may be taken so that even if the newly replenished toner has not reached the developing container 32, as long as an amount of toner required to maintain an image quality is remaining in the developing container 32, the developing unit 802 is able to execute the developing process. That is, a configuration may be taken so that the toner can be replenished from a replenishment container outside the image forming apparatus into the developing container regardless of whether the image forming unit 10 (FIG. 1A) is executing an image forming operation.

Also, the protrusion 70125*b* is arranged (FIGS. 34B and 34C) so that it contacts the protrusion 70135*a* of the replenishment port shutter when the replenishment port shutter 7013 is rotated 180 degrees in the R1 direction from the state in FIG. 34A. That is, protrusion 70125*b*, similarly to 70125*a*, is positioned lower in the gravitational direction than 70135*a* and 70135*b*. With this, the replenishment port shutter 7013 is restricted from rotating in the R1 direction beyond 180 degrees. At the same time, the protrusion 70135*a* of the replenishment port shutter 7013 presses the flat spring 70152 of the rotation detection unit 7015 and thereby causes its distal end 701521 to be in contact with the flat spring 70151. When the rotation detection unit 7015 enters a conducting state, the control unit 90 recognizes that the replenishment port shutter 7013 has opened and operates the pressing mechanism 6000 then moves the lock member 7014 again to the locked position. Then the lock member 7014 engages with the protrusion 70135*b* of the replenishment port shutter 7013 in regulating the rotation in the R2 direction, thereby obtaining a state where the replenishment port shutter 7013 and the toner pack 40 do not rotate in either direction.

Furthermore, in the state in FIGS. 34B and 34C where the discharging unit 42 of the toner pack 40 and the replenishment port shutter 7013 has been rotated 180 degrees, a positional relationship becomes such that the cover portion 70131 of the replenishment port shutter 7013 covers the upper side of the shutter component 41 of the toner pack 40. Therefore, even if the toner pack 40 is to be lifted upward from the replenishment container mounting unit 701, the shutter component 41 interferes with the cover portion 70131 thereby restricting the movement of the toner pack 40. Hence, unless the user performs the toner pack 40 removal operation in the predetermined procedure explained below, the toner pack 40 will be prevented from coming off of the replenishment container mounting unit 701.

When a condition for determining the completion of a toner discharge after the toner starts discharging from the toner pack 40 is met, then the control unit 90 operates the pressing mechanism 6000 and moves the lock member 7014 to the unlocked position. In the present embodiment, the toner discharge is determined to be complete depending on an elapsed time from when the rotation detection unit 7015 enters a conducting state.

After the lock member 7014 moves to the unlocked position, the user is able to remove the toner pack 40 by reversing the procedure for attaching the toner pack 40. In other words, the user holds the discharging unit 42 of the toner pack 40 or its adjacent bag component 43 and rotates 180 degrees in the R2 direction opposite from when attaching the pack. Then, the replenishment port shutter 7013 rotates 180 degrees together with the discharging unit 42, and the replenishment port 8012 is covered by the cover portion 70131 of the replenishment port shutter 7013 as illustrated in FIG. 34A. Also, the protrusion 70135*a* (on the left side in FIG. 34A) of the replenishment port shutter 7013 contacts the protrusion 70125*a*, by which the replenishment port shutter 7013 is restricted from rotating in the R2 direction beyond 180 degrees.

When the discharging unit 42 of the toner pack 40 is rotated 180 degrees in the R2 direction, the position of the cutout portion of the discharging unit 42 and the position of the cutout portion of the shutter component 41 are aligned (FIG. 36). Therefore, even if the toner pack 40 moves upward, the shutter component 41 does not interfere with the cover portion 70131 of the replenishment port shutter 7013, and the user can hold and lift the toner pack 40 to remove it from the replenishment container mounting unit 701.

Additionally, in the process in which the replenishment port shutter 7013 rotates 180 degrees in the R2 direction, the protrusion 70135*a* separates from the flat spring 70152, and the rotation detection unit 7015 returns to the disconnected state. Then, the control unit 90 recognizes that the replenishment port shutter 7013 has closed and operates the pressing mechanism 6000 then moves the lock member 7014 again to the locked position. With this, the replenishment container mounting unit 701 returns to the initial state before performing the toner supply operation. For example, the control unit 90 may determine that the predetermined condition for moving the lock member 7014 to the unlocked state has been met when a predetermined time elapses after the rotation detection unit 7015 enters the conducting state. Note that the trigger for moving the lock member 7014 to the locked position may be, for example, a loss of conduction between the contact point unit 70133 (see FIG. 33B) and the contact point unit 45*a* (see FIG. 32A) due to the toner pack 40 being pulled out of the replenishment container mounting unit 701.

In the present embodiment, the positional relationship is such that the discharge port 42*a* of the toner pack 40 and the replenishment port 8012 communicate when rotated 180 degrees; however, the rotational angle required for communication can be changed as long as the configuration enables the attachment/detachment of the toner pack 40 with the same operation as the present embodiment.

[Image Forming Apparatus Control System]

Figure 38:
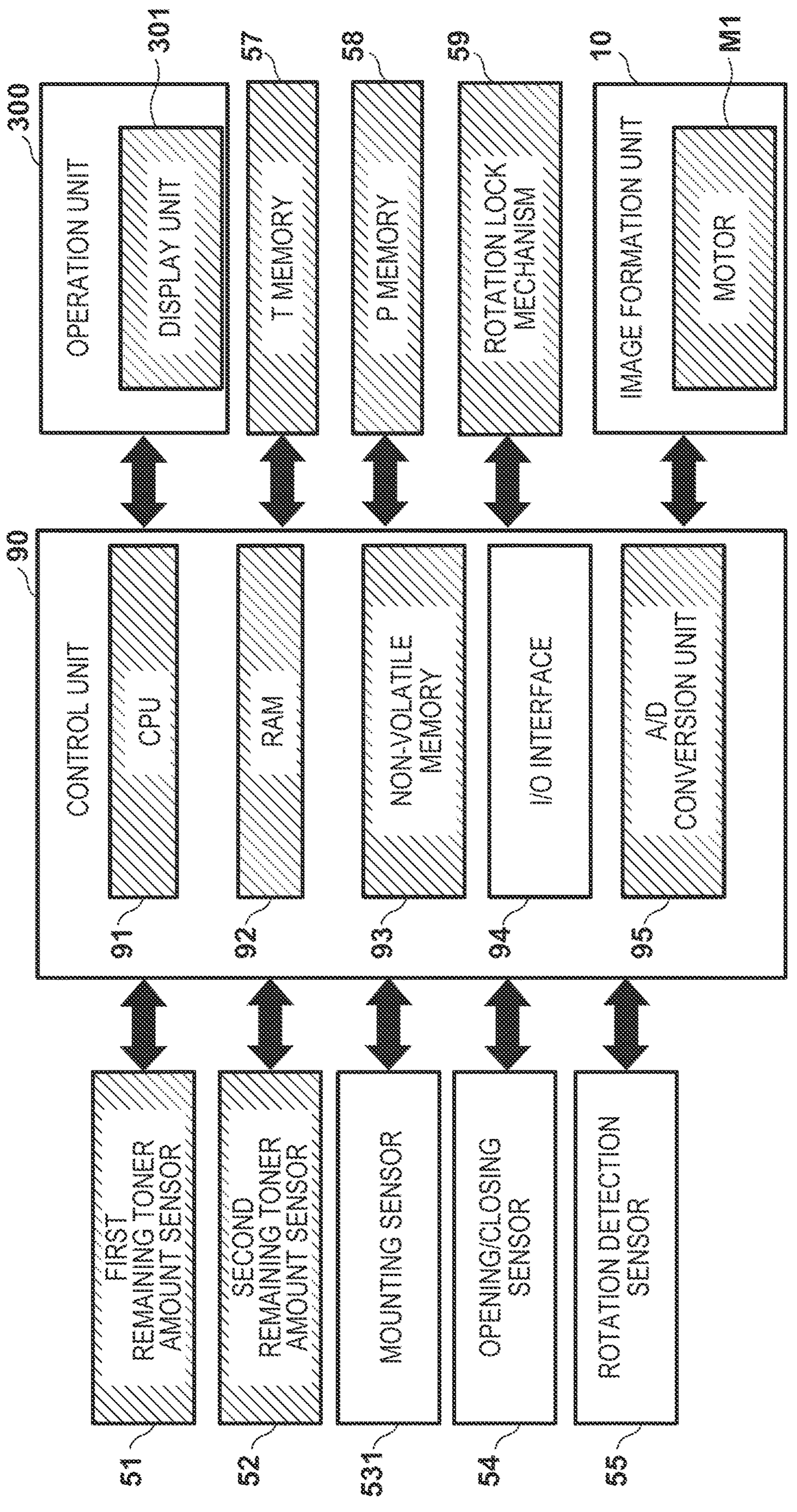
FIG. 38 is a block diagram illustrating the control system of the image forming apparatus.

FIG. 38 is a block diagram illustrating the control system of the image forming apparatus 1 and is a variation of FIG. 12. Explanations of the same configuration will be omitted.

A T memory 57, which is a non-volatile memory, mounted on the toner container and a P memory 58, which is a non-volatile memory, mounted on the process cartridge 20 will be connected to the control unit 90. The T memory 57 is mounted on the previously-described toner pack 40 and comprises the memory unit 45. Furthermore, a rotation lock mechanism 59 and the image forming unit 10 are connected to the control unit 90. The rotation lock mechanism 59 indicates the lock mechanism explained in FIGS. 33A to 37.

The mounting sensor 531 causes the control unit 90 to detect that the toner pack 40 has been mounted to the replenishment container mounting unit 701 (thereby, the replenishment port 8012). For example, the contact point unit 45*a* (FIGS. 32A and 32B) of the memory unit 45 contacts the contact point unit 70133 of the replenishment container mounting unit 701 then communicates with the control unit 90 and the memory unit 45. With this, the control unit 90 can detect that the toner pack 40 has been mounted.

A rotation detection sensor 55 comprises the rotation detection unit 7015 (refer to, for example, FIG. 33A) of the previously described toner pack 40. More specifically, in the case where the flat spring 70152 is pushed by the protrusion 70135*a* arranged on the outer periphery of the replenishment port shutter 7013, the distal end 701521 contacts the other flat spring 70151. With this, the flat spring 70152 and the flat spring 70151 start conducting electricity, and the rotation is detected by the control unit 90. The first remaining toner amount sensor 51, the second remaining toner amount sensor 52, the mounting sensor 531, the opening/closing sensor 54, and the rotation detection sensor 55 are connected to the input side of the control unit 90, and the remaining amount information is read as necessary by the control unit 90.

Similarly to in FIG. 12, the shaded functional blocks indicate the functional blocks whose power supply will be stopped or whose power will be supplied but operation will be stopped during the sleep mode.

(Activation Timing of Remaining Amount Sensor)

Figure 39:
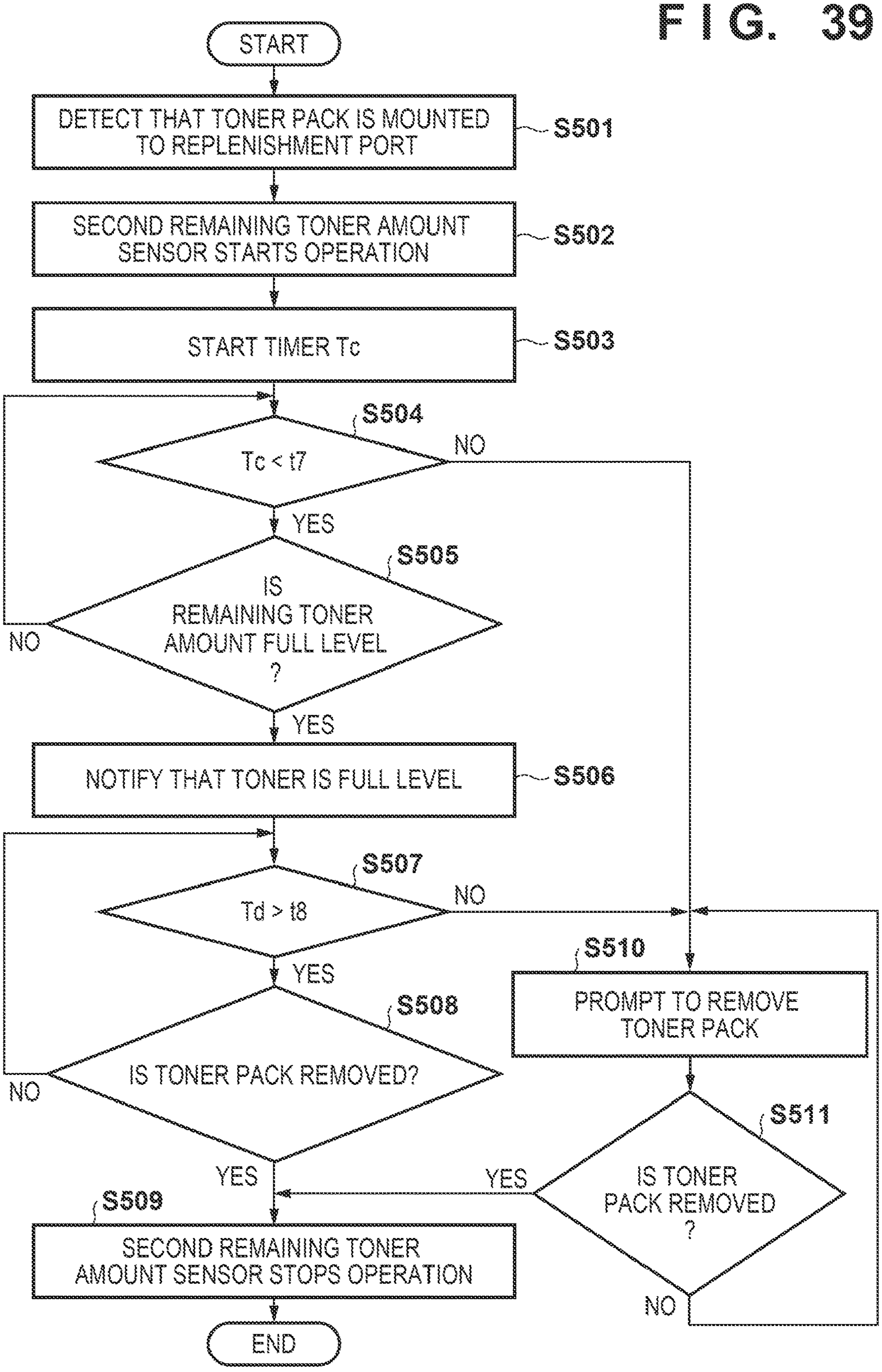
FIG. 39 is a flowchart illustrating replenishment guidance processing according to the fifth embodiment.

It is important to accurately determine a toner replenishment deactivation timing in order to prevent the toner from overflowing from the replenishment port 8012 when replenishing the toner. To accurately determine the toner replenishment deactivation timing, it is necessary to determine whether the remaining toner amount is at the full level when replenishing the toner. Thus, the second remaining toner amount sensor 52 must be operated. On the other hand, the remaining toner amount cannot change to a full level outside of when replenishing the toner, and therefore, the second remaining toner amount sensor 52 only needs to operate when replenishing the toner. In other words, there is no need to power the first remaining toner amount sensor 51 at this time. FIG. 39 is a flowchart related to an operation for when replenishing the toner.

First, when the toner pack 40 is mounted to the replenishment container mounting unit 701, the control unit 90 detects (step S501) that the toner pack 40 has been mounted to the replenishment container mounting unit 701 (thereby, the replenishment port 8012) based on a signal from the mounting sensor 53. When the toner pack is connected to the replenishment port 8012, the user can replenish the developing container 32 with the toner by squeezing the toner pack 40 with their fingers. When the control unit 90 detects the connection of the toner pack 40, it simultaneously starts the operation of the second remaining toner amount sensor 52 (step S502). As a result, when the remaining toner amount in the developing container 32 increases due to the user replenishing the developing container 32 with the toner, the second remaining toner amount sensor 52 will always operate. The first remaining toner amount sensor 51 maintains a non-energized state (a sleep state). When the second remaining toner amount sensor 52 starts operating, a light emitted from the light emitting unit 51*a* passes the light path Q1 illustrated in FIG. 9 then is received by the light receiving unit 51*b*. Monitoring the voltage V2 corresponding to the amount of light received by the light receiving unit 51 enables to determine whether the toner is a full level.

The control unit 90 starts (step S503) the timer Tc when starting the operation of the second remaining toner amount sensor and determines (step S504) whether the timer Tc is smaller than a threshold value t7. The threshold value t7 is a preset value and is set to a sufficient amount of time it takes for the remaining amount to get to the full level from when the toner replenishment starts. In the case where the timer Tc is smaller than the threshold value t7, the control unit 90 determines (step S505) whether the remaining toner amount is a full level.

Figure 40A:
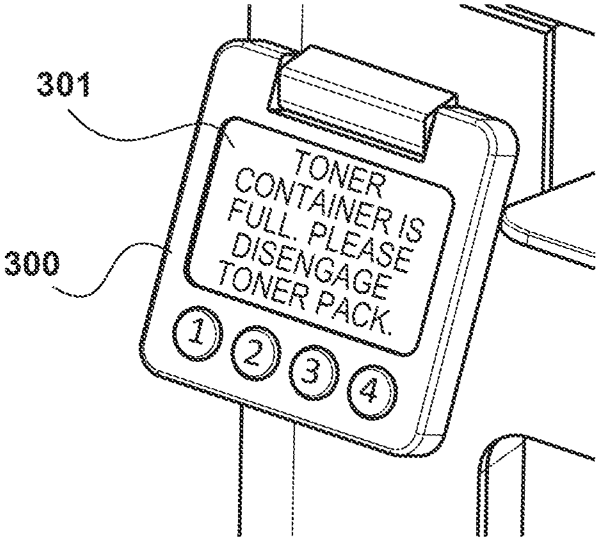
FIGS. 40A to 40C are diagrams illustrating display examples of messages on the display unit.

When the control unit 90 detects that the remaining toner amount is the full level due to an increase in the remaining toner amount by the user replenishing the developing container 32 with the toner, the display unit 301 displays (step S506) that the toner is at the full level. For example, by displaying a request to remove the toner pack 40 as illustrated in FIG. 40A, the user is prompted to remove the toner pack 40. By notifying the user, the user is able to accurately determine to stop the toner replenishment. As a result, it becomes possible to prevent the toner from leaking due to replenishing the toner replenishment port 8012 with too much toner.

Then, the control unit 90 starts up the timer Td to determine whether the timer Td is less than the threshold value t8 (step S507). The threshold value t8 is set to an amount of time sufficient for the user to recognize that the toner is at the full level then to remove the toner pack 40 from the replenishment port 8012.

In a case where a timer Td is smaller than the threshold value t8, the control unit 90 determines (step S508) whether the toner pack 40 has been removed from the toner replenishment port 8012. This decision is performed by the control unit 90 detecting a signal from the mounting sensor 531. When the control unit 90 determines that the toner pack 40 was removed, it stops the operation of the second remaining toner amount sensor 52 (step S509).

On the other hand, in a case (steps S504 and S505) where the second remaining toner amount sensor 52 does not change to a full level within the predetermined time t7, the control unit 90 displays (step S510) content on the display unit 301 prompting the user to remove the toner pack 40.

Figure 40B:
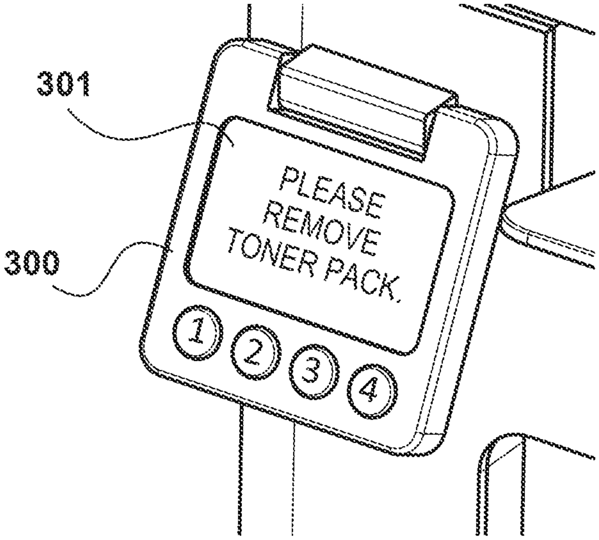
Figure 40C:
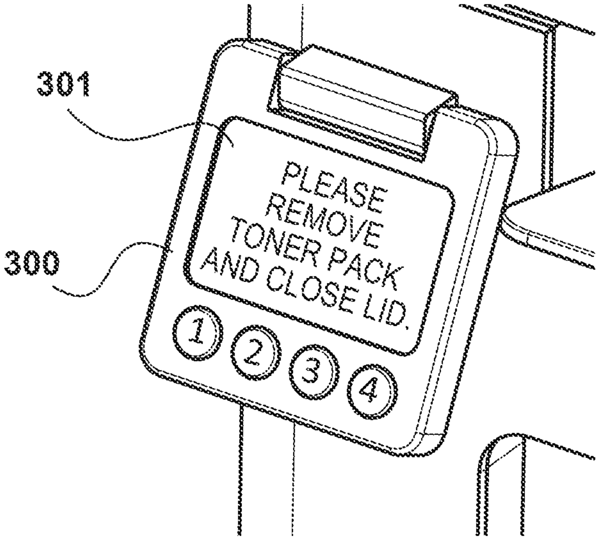

Also, in a case the mounting sensor 531 continues to indicate a mounted state even after the predetermined time t8 has elapsed, the control unit 90 displays (step S510) content on display unit 301 prompting the user to remove the toner pack 40. For example, by displaying a message requesting the user to remove the replenishment pack as illustrated in FIG. 40B and FIG. 40C, the user is prompted to remove the toner pack 40. The control unit 90, after displaying the content on the display unit 301 prompting the user to remove the toner pack 40, determines (step S511) whether the toner pack 40 has been removed. When the toner pack 40 is removed and the mounted state is no longer detected by the mounting sensor 531, the control unit 90 determines that the toner pack 40 has been removed and stops (step S509) the operation of the second remaining toner amount sensor 52. With this, the second remaining toner amount sensor 52 enters a non-energized state. In a case where the control unit 90 cannot detect via the mounting sensor 531 that the toner pack 40 has been removed, it continues (step S510) the display prompting the user to remove the toner pack 40.

As described above, the control unit 90 detects the user operation related to the replenishment of the developer. In the present embodiment, the user operation related to the replenishment of the developer is a user operation to connect the toner pack 40 to the replenishment port 8012. Then, when the control unit 90 detects the user operation related to the replenishment of the developer, it starts powering the second remaining toner amount sensor 52 to operate the second remaining toner amount sensor 52. Operating the second remaining toner amount sensor 52 only when the toner pack 40 is connected to the replenishment port 8012 enables prevention of an increase in power consumption.

The distance of the light path Q2 is especially long in the remaining toner amount sensor 52 in the present configuration, therefore, the light from the light emitting unit 51*a* has to be made to be strong for it to be detected. Therefore, the power that the second remaining toner amount sensor 52 consumes is significant, and when used in a sleep mode, has a significant effect on energy saving. Thus, operating the second remaining toner amount sensor 52 only when replenishing greatly contributes to reducing the impact on energy saving. Also, since the light of the light emitting unit 51*a* is set to be strong, the lifespan is likely to be shortened. Thus, by configuring similarly to the present embodiment to not operate in a standby mode or when printing, the lifespan of the second remaining amount detection sensor 52 can be lengthened. Also, a configuration may be taken so that when replenishing toner, the first remaining amount detection sensor 51 is powered to cause the first remaining amount detection sensor 51 to operate. In this case, for example, control can be performed as explained in the first embodiment or the second embodiment. Meanwhile, a configuration may be taken so that when replenishing toner, the energization of the first remaining amount detection sensor 51 is stopped to cause only the second remaining amount detection sensor 52 to operate.

Sixth Embodiment

The present embodiment differs from the fifth embodiment in that the mounting sensor 531 of the fifth embodiment is not arranged, and the opening/closing sensor 54 of the replenishment port is used instead. The opening/closing sensor 54 is as described in FIG. 26.

Figure 41:
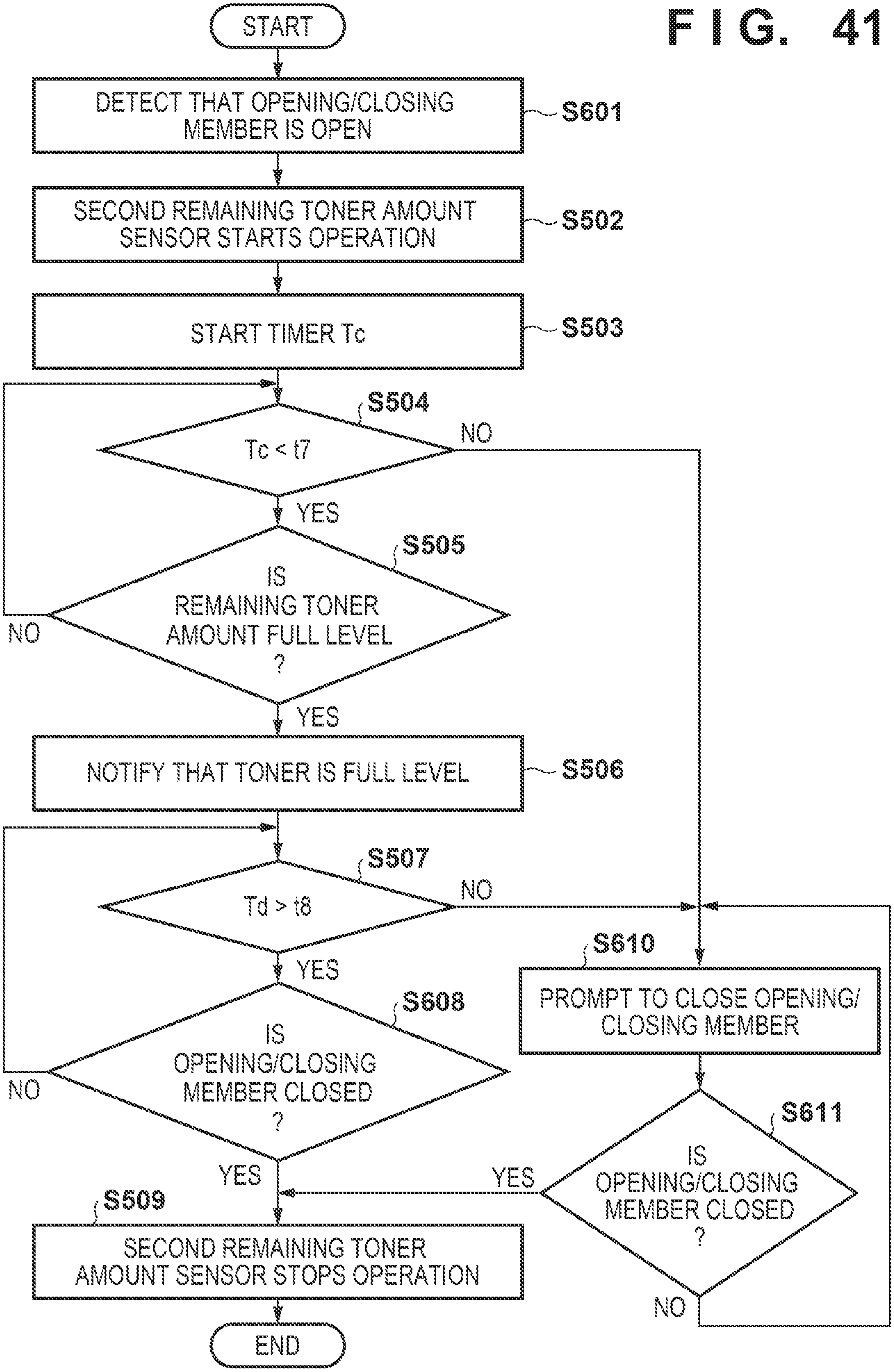
FIG. 41 is a flowchart illustrating replenishment guidance processing according to a sixth embodiment.

FIG. 41 is a flowchart related to the operation for when replenishing the toner in the present embodiment. First, the control unit 90 detects (step S601) that the opening/closing component 83 is opened based on the signal outputted from the opening/closing sensor 54. The following processing differs from FIG. 39 in that step S510 in FIG. 39 is replaced with step S610, and steps S508 and S511 in FIG. 39 is replaced with steps S608 and S611. In step S610, a message prompting the user to close the opening/closing component 83 is displayed. Also, in steps S608 and S611, the control unit 90 determines whether the opening/closing component 83 is closed.

As described above, the user operation related to the replenishment of the developer is the user operation for opening the opening/closing component 83 in the present embodiment. That is, the operation to expose the replenishment port 8012 by moving the member covering the replenishment port 8012 is a user operation related to the replenishment of the developer in the present embodiment. Therefore, it is possible to only operate the second remaining toner amount sensor 52 when replenishing the toner from the toner pack 40 with a simpler configuration than the fifth embodiment. Note that the user operation related to the replenishment of the developer is not limited to the content of the fifth embodiment (mounting the toner pack 40) or the sixth embodiment (opening the opening/closing component).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-143919, filed on Aug. 5, 2019 and Japanese Patent Application No. 2020-029731, filed on Feb. 25, 2020, which are hereby incorporated by reference herein in their entirety.

What is claimed is:

1. An image forming apparatus comprising:

an image carrier configured to carry an electrostatic latent image;

a developing container;

a developer carrier configured to carry a developer stored in the developing container and to develop the electrostatic latent image carried by the image carrier into a developer image;

a stirring member configured to convey the developer stored in the developing container;

a mounting unit configured to mount a replenishment container in which the developer is stored;

a detection unit configured to detect an amount of developer stored in the developing container and to output remaining amount information corresponding to the amount of developer which was detected; and a control unit configured to cause the stirring member to operate after a replenishment of the developing container with the developer using the replenishment container is instructed, wherein the control unit is further configured to, in a case where the remaining amount information which indicates a first remaining amount is outputted by the detection unit when detecting a user operation related to replenishing the developing container with the developer using the replenishment container, cause an operation of the stirring member to stop when, after starting the replenishment, a first remaining stirring time elapses from when the remaining amount information indicates a third remaining amount which is larger than the first remaining amount is outputted by the detection unit; and in a case where the remaining amount information which indicates a second remaining amount larger than the first remaining amount and smaller than the third remaining amount is outputted by the detection unit when detecting the user operation related to replenishing the developing container with the developer using the replenishment container, cause an operation of the stirring member to stop when, after starting the replenishment, a second remaining stirring time elapses from when the remaining amount information indicates the third remaining amount is outputted by the detection unit, the second remaining stirring time being longer than the first remaining stirring time.

2. The image forming apparatus according to claim 1, wherein the control unit is further configured to, in a case where the remaining amount information indicating the first remaining amount is outputted by the detection unit when detecting the user operation, cause an operation of the stirring member to stop, when a first time elapses without the detection unit outputting the remaining amount information indicating the third remaining amount, and in a case where the remaining amount information indicating the second remaining amount is outputted by the detection unit when detecting the user operation, cause an operation of the stirring member to stop when a second time that is longer than the first time elapses without the detection unit outputting the remaining amount information indicating the third remaining amount.

3. The image forming apparatus according to claim 1, wherein the control unit is further configured to, in a case where the remaining amount information indicating the third remaining amount is outputted by the detection unit when detecting the user operation, cause an operation of the stirring member to stop when a third time elapses from when the replenishment is started.

4. The image forming apparatus according to claim 1, wherein the detection unit comprises:

a first detection unit configured to detect whether a developer amount stored in the developing container is greater than the first remaining amount; and a second detection unit configured to detect whether a developer amount stored in the developing container is greater than the second remaining amount, and the control unit is further configured to cause the second detection unit to operate when detecting the user operation.

* * * * *